(12) United States Patent
Guo et al.

(10) Patent No.: US 11,787,731 B2
(45) Date of Patent: Oct. 17, 2023

(54) PHASE SEPARABLE GLASS COMPOSITIONS HAVING IMPROVED MECHANICAL DURABILITY

(71) Applicant: CORNING INCORPORATED, Corning, NY (US)

(72) Inventors: Xiaoju Guo, Pittsford, NY (US); Peter Joseph Lezzi, Corning, NY (US); Jian Luo, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/510,544

(22) Filed: Oct. 26, 2021

(65) Prior Publication Data

US 2022/0135468 A1    May 5, 2022

Related U.S. Application Data

(60) Provisional application No. 63/107,076, filed on Oct. 29, 2020.

(51) Int. Cl.
    *C03C 3/091*      (2006.01)
    *C03C 3/093*      (2006.01)
    (Continued)

(52) U.S. Cl.
    CPC .......... *C03C 10/0027* (2013.01); *C03B 32/02* (2013.01); *C03C 4/00* (2013.01); *C03C 10/0054* (2013.01); *C03C 2204/00* (2013.01)

(58) Field of Classification Search
    CPC ................................. C03C 3/091; C03C 4/005
    See application file for complete search history.

(56) References Cited

U.S. PATENT DOCUMENTS 3,460,987 A    8/1969   McMillan et al.
3,464,880 A    9/1969   Rinehart
(Continued)

FOREIGN PATENT DOCUMENTS

EP      3401286 A1    11/2018
JP      2002-047030 A    2/2002
(Continued)

OTHER PUBLICATIONS

"Standard Test Method for Young's Modulus, Shear Modulus, and Poisson's Ratio for Glass and Glass-Ceramics by Resonance", In ASTM C623-21, 2021, 7 pages.
(Continued)

*Primary Examiner* — Karl E Group

(57) ABSTRACT

A glass composition includes: greater than or equal to 53 mol % and less than or equal to 70 mol % $SiO_2$; greater than or equal to 9 mol % and less than or equal to 20 mol % $Al_2O_3$; greater than or equal to 10 mol % and less than or equal to 17.5 mol % $B_2O_3$; greater than or equal to 0 mol % $Li_2O$; greater than or equal to 0 mol % $Na_2O$; and greater than 0.1 mol % of a nucleating agent. The sum of $Li_2O$ and $Na_2O$ in the glass composition may be greater than or equal to 8 mol % and less than or equal to 30 mol %. The amount of $Al_2O_3$ minus the sum of $R_2O$ and RO in the glass composition may be greater than or equal to −3 mol %. The glass composition may be phase separable and may have an improved $K_{Ic}$ fracture toughness.

11 Claims, 28 Drawing Sheets

(51) Int. Cl.
*C03C 10/00* (2006.01)
*C03B 32/02* (2006.01)
*C03C 4/00* (2006.01)

(56) References Cited

U.S. PATENT DOCUMENTS

| | | | |
|---|---|---|---|
| 3,642,504 | A | 2/1972 | Petzold et al. |
| 3,656,923 | A | 4/1972 | Garfinkel et al. |
| 4,086,074 | A | 4/1978 | Minot et al. |
| 4,634,683 | A | 1/1987 | Dumbaugh |
| 6,340,647 | B1 | 1/2002 | Koyama et al. |
| 6,451,720 | B1 | 9/2002 | Kishimoto et al. |
| 8,853,109 | B2 | 10/2014 | Bogaerts et al. |
| 9,393,760 | B2 | 7/2016 | He et al. |
| 9,487,440 | B2 | 11/2016 | Miyasaka et al. |
| 9,546,104 | B2 | 1/2017 | Miyasaka et al. |
| 10,450,220 | B2 * | 10/2019 | Dejneka ............ C03C 10/0009 |
| 10,829,408 | B2 * | 11/2020 | Dejneka ............ C03C 10/0027 |
| 11,078,105 | B2 | 8/2021 | Luo et al. |
| 2013/0045853 | A1 | 2/2013 | Kotani et al. |
| 2013/0210962 | A1 | 8/2013 | Hofmann et al. |
| 2013/0233018 | A1 | 9/2013 | Takashima et al. |
| 2014/0364298 | A1 | 12/2014 | Ohara et al. |
| 2016/0326045 | A1 | 11/2016 | Li |
| 2019/0177206 | A1 * | 6/2019 | Dejneka ................ C03C 3/091 |
| 2019/0177209 | A1 * | 6/2019 | Dejneka ................ G02B 5/208 |
| 2019/0177212 | A1 * | 6/2019 | Dejneka ................ C03C 3/118 |

FOREIGN PATENT DOCUMENTS

| | | |
|---|---|---|
| JP | 2011-241130 A | 12/2011 |
| JP | 5459605 B2 | 4/2014 |
| TW | 201602021 A | 1/2016 |
| WO | 2014/058054 A1 | 4/2014 |
| WO | 2015/186606 A1 | 12/2015 |
| WO | 2016/154235 A1 | 9/2016 |
| WO | 2018/017638 A1 | 1/2018 |
| WO | 2019/118488 A1 | 6/2019 |
| WO | WO-2019118488 A1 * | 6/2019 ............ C03B 32/02 |

OTHER PUBLICATIONS

ASTM C1351M-96(2017) "Standard Test Method for Measurement of Viscosity of Glass Between 104 Pas and 108 Pas by Viscous Compression of a Solid Right Cylinder".

ASTM C693-93(2013), "Standard Test Method for Density of Glass by Buoyancy".

ASTM C829-81 (2015), titled "Standard Practice for Measurement of L-iquidus Temperature of Glass by the Gradient Furnace Method".

ASTM standard C770-16, entitled "Standard Test Method for Measurement of Glass Stress-Optical Coefficient,".

Bubsey, R.T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992).

Haller et al., "Metastable Immiscibility Surface in the System $Na_2O$—$B_2O_3$—$SiO_2$", Journal of the American Ceramic Society, vol. 53, Issue1, 1970, pp. 34-39.

Johnson et al., "Ductile Bulk Metallic Glass", Phys. Rev. Lett., vol. 93, 2004, 5 pages.

Pan, X. et al. "Thermal, mechanical, and upconversion properties of $Er^{3+}/Yb^{3+}$ co-doped titanate glass prepared by levitation method", J. Alloys Compd., vol. 509, pp. 7504-7507, 2011.

Reddy, K.P.R. et al., "Fracture Toughness Measurement of Glass and Ceramic Materials Using Chevron-Notched Specimens," J. Am. Ceram. Soc., vol. 71, No. 6, 1988, pp. C-310-C-313.

Tarafder, A. et al. "Nanostructuring and fluorescence properties of $Eu^{3+}$:$LiTaO_3$ in $Li_2O$—$Ta_2O_5$—$SiO_2$—$Al_2O_3$ glass-ceramics", JMatS, vol. 44, pp. 4495-4498, 2009.

Yoda et al., "A novel upconversion $TiO_2$—$La_2O_3$—$Ta_2O_5$ bulk glass co-doped with $Er^{3+}/Yb^{3+}$ fabricated by containerless processing". Mater. Lett., vol. 66, pp. 367-369, 2012.

Invitation to Pay Additional Fees; PCT/US2021/056540; dated Feb. 24, 2022; 10 pages; European Patent Office.

* cited by examiner

PHASE SEPARABLE GLASS COMPOSITIONS HAVING IMPROVED MECHANICAL DURABILITY

This application claims the benefit of priority under 35 U.S.C. § 119 of U.S. Provisional Application Ser. No. 63/107,076 filed on Oct. 29, 2020, the content of which is relied upon and incorporated herein by reference in its entirety.

BACKGROUND

Field

The present specification generally relates to ion-exchangeable glass compositions and, in particular, to ion-exchangeable glass compositions capable of phase separation and having an improved mechanical durability.

Technical Background

Glass articles, such as cover glasses, glass backplanes, and the like, are employed in both consumer and commercial electronic devices such as LCD and LED displays, computer monitors, automated teller machines (ATMs), and the like. Some of these glass articles may include "touch" functionality which necessitates that the glass article be contacted by various objects including a user's fingers and/or stylus devices and, as such, the glass must be sufficiently robust to endure regular contact without damage, such as scratching. Indeed, scratches introduced into the surface of the glass article may reduce the strength of the glass article as the scratches may serve as initiation points for cracks leading to catastrophic failure of the glass.

Moreover, the glass articles may also be incorporated in portable electronic devices, such as mobile telephones, personal media players, laptop computers, and tablet computers. Therefore, the optical characteristics of the glass article, such as the transmission of the glass article, may be an important consideration.

Accordingly, a need exists for alternative glasses which have improved mechanical properties while also having a relatively high transmission.

SUMMARY

According to a first aspect A1, a glass composition may comprise: greater than or equal to 53 mol % and less than or equal to 70 mol % $SiO_2$; greater than or equal to 9 mol % and less than or equal to 20 mol % $Al_2O_3$; greater than or equal to 10 mol % and less than or equal to 17.5 mol % $B_2O_3$; greater than or equal to 0 mol % $Li_2O$; greater than or equal to 0 mol % $Na_2O$; and greater than 0.1 mol % of a nucleating agent, the nucleating agent selected from the group consisting of $TiO_2$, $Y_2O_3$, $ZrO_2$, $P_2O_5$, $WO_3$, ZnO, and combinations thereof, wherein: $Li_2O+Na_2O$ is greater than or equal to 8 mol % and less than or equal to 30 mol %; $Al_2O_3$—$R_2O$—RO is greater than or equal to −3 mol %; the glass composition is phase separable; and the glass composition has an improved $K_{Ic}$ fracture toughness as measured by a chevron notch short bar method.

A second aspect A2 includes the glass composition according to the first aspect A1, wherein the glass composition is phase separable into at least two glass phases.

A third aspect A3 includes the glass composition according to the first aspect A1 or the second aspect A2, wherein $Al_2O_3+B_2O_3$ is greater than or equal to 15 mol % and less than or equal to 31 mol %.

A fourth aspect A4 includes the glass composition according to the third aspect A3, wherein $Al_2O_3+B_2O_3$ is greater than or equal to 20 mol % and less than or equal to 31 mol %.

A fifth aspect A5 includes the glass composition according to the fourth aspect A4, wherein $Al_2O_3+B_2O_3$ is greater than or equal to 22 mol % and less than or equal to 29 mol %.

A sixth aspect A6 includes the glass composition according to any of the first through fifth aspects A1-A5, wherein $Li_2O+Na_2O$ is greater than or equal to 9 mol % and less than or equal to 17 mol %.

A seventh aspect A7 includes the glass composition according to the sixth aspect A6, wherein $Li_2O+Na_2O$ is greater than or equal to 10 mol % and less than or equal to 17 mol %.

An eighth aspect A8 includes the glass composition according to any of the first through seventh aspects A1-A7, wherein the glass composition comprises greater than or equal to 0.5 mol % and less than or equal to 5 mol % of the nucleating agent.

An ninth aspect A9 includes the glass composition according to the eighth aspect A8, wherein the glass composition comprises greater than or equal to 1 mol % and less than or equal to 5 mol % of the nucleating agent.

A tenth aspect A10 includes the glass composition according to any of the first through ninth aspects A1-A9, wherein $Al_2O_3$—$R_2O$—RO is greater than or equal to −2 mol %.

An eleventh aspect A11 includes the glass composition according to the tenth aspect A10, wherein $Al_2O_3$—$R_2O$—RO is greater than or equal to −1 mol %.

An twelfth aspect A12 includes the glass composition according to any of the first through the eleventh aspects A1-A11, wherein the glass composition comprises greater than or equal to 10 mol % and less than or equal to 20 mol % $Al_2O_3$.

A thirteenth aspect A13 includes the glass composition according the twelfth aspect A12, wherein the glass composition comprises greater than or equal to 11 mol % and less than or equal to 18 mol % $Al_2O_3$.

A fourteenth aspect A14 includes the glass composition according to any of the first through thirteenth aspects A1-A13, wherein the glass composition comprises greater than or equal to 11 mol % and less than or equal to 17 mol % $B_2O_3$.

A fifteenth aspect A15 includes the glass composition according to the fourteenth aspect A14, wherein the glass composition comprises greater than or equal to 12 mol % and less than or equal to 16 mol % $B_2O_3$.

A sixteenth aspect A16 includes the glass composition according to any of the first through fifteenth aspects A1-A15, wherein the glass composition comprises greater than or equal to 54 mol % and less than or equal to 70 mol % $SiO_2$.

A seventeenth aspect A17 includes the glass composition according to the sixteenth aspect A16, wherein the glass composition comprises greater than or equal to 55 mol % and less than or equal to 70 mol % $SiO_2$.

An eighteenth aspect A18 includes the glass composition according to any of the first through seventeenth aspects A1-A17, wherein the improved $K_{Ic}$ fracture toughness as measured by a chevron notch short bar method is greater than or equal to 0.70 MPa·m$^{1/2}$.

According to a nineteenth aspect A19, a multi-phase glass may comprise: greater than or equal to 53 mol % and less than or equal to 70 mol % $SiO_2$; greater than or equal to 9 mol % and less than or equal to 20 mol % $Al_2O_3$; greater than or equal to 10 mol % and less than or equal to 17.5 mol % $B_2O_3$; greater than or equal to 0 mol % $Li_2O$; greater than or equal to 0 mol % $Na_2O$; and greater than 0.1 mol % of a nucleating agent, the nucleating agent selected from the group consisting of $TiO_2$, $Y_2O_3$, $ZrO_2$, $P_2O_5$, $WO_3$, ZnO, and combinations thereof, wherein: $Li_2O+Na_2O$ is greater than or equal to 8 mol % and less than or equal to 30 mol %; $Al_2O_3$—$R_2O$—RO is greater than or equal to −3 mol %; and the multi-phase glass comprises at least two phases, one of the two phases having a size greater than or equal to 1 nm and less than or equal to 1 μm and a refractive index greater than or equal to 1.4 and less than or equal to 1.6.

A twentieth aspect A20 includes the method according to the nineteenth aspect A19, wherein the at least two phases of the multi-phase glass comprise at least two glass phases.

According to a twenty-first aspect A21, a method of forming a multi-phase glass may comprise: heating a glass composition at an average heating rate greater than or equal to 1° C./min and less than or equal to 500° C./min to a phase separation temperature range to form the multi-phase glass, wherein the glass composition comprises: greater than or equal to 53 mol % and less than or equal to 70 mol % $SiO_2$; greater than or equal to 9 mol % and less than or equal to 20 mol % $Al_2O_3$; greater than or equal to 10 mol % and less than or equal to 17.5 mol % $B_2O_3$; greater than or equal to 0 mol % $Li_2O$; greater than or equal to 0 mol % $Na_2O$; and greater than 0.1 mol % of a nucleating agent, the nucleating agent selected from the group consisting of $TiO_2$, $Y_2O_3$, $ZrO_2$, $P_2O_5$, $WO_3$, ZnO, and combinations thereof, wherein: $Li_2O+Na_2O$ is greater than or equal to 8 mol % and less than or equal to 30 mol %; and $Al_2O_3$—$R_2O$—RO is greater than or equal to −3 mol %; and cooling the multi-phase glass to room temperature.

A twenty-second aspect A22 includes the method according to the twenty-first aspect A21, wherein the multi-phase glass comprises at least two glass phases.

A twenty-third aspect A23 includes the method according to the twenty-first aspect A21 or twenty-second aspect A22, wherein the phase separation temperature range is greater than or equal to 400° C. and less than or equal to 950° C.

A twenty-fourth aspect A24 includes the method according to any of the twenty-first through twenty-third aspects A21-A23, wherein the method further includes, after heating the glass composition to the phase separation temperature range, maintaining the glass composition at the phase separation temperature range for a time greater than or equal to 60 seconds and less than or equal to 48 hours to form the multi-phase glass.

A twenty-fifth aspect A25 includes the method according to the twenty-fourth aspect A24, wherein the method further includes, after maintaining the glass composition at the phase separation temperature range to form the multi-phase glass: cooling the formed multi-phase glass at an average cooling rate greater than or equal to 1° C./min and less than or equal to 500° C./min to the effective annealing temperature of the multi-phase glass±20° C.; and maintaining the multi-phase glass at the effective annealing temperature of the multi-phase glass±20° C. for a time greater than or equal to 15 minutes and less than or equal to 1 hour.

A twenty-sixth aspect A26 includes the method according to any of the twenty-first through twenty third aspects A21-A23, wherein the method further includes, after heating the glass composition to the phase separation temperature range to form the multi-phase glass: cooling the formed multi-phase glass at an average cooling rate greater than or equal to 1° C./min and less than or equal to 500° C./min to the effective annealing temperature of the multi-phase glass±20° C.; and maintaining the multi-phase glass at the effective annealing temperature of the multi-phase glass±20° C. for a time greater than or equal to 15 minutes and less than or equal to 1 hour.

According to a twenty-seventh aspect A27, a method of forming a multi-phase glass may comprise: cooling a formed glass composition at an average cooling rate greater than or equal to 1° C./min and less than or equal to 500° C./min from a forming process temperature to a phase separation temperature range, wherein the formed glass composition comprises: greater than or equal to 53 mol % and less than or equal to 70 mol % $SiO_2$; greater than or equal to 9 mol % and less than or equal to 20 mol % $Al_2O_3$; greater than or equal to 10 mol % and less than or equal to 17.5 mol % $B_2O_3$; greater than or equal to 0 mol % $Li_2O$; greater than or equal to 0 mol % $Na_2O$; and greater than 0.1 mol % of a nucleating agent, the nucleating agent selected from the group consisting of $TiO_2$, $Y_2O_3$, $ZrO_2$, $P_2O_5$, $WO_3$, ZnO, and combinations thereof, wherein: $Li_2O+Na_2O$ is greater than or equal to 8 mol % and less than or equal to 30 mol %; and $Al_2O_3$—$R_2O$—RO is greater than or equal to −3 mol %; and maintaining the formed glass composition at the phase separation temperature range for a time greater than or equal to 60 seconds and less than or equal to 48 hours to form the multi-phase glass; and cooling the multi-phase glass to room temperature.

A twenty-eighth aspect A28 includes the method according to the twenty-seventh aspect A27, wherein the multi-phase glass comprises at least two glass phases.

A twenty-ninth aspect A29 includes the method according to the twenty-seventh aspect A27 or the twenty-eighth aspect A28, wherein the phase separation temperature range is greater than or equal to 400° C. and less than or equal to 950° C.

A thirtieth aspect A30 includes the method according to any of the twenty-seventh through twenty-ninth aspects A27-A29, wherein the method further includes, after maintaining the formed glass composition at the phase separation temperature range to form the multi-phase glass: cooling the formed multi-phase glass at an average cooling rate greater than or equal to 1° C./min and less than or equal to 500° C./min to the effective annealing temperature of the multi-phase glass±20° C.; and maintaining the multi-phase glass at the effective annealing temperature of the multi-phase glass±20° C. for a time greater than or equal to 15 minutes and less than or equal to 1 hour.

Additional features and advantages of the glass compositions described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
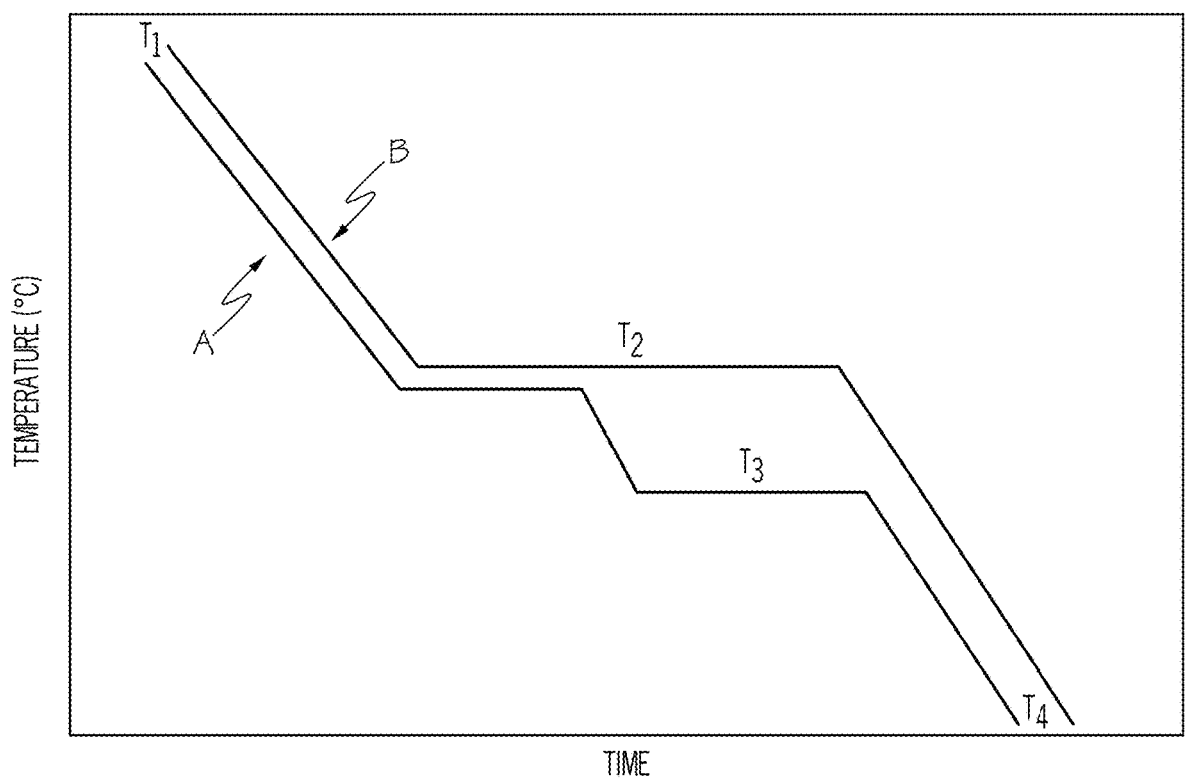
FIG. 1 is a plot of temperature vs. time of exemplary heat treatments to form a multi-phase glass according to one or more embodiments described herein.

Reference will now be made in detail to various embodiments of phase separable glass compositions having improved mechanical durability. According to embodiments, a glass composition includes: greater than or equal to 53 mol % and less than or equal to 70 mol % $SiO_2$; greater than or equal to 9 mol % and less than or equal to 20 mol % $Al_2O_3$; greater than or equal to 10 mol % and less than or equal to 17.5 mol % $B_2O_3$; greater than or equal to 0 mol % $Li_2O$; greater than or equal to 0 mol % $Na_2O$; and greater than 0.1 mol % of a nucleating agent. The nucleating agent is selected from the group consisting of $TiO_2$, $Y_2O_3$, $ZrO_2$, $P_2O_5$, $WO_3$, ZnO, and combinations thereof. The sum of $Li_2O$ and $Na_2O$ in the glass composition may be greater than or equal to 8 mol % and less than or equal to 30 mol %. The amount of $Al_2O_3$ in the glass composition minus the sum of $R_2O$ and RO in the glass composition may be greater than or equal to −3 mol %. The glass composition may be phase separable and may have an improved $K_{Ic}$ fracture toughness. Various embodiments of phase separable glass compositions and methods of making multi-phase glasses will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In the embodiments of the glass compositions described herein, the concentrations of constituent components (e.g., $SiO_2$, $Al_2O_3$, and the like) are specified in mole percent (mol %) on an oxide basis, unless otherwise specified.

The terms "0 mol %" and "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.01 mol %.

The term "fracture toughness," as used herein, refers to the $K_{Ic}$ value, and is measured by the chevron notched short bar method. The chevron notched short bar (CNSB) method is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that Y*m is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992).

X-ray diffraction (XRD) spectrum, as described herein, is measured with a D8 ENDEAVOR X-ray Diffraction system with a LYNXEYE XE-T detector manufactured by Bruker Corporation (Billerica, Mass.). The scanning time of the glass composition sample is set to 15 minutes.

Transmission data (i.e., total transmission), as described herein, is measured with a Lambda 950 UV/Vis Spectrophotometer manufactured by PerkinElmer Inc. (Waltham, Mass. USA). Total transmission is measured on a flat polished glass article to minimize the amount of reflectivity without the use of any coating treatment.

The term "average transmission," as used herein, refers to the average of transmission made within a given wavelength range with each wavelength weighted equally. In the embodiments described herein, the "average transmission" is reported over the wavelength range from 400 nm to 800 nm (inclusive of endpoints).

The term "transparent," when used to describe an article formed of a glass composition herein, means that the glass composition has an average transmission of greater than or equal to 90% when measured at normal incidence for light in a wavelength range from 400 nm to 800 nm (inclusive of endpoints) at an article thickness of 0.6 mm.

The term "transparent haze," when used to describe an article formed of a glass composition herein, means that the glass composition has an average transmission of greater than or equal to 70% and less than 90% when measured at normal incidence for light in a wavelength range from 400 nm to 800 nm (inclusive of endpoints) at an article thickness of 0.6 mm.

The term "translucent," when used to describe an article formed of a glass composition herein, means that the glass composition has an average transmission greater than or equal to 20% and less than 70% when measured at normal incidence for light in a wavelength range from 400 nm to 800 nm (inclusive of endpoints) at an article thickness of 0.6 mm.

The term "opaque," when used to describe an article formed of a glass composition herein, means that the glass composition that has an average transmission less than 20% when measured at normal incidence for light in a wavelength range from 400 nm to 800 nm (inclusive of endpoints) at an article thickness of 0.6 mm.

Electron diffraction images using transmission electron microscopy (TEM), as shown and described herein, are taken within TIA software using a Fishcione annular dark field (ADF) and FEI bright field (BF) detectors at 165 mm camera length. TEM samples are prepared by the in-situ light-out technique inside a Quanta 3d 600 Dual beam FIB/SEM instrument and thinned to TEM electron bean transparency with a 30 keV Ga-ion beam. The final thinning is done at 5 KeV followed by a final polishing step at 2 kEv.

X-ray spectroscopy (EDS), as described herein, is collected using Bruker Esprit software by integrating short exposure (8 µm per pixel) maps for an extended period of total time. EDS data is collected using the nanoprobe TEM configuration of electron optics producing convergent electron probes within 0.05-0.1 nA current (fluorescent screen reading) and about 1 Å in size (50 µm condenser lens aperture, gun lens 3, spot size 6) resulting in electron fluence of about $10^8$ e/Å²/s. Spectra are recorded with enabled sample drift correction.

Electron energy-loss spectroscopy (EELS), as described herein, is collected using spectrum imaging of Digital Micrograph software. EELS spectra are recorded with the same electron optics configuration as in case of EDS, except for lower camera length (i.e., at 32 mm), with the following spectrometer and acquisition parameters: 5 µm entrance aperture, 0.5 eV/ch dispersion resulting in about 2.5 eV energy resolution (ZLP FWHM), SNR mode of the CCD (i.e., 130 vertical binning for faster read out). The electron fluence corresponds to an electron dose of about $10^6$ e/Å² (0.02 s exposure per spectrum).

The viscosity of the glass composition, as described herein, is measured according to ASTM C965-96.

The term "Vogel-Fulcher-Tamman ('VFT') relation," as used herein, described the temperature dependence of the viscosity and is represented by the following equation:

$$\log \eta = A + \frac{B}{T - T_o}$$

where η is viscosity. To determine VFT A, VFT B, and VFT $T_o$, the viscosity of the glass composition is measured over a given temperature range. The raw data of viscosity versus temperature is then fit with the VFT equation by least-squares fitting to obtain A, B, and $T_o$. With these values, a viscosity point (e.g., 200 P Temperature, 35000 P Temperature, and 200000 P Temperature) at any temperature above softening point may be calculated.

The term "melting point," as used herein, refers to the temperature at which the viscosity of the glass composition is 200 poise.

The term "softening point," as used herein, refers to the temperature at which the viscosity of the glass composition is $1\times10^{7.6}$ poise. The softening point is measured according to the parallel plate viscosity method which measures the viscosity of inorganic glass from $10^7$ to $10^9$ poise as a function of temperature, similar to ASTM C1351M.

The terms "annealing point" or "effective annealing temperature" as used herein, refer to the temperature at which the viscosity of the glass composition is $1\times10^{13.18}$ poise. In embodiments, maintaining the glass composition at the effective annealing temperature of the glass composition±20° C. for a time greater than or equal to 15 minutes and less than or equal to 1 hour may relieve internal stresses present in the glass composition and produce a glass article substantially free of stress.

The term "strain point," as used herein, refers to the temperature at which the viscosity of the glass composition is $1\times10^{14.68}$ poise.

Density, as described herein, is measured by the buoyancy method of ASTM C693-93.

The term "CTE," as used herein, refers to the coefficient of thermal expansion of the glass composition at the given temperature (e.g., 50° C., 300° C., or 500° C.).

The term "liquidus viscosity," as used herein, refers to the viscosity of the glass composition at the onset of devitrification (i.e., at the liquidus temperature as determined with the gradient furnace method according to ASTM C829-81).

The term "liquidus temperature," as used herein, refers to the temperature at which the glass composition begins to devitrify as determined with the gradient furnace method according to ASTM C829-81.

The elastic modulus (also referred to as Young's modulus) of the glass composition, as described herein, is provided in units of gigapascals (GPa) and is measured in accordance with ASTM C623.

Shear modulus of the glass composition, as described herein, is provided in units of gigapascals (GPa). The shear modulus of the glass composition is measured in accordance with ASTM C623.

Poisson's ratio, as described herein is measured in accordance with ASTM C623.

Refractive index, as described herein, is measured in accordance with ASTM E1967.

Surface compressive stress is measured with a surface stress meter (FSM) such as commercially available instruments such as the FSM-6000, manufactured by Orihara Industrial Co., Ltd. (Japan). Surface stress measurements rely upon the measurement of the stress optical coefficient (SOC), which is related to the birefringence of the glass-ceramic. SOC, in turn, is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) is also measured with the FSM. The maximum central tension (CT) values are measured using a scattered light polariscope (SCALP) technique known in the art.

The phrase "depth of compression" (DOC), as used herein, refers to the position in the article where compressive stress transitions to tensile stress.

The phrase "phase separation," as used herein, refers to a heat treatment process by which a glass having a single phase separates into two or more distinct phases (i.e., having one or more compositions, amounts, morphologies, sizes or size distributions, etc.). Phase separation may induce spinodal decomposition or nucleation and growth into at least two glass phases, may induce nucleation and growth thereby forming at least one crystalline phase and at least one residual glass phase, or may induce both spinodal decomposition into at least two glass phases and nucleation and growth thereby forming at least one crystalline phase.

The phrase "spinodal decomposition," as used herein, refers to a mechanism by which a single homogenous glass composition can separate uniformly into two or more distinct glass phases with an interconnected microstructure (i.e., having two or more compositions, amounts, morphologies, sizes or size distributions, etc.).

The phrase "nucleation and growth," as used herein, refers to a mechanism by which a single homogenous glass composition can separate into two or more distinct phases in which the secondary phases are discrete and dispersed in the first phase (i.e., having two or more compositions, degree of crystallinity, amounts, morphologies, sizes or size distributions, etc.).

The phrase "phase separable glass composition," as used herein, refers to a glass composition that may separate into at least two glass phases or into at least one glass phase and at least one crystalline phase after being subjected to heat treatment.

The phrase "multi-phase glass," as used herein, refers to a material or article formed from a phase separable glass composition following heat treatment and including at least two glass phases or at least one glass phase and at least one crystalline phase.

The phrases "average heating rate" and "average cooling rate," as used herein, are measured using the total change in temperature recorded by a thermocouple divided by the total time of heating or cooling, respectively.

The term "size," as used herein to describe a phase of the multi-phase glass, refers to the smallest thickness dimension of the phase in any direction as measured using microscopy and measuring the length perpendicular from one phase boundary to the next phase boundary.

The phrase "glass-ceramic", as used herein, refers to a material or article formed from a multi-phase glass following heat treatment and nucleation and growth of a crystalline phase in at least one of the phases present in the multi-phase glass.

Chemical strengthening processes have been used to achieve high strength and high toughness in alkali silicate glasses. The frangibility limit of a chemically strengthened glass is generally controlled by the fracture toughness of the components of the glass. Silica has a relatively low $K_{Ic}$ fracture toughness of 0.7 MPa·m$^{1/2}$, which constrains the $K_{Ic}$ fracture toughness of silicate glasses to be limited to values of about 0.7 MPa·m$^{1/2}$. Particular oxides may increase the fracture toughness (e.g., $ZrO_2$, $Ta_2O_5$, $TiO_2$, $HfO_2$, $La_2O_3$, $Y_2O_3$). However, such oxides may be expensive, thereby increasing the cost of glass articles formed from the glass composition.

The addition of $Al_2O_3$ may increase the fracture toughness of the glass composition, but may cause the liquidus viscosity to decrease, making the glass composition difficult to form. The addition of $B_2O_3$ may also improve fracture toughness of the glass composition. However, the presence $B_2O_3$ may reduce the achievable central tension of the glass composition following ion exchange strengthening of the glass compositions and may lead to volatility issues during the melting and forming processes.

Disclosed herein are glass compositions which mitigate the aforementioned problems. Specifically, the glass compositions disclosed herein comprise a relatively high concentration of $B_2O_3$, relatively high concentration of $Al_2O_3$, and a nucleating agent, which results in phase separable glass compositions that may be subjected to heat treatment to produce transparent or transparent haze, multi-phase glasses having improved fracture toughness.

The glass compositions described herein may be described as aluminoborosilicate glass compositions and comprise $SiO_2$, $Al_2O_3$, $B_2O_3$, and a nucleating agent, such as $TiO_2$, $Y_2O_3$, $ZrO_2$, $P_2O_5$, $WO_3$, and ZnO. In addition to $SiO_2$, $Al_2O_3$, $B_2O_3$, and a nucleating agent, the glass compositions described herein also include alkali oxides, such as $Li_2O$ and $Na_2O$, to enable the ion-exchangeability of the glass compositions.

$SiO_2$ is the primary glass former in the glass compositions described herein and may function to stabilize the network structure of the glass compositions. The concentration of $SiO_2$ in the glass compositions should be sufficiently high (e.g., greater than or equal to 53 mol %) to enhance the chemical durability of the glass composition and, in particular, the resistance of the glass composition to degradation upon exposure to acidic solutions, basic solutions, and in water. The amount of $SiO_2$ may be limited (e.g., to less than or equal to 70 mol %) to control the melting point of the glass composition, as the melting temperature of pure $SiO_2$ or high-$SiO_2$ glasses is undesirably high. Thus, limiting the concentration of $SiO_2$ may aid in improving the meltability and the formability of the glass composition.

Accordingly, in embodiments, the glass composition may comprise greater than or equal to 53 mol % and less than or equal to 70 mol % $SiO_2$. In embodiments, the glass composition may comprise greater than or equal to 54 mol % and less than or equal to 70 mol % $SiO_2$. In embodiments, the glass composition may comprise greater than or equal to 55 mol % and less than or equal to 70 mol % $SiO_2$. In embodiments, the concentration of $SiO_2$ in the glass composition may be greater than or equal to 53 mol %, greater than or equal to 54 mol %, or even greater than or equal to 55 mol %. In embodiments, the concentration of $SiO_2$ in the glass composition may be less than or equal to 70 mol %, less than or equal to 67 mol %, less than or equal to 65 mol %, less than or equal to 63 mol %, or even less than or equal to 60 mol %. In embodiments, the concentration of $SiO_2$ in the glass composition may be greater than or equal to 53 mol % and less than or equal to 70 mol %, greater than or equal to 54 mol % and less than or equal to 70 mol %, greater than or equal to 55 mol % and less than or equal to 70 mol %, greater than or equal to 53 mol % and less than or equal to 67 mol %, greater than or equal to 54 mol % and less than or equal to 67 mol %, greater than or equal to 55 mol % and less than or equal to 67 mol %, greater than or equal to 53 mol % and less than or equal to 65 mol %, greater than or equal to 54 mol % and less than or equal to 65 mol %, greater than or equal to 55 mol % and less than or equal to 65 mol %, greater than or equal to 53 mol % and less than or equal to 63 mol %, greater than or equal to 54 mol % and less than or equal to 63 mol %, greater than or equal to 55 mol % and less than or equal to 63 mol %, greater than or equal to 53 mol % and less than or equal to 60 mol %, greater than or equal to 54 mol % and less than or equal to 60 mol %, or even greater than or equal to 55 mol % and less than or equal to 60 mol %, or any and all sub-ranges formed from any of these endpoints.

Like $SiO_2$, $Al_2O_3$ may also stabilize the glass network and additionally provides improved mechanical properties and chemical durability to the glass composition. The amount of $Al_2O_3$ may also be tailored to the control the viscosity and phase separation of the glass composition. The concentration of $Al_2O_3$ should be sufficiently high (e.g., greater than or equal to 9 mol %) to enable the development of multiple phases through phase separation. However, if the amount of $Al_2O_3$ is too high, the viscosity of the melt may increase diminishing the formability of the glass composition. In embodiments, the glass composition may comprise greater than or equal to 9 mol % and less than or equal to 20 mol % $Al_2O_3$. In embodiments, the glass composition may comprise greater than or equal to 10 mol % and less than or equal to 20 mol % $Al_2O_3$. In embodiments, the glass composition may comprise greater than or equal to 11 mol % and less than or equal to 18 mol % $Al_2O_3$. In embodiments, the concentration of $Al_2O_3$ in the glass composition may be greater than or equal to 9 mol %, greater than or equal to 10 mol %, or even greater than or equal to 11 mol %. In embodiments, the concentration of $Al_2O_3$ in the glass composition may be less than or equal 20 mol %, less than or equal to 18 mol %, less than or equal to 15 mol %, or even less than or equal to 14 mol %. In embodiments, the concentration of $Al_2O_3$ in the glass composition may be greater than or equal 9 mol % and less than or equal to 20 mol %, greater than or equal to 10 mol % and less than or equal to 20 mol %, greater than or equal to 11 mol % and less than or equal to 20 mol %, greater than or equal 9 mol % and less than or equal to 18 mol %, greater than or equal to 10 mol % and less than or equal to 18 mol %, greater than or equal to 11 mol % and less than or equal to 18 mol %, greater than or equal 9 mol % and less than or equal to 15 mol %, greater than or equal to 10 mol % and less than or equal to 15 mol %, greater than or equal to 11 mol % and less than or equal to 15 mol %, greater than or equal 9 mol % and less than or equal to 14 mol %, greater than or equal to 10 mol % and less than or equal to 14 mol %, or even greater than or equal to 11 mol % and less than or equal to 14 mol %, or any and all sub-ranges formed from any of these endpoints.

$B_2O_3$ decreases the melting temperature of the glass composition. Furthermore, the addition of $B_2O_3$ in the glass composition helps achieve an interlocking crystal microstructure when the glass compositions are cerammed. In addition, $B_2O_3$ may also improve the damage resistance of the glass composition. When boron in the residual glass present after ceramming is not charge balanced by alkali oxides or divalent cation oxides (such as MgO, CaO, SrO, BaO, and ZnO), the boron will be in a trigonal-coordination state (or three-coordinated boron), which opens up the structure of the glass. The network around these three-coordinated boron atoms is not as rigid as tetrahedrally coordinated (or four-coordinated) boron. Without being bound by theory, it is believed that glass compositions that include three-coordinated boron can tolerate some degree of deformation before crack formation compared to four-coordinated boron. By tolerating some deformation, the Vickers indentation crack initiation threshold values increase. Fracture toughness of the glass compositions that include three-coordinated boron may also increase. The concentration of $B_2O_3$ should be sufficiently high (e.g., greater than or equal to 10 mol %) to enable the development of multiple phases through phase separation. However, if $B_2O_3$ is too high, the chemical durability and liquidus viscosity may suffer and the evaporation during melting becomes difficult to control. Therefore, the amount of $B_2O_3$ may be limited (e.g., less than or equal to 17.5 mol %) to maintain chemical durability and manufacturability of the glass composition.

In embodiments, the glass composition may comprise greater than or equal to 10 mol % and less than or equal to 17.5 mol % $B_2O_3$. In embodiments, the glass composition may comprise greater than or equal to 11 mol % and less than or equal to 17 mol % $B_2O_3$. In embodiments, the glass composition may comprise greater than or equal to 12 mol % and less than or equal to 16 mol % $B_2O_3$. In embodiments, the concentration of $B_2O_3$ in the glass composition may be greater than or equal to 10 mol %, greater than or equal to 11 mol %, or even greater than or equal to 12 mol %. In embodiments, the concentration of $B_2O_3$ in the glass composition may be less than or equal to 17.5 mol %, less than or equal to 17 mol %, less than or equal to 16 mol %, or even less than or equal to 15 mol %. In embodiments the concentration of $B_2O_3$ in the glass composition may be greater than or equal to 10 mol % and less than or equal to 17.5 mol %, greater than or equal to 11 mol % and less than or equal to 17.5 mol %, greater than or equal to 12 mol % and less than or equal to 17.5 mol %, greater than or equal to 10 mol % and less than or equal to 17 mol %, greater than or equal to 11 mol % and less than or equal to 17 mol %, greater than or equal to 12 mol % and less than or equal to 17 mol %, greater than or equal to 10 mol % and less than or equal to 16 mol %, greater than or equal to 11 mol % and less than or equal to 16 mol %, greater than or equal to 12 mol % and less than or equal to 16 mol %, greater than or equal to 10 mol % and less than or equal to 15 mol %, greater than or equal to 11 mol % and less than or equal to 15 mol %, or even greater than or equal to 12 mol % and less than or equal to 15 mol %, or any and all sub-ranges formed from any of these endpoints.

The glass compositions described herein include a relatively high concentration of $Al_2O_3$ and a relatively high concentration of $B_2O_3$, which may enable the glass compositions to phase separate (i.e., the glass compositions are "phase separable"). In embodiments, the total amount of $Al_2O_3$ and $B_2O_3$ in the glass composition may be greater than or equal to 15 mol % such that the glass is phase separable. The total amount of $Al_2O_3$ and $B_2O_3$ in the glass composition may be limited (e.g., less than or equal to 31 mol %) to control the liquidus temperature of the glass composition, as an increased total amount of $Al_2O_3$ and $B_2O_3$ may increase the liquidus temperature. An increased liquidus temperature decreases the liquidus viscosity and stability of the glass composition so that the glass composition may no longer be suitable for downdrawing or fusion forming processes.

In embodiments, the total amount of $Al_2O_3$ and $B_2O_3$ in the glass composition (i.e., $Al_2O_3+B_2O_3$) may be greater than or equal to 15 mol % and less than or equal to 31 mol %. In embodiments, the total amount of $Al_2O_3$ and $B_2O_3$ in the glass composition may be greater than or equal to 20 mol % and less than or equal to 31 mol %. In embodiments, the total amount of $Al_2O_3$ and $B_2O_3$ in the glass composition may be greater than or equal to 22 mol % and less than or equal to 29 mol %. In embodiments, the total amount of $Al_2O_3$ and $B_2O_3$ in the glass composition may be greater than or equal to 15 mol %, greater than or equal to 20 mol %, greater than or equal to 22 mol %, greater than or equal to 24 mol %, or even greater than or equal to 26 mol %. In embodiments, the total amount of $Al_2O_3$ and $B_2O_3$ in the glass composition may be less than or equal to 31 mol %, less than or equal to 30 mol %, or even less than or equal to 29 mol %. In embodiments, the total amount of $Al_2O_3$ and $B_2O_3$ in the glass composition may be greater than or equal to 15 mol % and less than or equal to 31 mol %, greater than or equal to 20 mol % and less than or equal to 31 mol %, greater than or equal to 22 mol % and less than or equal to 31 mol %, greater than or equal to 24 mol % and less than or equal to 31 mol %, greater than or equal to 26 mol % and less than or equal to 31 mol %, greater than or equal to 15 mol % and less than or equal to 30 mol %, greater than or equal to 20 mol % and less than or equal to 30 mol %, greater than or equal to 22 mol % and less than or equal to 30 mol %, greater than or equal to 24 mol % and less than or equal to 30 mol %, greater than or equal to 26 mol % and less than or equal to 30 mol %, greater than or equal to 15 mol % and less than or equal to 29 mol %, greater than or equal to 20 mol % and less than or equal to 29 mol %, greater than or equal to 22 mol % and less than or equal to 29 mol %, greater than or equal to 24 mol % and less than or equal to 29 mol %, or even greater than or equal to 26 mol % and less than or equal to 29 mol %, or any and all sub-ranges formed from any of these endpoints.

In addition to a higher concentration of $Al_2O_3$ and $B_2O_3$, the nucleating agent functions to promote phase separation of the glass composition. The nucleating agent also aids in size distribution to help promote uniform phase separation. Accordingly, the nucleating agent should be present in the glass composition in an amount greater than or equal to 0.1 mol % to promote phase separation of the glass composition. If the concentration of the nucleating agent is too high (e.g., greater than 5 mol %), then the glass composition may phase separate uncontrollably due to the effect on the liquidus temperature. The addition of a nucleating agent may also increase the fracture toughness of the glass composition. In embodiments, the nucleating agent may be selected from the group consisting of $TiO_2$, $Y_2O_3$, $ZrO_2$, $P_2O_5$, $WO_3$, $ZnO$, and combinations thereof. In embodiments, the glass composition may comprise greater than or equal to 0.1 mol % of the nucleating agent. In embodiments, the glass composition may comprise greater than or equal to 0.5 mol % of the nucleating agent. In embodiments, the glass composition may comprise greater than or equal to 0.5 mol % and less than or equal to 5 mol % of the nucleating agent. In embodiments, the glass composition may comprise greater than or equal to 1 mol % and less than or equal to 5 mol % of the nucleating agent. In embodiments, the concentration of the nucleating agent in the glass composition may be greater than or equal to 0.1 mol %, greater than or equal to 0.5 mol %, or even greater than or equal to 1 mol %. In embodiments, the concentration of the nucleating agent in the glass composition may be less than or equal to 5 mol %, less than or equal to 4.5 mol %, or even less than or equal to 4 mol %. In embodiments, the concentration of the nucleating agent in the glass composition may be greater than or equal to 0.1 mol % and less than or equal to 5 mol %, greater than or equal to 0.5 mol % and less than or equal to 5 mol %, greater than or equal to 1 mol % and less than or equal to 5 mol %, greater than or equal to 0.1 mol % and less than or equal to 4.5 mol %, greater than or equal to 0.5 mol % and less than or equal to 4.5 mol %, greater than or equal to 1 mol % and less than or equal to 4.5 mol %, greater than or equal to 0.1 mol % and less than or equal to 4 mol %, greater than or equal to 0.5 mol % and less than or equal to 4 mol %, or even greater than or equal to 1 mol % and less than or equal to 4 mol %, or any and all sub-ranges formed from any of these endpoints.

As described hereinabove, the glass compositions may contain alkali oxides, such as $Li_2O$ and $Na_2O$, to enable the ion-exchangeability of the glass compositions. $Li_2O$ aids in the ion exchangeability of the glass composition and also reduces the softening point of the glass composition thereby increasing the formability of the glass. In embodiments, the glass composition may comprise greater than or equal to 0 mol % $Li_2O$. In embodiments, the concentration of $Li_2O$ in the glass composition may be greater than or equal to 0 mol %, greater than or equal to 1 mol %, greater than or equal to 3 mol %, greater than or equal to 5 mol %, greater than or equal to 7 mol %, greater than or equal to 8 mol %, or even greater than or equal to 9 mol %. In embodiments, the concentration of $Li_2O$ in the glass composition may be less than or equal to 30 mol %, less than or equal to 20 mol %, less than or equal to 15 mol %, or even less than or equal to 12 mol %. In embodiments, the concentration of $Li_2O$ in the glass composition may be greater than or equal to 0 mol % and less than or equal to 30 mol %, greater than or equal to 1 mol % and less than or equal to 30 mol %, greater than or equal to 3 mol % and less than or equal to 30 mol %, greater than or equal to 5 mol % and less than or equal to 30 mol %, greater than or equal to 7 mol % and less than or equal to 30 mol %, greater than or equal to 8 mol % and less than or equal to 30 mol %, greater than or equal to 9 mol % and less than or equal to 30 mol %, greater than or equal to 0 mol % and less than or equal to 20 mol %, greater than or equal to 1 mol % and less than or equal to 20 mol %, greater than or equal to 3 mol % and less than or equal to 20 mol %, greater than or equal to 5 mol % and less than or equal to 20 mol %, greater than or equal to 7 mol % and less than or equal to 20 mol %, greater than or equal to 8 mol % and less than or equal to 20 mol %, greater than or equal to 9 mol % and less than or equal to 20 mol %, greater than or equal to 0 mol % and less than or equal to 15 mol %, greater than or equal to 1 mol % and less than or equal to 15 mol %, greater than or equal to 3 mol % and less than or equal to 15 mol %, greater than or equal to 5 mol % and less than or equal to 15 mol %, greater than or equal to 7 mol % and less than or equal to 15 mol %, greater than or equal to 8 mol % and less than or equal to 15 mol %, greater than or equal to 9 mol % and less than or equal to 15 mol %, greater than or equal to 0 mol % and less than or equal to 12 mol %, greater than or equal to 1 mol % and less than or equal to 12 mol %, greater than or equal to 3 mol % and less than or equal to 12 mol %, greater than or equal to 5 mol % and less than or equal to 12 mol %, greater than or equal to 7 mol % and less than or equal to 12 mol %, greater than or equal to 8 mol % and less than or equal to 12 mol %, or even greater than or equal to 9 mol % and less than or equal to 12 mol %, or any and all sub-ranges formed from any of these endpoints.

In addition to aiding in ion exchangeability of the glass composition, $Na_2O$ decreases the melting point and improves formability of the glass composition. However, if too much $Na_2O$ is added to the glass composition, the melting point may be too low. As such, in embodiments, the concentration of $Li_2O$ present in the glass composition may be greater than the concentration of $Na_2O$ present in the glass composition. In embodiments, the glass composition may comprise greater than or equal to 0 mol % $Na_2O$. In embodiments, the concentration of $Na_2O$ in the glass composition may be greater than or equal to 0 mol %, greater than or equal to 0.5 mol %, greater than or equal to 1 mol %, or even greater than or equal to 1.5 mol %. In embodiments, the concentration of $Na_2O$ in the glass composition may be less than or equal to 30 mol %, less than or equal to 20 mol %, less than or equal to 10 mol %, less than or equal to 5 mol %, or even less than or equal to 3 mol %. In embodiments, the concentration of $Na_2O$ in the glass composition may be greater than or equal to 0 mol % and less than or equal to 30 mol %, greater than or equal to 0.5 mol % and less than or equal to 30 mol %, greater than or equal to 1 mol % and less than or equal to 30 mol %, greater than or equal to 1.5 mol % and less than or equal to 30 mol %, greater than or equal to 0 mol % and less than or equal to 20 mol %, greater than or equal to 0.5 mol % and less than or equal to 20 mol %, greater than or equal to 1 mol % and less than or equal to 20 mol %, greater than or equal to 1.5 mol % and less than or equal to 20 mol %, greater than or equal to 0 mol % and less than or equal to 10 mol %, greater than or equal to 0.5 mol % and less than or equal to 10 mol %, greater than or equal to 1 mol % and less than or equal to 10 mol %, greater than or equal to 1.5 mol % and less than or equal to 10 mol %, greater than or equal to 0 mol % and less than or equal to 5 mol %, greater than or equal to 0.5 mol % and less than or equal to 5 mol %, greater than or equal to 1 mol % and less than or equal to 5 mol %, greater than or equal to 1.5 mol % and less than or equal to 5 mol %, greater than or equal to 0 mol % and less than or equal to 3 mol %, greater than or equal to 0.5 mol % and less than or equal to 3 mol %, greater than or equal to 1 mol % and less than or equal to 3 mol %, or even greater than or equal to 1.5 mol % and less than or equal to 3 mol %, or any and all sub-ranges formed from any of these endpoints.

The total amount of $Li_2O$ and $Na_2O$ in the glass composition may be controlled to regulate the ion exchange process. In embodiments, the total amount of $Li_2O$ and $Na_2O$ in the glass composition (i.e., $Li_2O+Na_2O$) in the glass composition may be greater than or equal to 8 mol % and less than or equal to 30 mol %. In embodiments, the total amount of $Li_2O$ and $Na_2O$ in the glass composition may be greater than or equal to 9 mol % and less than or equal to 17 mol %. In embodiments, the total amount of $Li_2O$ and $Na_2O$ in the glass composition may be greater than or equal to 10 mol % and less than or equal to 17 mol %. In embodiments, the total amount of $Li_2O$ and $Na_2O$ in the glass composition may be greater than or equal to 8 mol %, greater than or equal to 9 mol %, or even greater than or equal to 10 mol %. In embodiments, the total amount of $Li_2O$ and $Na_2O$ in the glass composition may be less than or equal to 30 mol %, less than or equal to 20 mol %, less than or equal to 17 mol %, less than or equal to 15 mol %, or even less than or equal to 13 mol %. In embodiments, the total amount of $Li_2O$ and $Na_2O$ in the glass composition may be greater than or equal to 8 mol % and less than or equal to 30 mol %, greater than or equal to 9 mol % and less than or equal to 30 mol %, greater than or equal to 10 mol % and less than or equal to 30 mol %, greater than or equal to 8 mol % and less than or equal to 20 mol %, greater than or equal to 9 mol % and less than or equal to 20 mol %, greater than or equal to 10 mol % and less than or equal to 20 mol %, greater than or equal to 8 mol % and less than or equal to 17 mol %, greater than or equal to 9 mol % and less than or equal to 17 mol %, greater than or equal to 10 mol % and less than or equal to 17 mol %, greater than or equal to 8 mol % and less than or equal to 15 mol %, greater than or equal to 9 mol % and less than or equal to 15 mol %, greater than or equal to 10 mol % and less than or equal to 15 mol %, greater than or equal to 8 mol % and less than or equal to 13 mol %, greater than or equal to 9 mol % and less than or equal to 13 mol %, or even greater than or equal to 10 mol % and less than or equal to 13 mol %, or any and all sub-ranges formed from any of these endpoints.

The glass compositions described herein may further comprise alkali metal oxides other than $Li_2O$ and $Na_2O$, such as $K_2O$. $K_2O$ promotes ion exchange to increase the depth of compression and decreases the melting point to improve formability of the glass composition. However, adding $K_2O$ may cause the surface compressive stress and melting point to be too low. In embodiments, the concentration of K$_2$O in the glass composition may be greater than or equal to 0 mol % or even greater than or equal to 0.1 mol %. In embodiments, the concentration of K$_2$O in the glass composition may be less than or equal to 5 mol %, less than or equal to 3 mol %, less than or equal to 1 mol %, or even less than or equal to 0.5 mol %. In embodiments, the concentration of K$_2$O in the glass composition may be greater than or equal to 0 mol % and less than or equal to 5 mol %, greater than or equal to 0.1 mol % and less than or equal to 5 mol %, greater than or equal to 0 mol % and less than or equal to 3 mol %, greater than or equal to 0.1 mol % and less than or equal to 3 mol %, greater than or equal to 0 mol % and less than or equal to 1 mol %, greater than or equal to 0.1 mol % and less than or equal to 1 mol %, greater than or equal to 0 mol % and less than or equal to 0.5 mol %, or even greater than or equal to 0.1 mol % and less than or equal to 0.5 mol %, or any and all sub-ranges formed from any of these endpoints.

The sum of all alkali oxides is expressed herein as R$_2$O. Specifically, R$_2$O is the sum (in mol %) of Li$_2$O, Na$_2$O, and K$_2$O present in the glass composition. Like B$_2$O$_3$, the alkali oxides aid in decreasing the softening point and molding temperature of the glass composition, thereby offsetting the increase in the softening point and molding temperature of the glass composition due to higher amounts of SiO$_2$ in the glass composition. The decrease in the softening point and molding temperature may be further reduced by including combinations of alkali oxides (e.g., two or more alkali oxides) in the glass composition, a phenomenon referred to as the "mixed alkali effect." However, it has been found that if the amount of alkali oxide is too high, the average coefficient of thermal expansion of the glass composition increases to greater than 100×10$^{-7}$/° C., which may be undesirable.

In embodiments, the concentration of R$_2$O in the glass composition may be greater than or equal to 0 mol %, greater than or equal to 5 mol %, greater than or equal to 7 mol %, greater than or equal to 9 mol %, or even greater than or equal to 10 mol %. In embodiments, the concentration of R$_2$O in the glass composition may be less than or equal to 30 mol %, less than or equal to 20 mol %, less than or equal to 15 mol %, or even less than or equal to 13 mol %. In embodiments, the concentration of R$_2$O in the glass composition may be greater than or equal to 0 mol % and less than or equal to 30 mol %, greater than or equal to 5 mol % and less than or equal to 30 mol %, greater than or equal to 7 mol % and less than or equal to 30 mol %, greater than or equal to 9 mol % and less than or equal to 30 mol %, greater than or equal to 10 mol % and less than or equal to 30 mol %, greater than or equal to 0 mol % and less than or equal to 20 mol %, greater than or equal to 5 mol % and less than or equal to 20 mol %, greater than or equal to 7 mol % and less than or equal to 20 mol %, greater than or equal to 9 mol % and less than or equal to 20 mol %, greater than or equal to 10 mol % and less than or equal to 20 mol %, greater than or equal to 0 mol % and less than or equal to 15 mol %, greater than or equal to 5 mol % and less than or equal to 15 mol %, greater than or equal to 7 mol % and less than or equal to 15 mol %, greater than or equal to 9 mol % and less than or equal to 15 mol %, greater than or equal to 10 mol % and less than or equal to 15 mol %, greater than or equal to 0 mol % and less than or equal to 13 mol %, greater than or equal to 5 mol % and less than or equal to 13 mol %, greater than or equal to 7 mol % and less than or equal to 13 mol %, greater than or equal to 9 mol % and less than or equal to 13 mol %, or even greater than or equal to 10 mol % and less than or equal to 13 mol %, or any and all sub-ranges formed from any of these endpoints.

The glass compositions described herein may further comprise MgO. MgO lowers the viscosity of the glass compositions, which enhances the formability, the strain point, and the Young's modulus, and may improve the ion exchangeability. However, when too much MgO is added to the glass composition, there is a significant decrease in the diffusivity of sodium and potassium ions in the glass composition which, in turn, adversely impacts the ion exchange performance of the resultant glass. In embodiments, the concentration of MgO in the glass composition may be greater than or equal to 0 mol %, greater than or equal to 0.1 mol %, greater than or equal to 0.5 mol %, or even greater than or equal to 1 mol %. In embodiments, the concentration of MgO in the glass composition may be less than or equal to 10 mol %, less than or equal to 5 mol %, or even less than or equal to 3 mol %. In embodiments, the concentration of MgO in the glass composition may be greater than or equal to 0 mol % and less than or equal to 10 mol %, greater than or equal to 0.1 mol % and less than or equal to 10 mol %, greater than or equal to 0.5 mol % and less than or equal to 10 mol %, greater than or equal to 1 mol % and less than or equal to 10 mol %, greater than or equal to 0 mol % and less than or equal to 5 mol %, greater than or equal to 0.1 mol % and less than or equal to 5 mol %, greater than or equal to 0.5 mol % and less than or equal to 10 mol %, greater than or equal to 1 mol % and less than or equal to 5 mol %, greater than or equal to 0 mol % and less than or equal to 3 mol %, greater than or equal to 0.1 mol % and less than or equal to 3 mol %, greater than or equal to 0.5 mol % and less than or equal to 3 mol %, or even greater than or equal to 1 mol % and less than or equal to 3 mol %, or any and all sub-ranges formed from any of these endpoints. In embodiments, the glass composition may be substantially free of MgO.

The glass compositions described herein may further comprise CaO. CaO lowers the viscosity of a glass composition, which enhances the formability, the strain point and the Young's modulus, and may improve the ion exchangeability. However, when too much CaO is added to the glass composition, there is a significant decrease in the diffusivity of sodium and potassium ions in the glass composition which, in turn, adversely impacts the ion exchange performance of the resultant glass. In embodiments, the concentration of CaO in the glass composition may be greater than or equal to 0 mol %, greater than or equal to 0.1 mol %, greater than or equal to 0.5 mol %, or even greater than or equal to 1 mol %. In embodiments, the concentration of CaO in the glass composition may be less than or equal to 10 mol %, less than or equal to 5 mol %, or even less than or equal to 3 mol %. In embodiments, the concentration of CaO in the glass composition may be greater than or equal to 0 mol % and less than or equal to 10 mol %, greater than or equal to 0.1 mol % and less than or equal to 10 mol %, greater than or equal to 0.5 mol % and less than or equal to 10 mol %, greater than or equal to 1 mol % and less than or equal to 10 mol %, greater than or equal to 0 mol % and less than or equal to 5 mol %, greater than or equal to 0.1 mol % and less than or equal to 5 mol %, greater than or equal to 0.5 mol % and less than or equal to 10 mol %, greater than or equal to 1 mol % and less than or equal to 5 mol %, greater than or equal to 0 mol % and less than or equal to 3 mol %, greater than or equal to 0.1 mol % and less than or equal to 3 mol %, greater than or equal to 0.5 mol % and less than or equal to 3 mol %, or even greater than or equal to 1 mol % and less than or equal to 3 mol %, or any and all sub-ranges formed from any of these endpoints. In embodiments, the glass composition may be substantially free of CaO.

In embodiments, the glass compositions described herein may further comprise divalent cation oxides. The sum of all divalent cation oxides is expressed herein as RO. Specifically, RO is the sum (in mol %) of MgO, CaO, SrO, BaO, and ZnO. The concentration of RO in the glass composition may be limited (e.g., less than or equal to 10 mol %) to enable relatively fast ion exchange. In embodiments, the concentration of RO in the glass composition may be greater than or equal to 0 mol %, greater than or equal to 0.1 mol %, greater than or equal to 0.5 mol %, or even greater than or equal to 1 mol %. In embodiments, the concentration of RO in the glass composition may be less than or equal to 10 mol %, less than or equal to 5 mol %, or even less than or equal to 3 mol %. In embodiments, the concentration of RO in the glass composition may be greater than or equal to 0 mol % and less than or equal to 10 mol %, greater than or equal to 0.1 mol % and less than or equal to 10 mol %, greater than or equal to 0.5 mol % and less than or equal to 10 mol %, greater than or equal to 1 mol % and less than or equal to 10 mol %, greater than or equal to 0 mol % and less than or equal to 5 mol %, greater than or equal to 0.1 mol % and less than or equal to 5 mol %, greater than or equal to 0.5 mol % and less than or equal to 10 mol %, greater than or equal to 1 mol % and less than or equal to 5 mol %, greater than or equal to 0 mol % and less than or equal to 3 mol %, greater than or equal to 0.1 mol % and less than or equal to 3 mol %, greater than or equal to 0.5 mol % and less than or equal to 3 mol %, or even greater than or equal to 1 mol % and less than or equal to 3 mol %, or any and all sub-ranges formed from any of these endpoints. In embodiments, the glass composition may be substantially free of RO.

In embodiments the total amount of alkali oxides and divalent cation oxides (i.e., $R_2O+RO$) may be limited to enable phase separation in the glass composition. While not wishing to be bound by theory, when too much $R_2O$ and RO is present in the glass composition, the glass composition may be too stable to phase separate. In embodiments, the total amount of $R_2O$ and RO in the glass composition may be greater than or equal to 0 mol %, greater than or equal to 5 mol %, greater than or equal to 7 mol %, greater than or equal to 9 mol %, or even greater than or equal to 10 mol %. In embodiments, the total amount of $R_2O$ and RO in the glass composition may be less than or equal to 30 mol %, less than or equal to 20 mol %, less than or equal to 15 mol %, or even less than or equal to 13 mol %. In embodiments, the total amount of $R_2O$ and RO in the glass composition may be greater than or equal to 0 mol % and less than or equal to 30 mol %, greater than or equal to 5 mol % and less than or equal to 30 mol %, greater than or equal to 7 mol % and less than or equal to 30 mol %, greater than or equal to 9 mol % and less than or equal to 30 mol %, greater than or equal to 10 mol % and less than or equal to 30 mol %, greater than or equal to 0 mol % and less than or equal to 20 mol %, greater than or equal to 5 mol % and less than or equal to 20 mol %, greater than or equal to 7 mol % and less than or equal to 20 mol %, greater than or equal to 9 mol % and less than or equal to 20 mol %, greater than or equal to 10 mol % and less than or equal to 20 mol %, greater than or equal to 0 mol % and less than or equal to 15 mol %, greater than or equal to 5 mol % and less than or equal to 15 mol %, greater than or equal to 7 mol % and less than or equal to 15 mol %, greater than or equal to 9 mol % and less than or equal to 15 mol %, greater than or equal to 10 mol % and less than or equal to 15 mol %, greater than or equal to 0 mol % and less than or equal to 13 mol %, greater than or equal to 5 mol % and less than or equal to 13 mol %, greater than or equal to 7 mol % and less than or equal to 13 mol %, greater than or equal to 9 mol % and less than or equal to 13 mol %, or even greater than or equal to 10 mol % and less than or equal to 13 mol %, or any and all sub-ranges formed from any of these endpoints.

In embodiments, the glass composition is peraluminous (i.e., the amount of $Al_2O_3$ in the glass composition is greater than the sum of $R_2O$ and RO), which may increase the fracture toughness of the glass composition such that the glass compositions are more resistant to damage. In embodiments, the amount of $Al_2O_3$ minus the sum of $R_2O$ and RO (i.e., $Al_2O_3$—$R_2O$—RO) (in mol %) in the glass composition may be greater than or equal to $-3$ mol %, greater than or equal to $-2$ mol %, greater than or equal to $-1$ mol %, or even greater than or equal to 0 mol %. In embodiments, the amount of $Al_2O_3$ minus the sum of $R_2O$ and RO (i.e., $Al_2O_3$—$R_2O$—RO) (in mol %) in the glass composition may be less than or equal to 4 mol %, less than or equal to 3 mol %, or even less than or equal to 2.5 mol %. In embodiments, the amount of $Al_2O_3$ minus the sum of $R_2O$ and RO (i.e., $Al_2O_3$—$R_2O$—RO) (in mol %) in the glass composition may be greater than or equal to $-3$ mol % and less than or equal to 4 mol %, greater than or equal to $-3$ mol % and less than or equal to 3 mol %, greater than or equal to $-3$ mol % and less than or equal to 2.5 mol %, greater than or equal to $-2$ mol % and less than or equal to 4 mol %, greater than or equal to $-2$ mol % and less than or equal to 3 mol %, greater than or equal to $-2$ mol % and less than or equal to 2.5 mol %, greater than or equal to $-1$ mol % and less than or equal to 4 mol %, greater than or equal to $-1$ mol % and less than or equal to 3 mol %, greater than or equal to $-1$ mol % and less than or equal to 2.5 mol %, greater than or equal to 0 mol % and less than or equal to 4 mol %, greater than or equal to 0 mol % and less than or equal to 3 mol %, or even greater than or equal to 0 mol % and less than or equal to 2.5 mol %, or any and all sub-ranges formed from any of these endpoints.

In embodiments, the glass compositions described herein may further include one or more fining agents. In embodiments, the fining agents may include, for example, $SnO_2$. In embodiments, the concentration of $SnO_2$ in the glass composition may be greater than or equal to 0 mol %. In embodiments, the concentration of $SnO_2$ in the glass composition may be less than or equal to 1 mol %, less than or equal to 0.5 mol %, less than or equal to 0.4 mol %, less than or equal to 0.3 mol %, less than or equal to 0.2 mol %, or even less than or equal to 0.1 mol %. In embodiments, the concentration of $SnO_2$ in the glass composition may be greater than or equal to 0 mol % and less than or equal to 1 mol %, greater than or equal to 0 mol % and less than or equal to 0.5 mol %, greater than or equal to 0 mol % and less than or equal to 0.4 mol %, greater than or equal to 0 mol % and less than or equal to 0.3 mol %, greater than or equal to 0 mol % and less than or equal to 0.2 mol %, or even greater than or equal to 0 mol % and less than or equal to 0.1 mol %, or any and all sub-ranges formed from any of these endpoints. In embodiments, the glass composition may be substantially free of $SnO_2$.

In embodiments, the glass compositions described herein may further include tramp materials such as FeO, MnO, $MoO_3$, $La_2O_3$, CdO, $As_2O_3$, $Sb_2O_3$, sulfur-based compounds, such as sulfates, halogens, or combinations thereof.

In embodiments, the glass composition may comprise: greater than or equal to 53 mol % and less than or equal to 70 mol % $SiO_2$; greater than or equal to 9 mol % and less than or equal to 20 mol % $Al_2O_3$; greater than or equal to 10 mol % and less than or equal to 17.5 mol % $B_2O_3$; greater than or equal to 0 mol % $Li_2O$; greater than or equal to 0 mol % $Na_2O$; and greater than 0.1 mol % of a nucleating agent, the nucleating agent selected from the group consisting of $TiO_2$, $Y_2O_3$, $ZrO_2$, $P_2O_5$, $WO_3$, ZnO, and combinations thereof, wherein: $Li_2O+Na_2O$ is greater than or equal to 8 mol % and less than or equal to 30 mol %; $Al_2O_3—R_2O—RO$ is greater than or equal to −3 mol %.

The articles formed from the glass compositions described herein may be any suitable shape or thickness, which may vary depending on the particular application for use of the glass composition. Glass sheet embodiments may have a thickness greater than or equal to 30 μm, greater than or equal to 50 μm, greater than or equal to 100 μm, greater than or equal to 250 μm, greater than or equal to 500 μm, greater than or equal to 750 μm, or even greater than or equal to 1 mm. In embodiments, the glass sheet embodiments may have a thickness less than or equal to 6 mm, less than or equal to 5 mm, less than or equal to 4 mm, less than or equal to 3 mm, or even less than or equal to 2 mm. In embodiments, the glass sheet embodiments may have a thickness greater than or equal to 30 μm and less than or equal to 6 mm, greater than or equal to 30 μm and less than or equal to 5 mm, greater than or equal to 30 μm and less than or equal to 4 mm, greater than or equal to 30 μm and less than or equal to 3 mm, greater than or equal to 30 μm and less than or equal to 2 mm, greater than or equal to 50 μm and less than or equal to 6 mm, greater than or equal to 50 μm and less than or equal to 5 mm, greater than or equal to 50 μm and less than or equal to 4 mm, greater than or equal to 50 μm and less than or equal to 3 mm, greater than or equal to 50 μm and less than or equal to 2 mm, greater than or equal to 100 μm and less than or equal to 6 mm, greater than or equal to 100 μm and less than or equal to 5 mm, greater than or equal to 100 μm and less than or equal to 4 mm, greater than or equal to 100 μm and less than or equal to 3 mm, greater than or equal to 100 μm and less than or equal to 2 mm, greater than or equal to 250 μm and less than or equal to 6 mm, greater than or equal to 250 μm and less than or equal to 5 mm, greater than or equal to 250 μm and less than or equal to 4 mm, greater than or equal to 250 μm and less than or equal to 3 mm, greater than or equal to 250 μm and less than or equal to 2 mm, greater than or equal to 500 μm and less than or equal to 6 mm, greater than or equal to 500 μm and less than or equal to 5 mm, greater than or equal to 500 μm and less than or equal to 4 mm, greater than or equal to 500 μm and less than or equal to 3 mm, greater than or equal to 500 μm and less than or equal to 2 mm, greater than or equal to 750 μm and less than or equal to 6 mm, greater than or equal to 750 μm and less than or equal to 5 mm, greater than or equal to 750 μm and less than or equal to 4 mm, greater than or equal to 750 μm and less than or equal to 3 mm, greater than or equal to 750 μm and less than or equal to 2 mm, greater than or equal to 1 mm and less than or equal to 6 mm, greater than or equal to 1 mm and less than or equal to 5 mm, greater than or equal to 1 mm and less than or equal to 4 mm, greater than or equal to 1 mm and less than or equal to 3 mm, or even greater than or equal to 1 mm and less than or equal to 2 mm, or any and all sub-ranges formed from any of these endpoints.

In embodiments, the glass compositions may have a fracture toughness greater than or equal to 0.6 $MPa·m^{1/2}$, greater than or equal to 0.7 $MPa·m^{1/2}$, greater than or equal to 0.8 $MPa·m^{1/2}$, greater than or equal to 0.9 $MPa·m^{1/2}$, or even greater than or equal to 1.0 $MPa·m^{1/2}$.

In embodiments, the glass composition may have a density greater than or equal to 2.15 $g/cm^3$, greater than or equal to 2.2 $g/cm^3$, or even greater than or equal to 2.25 $g/cm^3$. In embodiments, the glass composition may have a density less than or equal to 2.45 $g/cm^3$, less than or equal to 2.4 $g/cm^3$, or even less than or equal to 2.35 $g/cm^3$. In embodiments, the glass composition may have a density greater than or equal to 2.15 $g/cm^3$ and less than or equal to 2.45 $g/cm^3$, greater than or equal to 2.15 $g/cm^3$ and less than or equal to 2.4 $g/cm^3$, greater than or equal to 2.15 $g/cm^3$ and less than or equal to 2.35 $g/cm^3$, greater than or equal to 2.2 $g/cm^3$ and less than or equal to 2.45 $g/cm^3$, greater than or equal to 2.2 $g/cm^3$ and less than or equal to 2.4 $g/cm^3$, greater than or equal to 2.2 $g/cm^3$ and less than or equal to 2.35 $g/cm^3$, greater than or equal to 2.25 $g/cm^3$ and less than or equal to 2.45 $g/cm^3$, greater than or equal to 2.25 $g/cm^3$ and less than or equal to 2.4 $g/cm^3$, or even greater than or equal to 2.25 $g/cm^3$ and less than or equal to 2.35 $g/cm^3$, or any and all sub-ranges formed from any of these endpoints.

In embodiments, the glass composition may have a CTE at 500° C. cooling greater than or equal to 3 ppm, greater than or equal to 4 ppm, or even greater than or equal to 5 ppm. In embodiments, the glass composition may have a CTE at 500° C. cooling less than or equal to 8.5 ppm, less than or equal to 7.5 ppm, or even less than or equal to 6.5 ppm. In embodiments, the glass composition may have a CTE at 500° C. cooling greater than or equal to 3 ppm and less than or equal to 8.5 ppm, greater than or equal to 3 ppm and less than or equal to 7.5 ppm, greater than or equal to 3 ppm and less than or equal to 6.5 ppm, greater than or equal to 4 ppm and less than or equal to 8.5 ppm, greater than or equal to 4 ppm and less than or equal to 7.5 ppm, greater than or equal to 4 ppm and less than or equal to 6.5 ppm, greater than or equal to 5 ppm and less than or equal to 8.5 ppm, greater than or equal to 5 ppm and less than or equal to 7.5 ppm, or even greater than or equal to 5 ppm and less than or equal to 6.5 ppm, or any and all sub-ranges formed from any of these endpoints.

In embodiments, the glass composition may have a CTE at 300° C. cooling greater than or equal to 3 ppm, greater than or equal to 4 ppm, or even greater than or equal to 5 ppm. In embodiments, the glass composition may have a CTE at 300° C. cooling less than or equal to 8.5 ppm, less than or equal to 7.5 ppm, or even less than or equal to 6.5 ppm. In embodiments, the glass composition may have a CTE at 300° C. cooling greater than or equal to 3 ppm and less than or equal to 8.5 ppm, greater than or equal to 3 ppm and less than or equal to 7.5 ppm, greater than or equal to 3 ppm and less than or equal to 6.5 ppm, greater than or equal to 4 ppm and less than or equal to 8.5 ppm, greater than or equal to 4 ppm and less than or equal to 7.5 ppm, greater than or equal to 4 ppm and less than or equal to 6.5 ppm, greater than or equal to 5 ppm and less than or equal to 8.5 ppm, greater than or equal to 5 ppm and less than or equal to 7.5 ppm, or even greater than or equal to 5 ppm and less than or equal to 6.5 ppm, or any and all sub-ranges formed from any of these endpoints.

In embodiments, the glass composition may have a CTE at 50° C. cooling greater than or equal to 3 ppm, greater than or equal to 4 ppm, or even greater than or equal to 5 ppm. In embodiments, the glass composition may have a CTE at 50° C. cooling less than or equal to 8.5 ppm, less than or equal to 7.5 ppm, or even less than or equal to 6.5 ppm. In embodiments, the glass composition may have a CTE at 50° C. cooling greater than or equal to 3 ppm and less than or equal to 8.5 ppm, greater than or equal to 3 ppm and less than or equal to 7.5 ppm, greater than or equal to 3 ppm and less than or equal to 6.5 ppm, greater than or equal to 4 ppm and less than or equal to 8.5 ppm, greater than or equal to 4 ppm and less than or equal to 7.5 ppm, greater than or equal to 4 ppm and less than or equal to 6.5 ppm, greater than or equal to 5 ppm and less than or equal to 8.5 ppm, greater than or equal to 5 ppm and less than or equal to 7.5 ppm, or even greater than or equal to 5 ppm and less than or equal to 6.5 ppm, or any and all sub-ranges formed from any of these endpoints.

In embodiments, the glass composition may have a strain point greater than or equal to 400° C., greater than or equal to 450° C., or even greater than or equal to 500° C. In embodiments, the glass composition may have a strain point less than or equal to 700° C., less than or equal to 650° C., less than or equal to 600° C., or even less than or equal to 550° C. In embodiments, the glass composition may have a strain point greater than or equal to 400° C. and less than or equal to 700° C., greater than or equal to 400° C. and less than or equal to 650° C., greater than or equal to 400° C. and less than or equal to 600° C., greater than or equal to 400° C. and less than or equal to 550° C., greater than or equal to 450° C. and less than or equal to 700° C., greater than or equal to 450° C. and less than or equal to 650° C., greater than or equal to 450° C. and less than or equal to 600° C., greater than or equal to 450° C. and less than or equal to 550° C., greater than or equal to 500° C. and less than or equal to 700° C., greater than or equal to 500° C. and less than or equal to 650° C., greater than or equal to 500° C. and less than or equal to 600° C., or even greater than or equal to 500° C. and less than or equal to 550° C., or any and all sub-ranges formed from any of these endpoints.

In embodiments, the glass composition may have an annealing point greater than or equal to 400° C., greater than or equal to 450° C., or even greater or equal to 500° C. In embodiments, the glass composition may have an annealing point less than or equal to 700° C., less than or equal to 650° C., or even less than or equal to 600° C. In embodiments, the glass composition may have an annealing point greater than or equal to 400° C. and less than or equal to 700° C., greater than or equal to 400° C. and less than or equal to 650° C., greater than or equal to 400° C. and less than or equal to 600° C., greater than or equal to 450° C. and less than or equal to 700° C., greater than or equal to 450° C. and less than or equal to 650° C., greater than or equal to 450° C. and less than or equal to 600° C., greater than or equal to 500° C. and less than or equal to 700° C., greater than or equal to 500° C. and less than or equal to 650° C., or even greater than or equal to 500° C. and less than or equal to 600° C., or any and all sub-ranges formed from any of these endpoints.

In embodiments, the glass composition may have a softening point greater than or equal to 650° C. or even greater than or equal to 700° C. In embodiments, the glass composition may have a softening point less than or equal to 900° C. or even less than or equal to 850° C. In embodiments, the glass composition may have a softening point greater than or equal to 650° C. and less than or equal to 900° C., greater than or equal to 650° C. and less than or equal to 850° C., greater than or equal to 700° C. and less than or equal to 900° C., or even greater than or equal to 700° C. and less than or equal to 850° C., or any and all sub-ranges formed from any of these endpoints.

In embodiments, the glass composition may have a Young's modulus greater than or equal to 50 GPa, greater than or equal to 55 GPa, or even greater than or equal to 60 GPa. In embodiments, the glass composition may have a Young's modulus less than or equal to 80 GPa, less than or equal to 75 GPa, or even less than or equal to 70 GPa. In embodiments, the glass composition may have a Young's modulus greater than or equal to 50 GPa and less than or equal to 80 GPa, greater than or equal to 50 GPa and less than or equal to 75 GPa, greater than or equal to 50 GPa and less than or equal to 70 GPa, greater than or equal to 55 GPa and less than or equal to 80 GPa, greater than or equal to 55 GPa and less than or equal to 75 GPa, greater than or equal to 55 GPa and less than or equal to 70 GPa, greater than or equal to 60 GPa and less than or equal to 80 GPa, greater than or equal to 60 GPa and less than or equal to 75 GPa, or even greater than or equal to 60 GPa and less than or equal to 70 GPa, or any and all sub-ranges formed from any of these endpoints.

In embodiments, the glass composition may have a shear modulus greater than or equal to 20 GPa, greater than or equal to 22 GPa, greater than or equal to 24 GPa, or even greater than or equal to 26 GPa. In embodiments, the glass composition may have a shear modulus less than or equal to 34 GPa, less than or equal to 32 GPa, or even less than or equal to 30 GPa. In embodiments, the glass composition may have a shear modulus greater than or equal to 20 GPa and less than or equal to 34 GPa, greater than or equal to 20 GPa and less than or equal to 32 GPa, greater than or equal to 20 GPa and less than or equal to 30 GPa, greater than or equal to 22 GPa and less than or equal to 34 GPa, greater than or equal to 22 GPa and less than or equal to 32 GPa, greater than or equal to 22 GPa and less than or equal to 30 GPa, greater than or equal to 24 GPa and less than or equal to 34 GPa, greater than or equal to 24 GPa and less than or equal to 32 GPa, greater than or equal to 24 GPa and less than or equal to 30 GPa, greater than or equal to 26 GPa and less than or equal to 34 GPa, greater than or equal to 26 GPa and less than or equal to 32 GPa, or even greater than or equal to 26 GPa and less than or equal to 30 GPa, or any and all sub-ranges formed from any of these endpoints.

In embodiments, the glass composition may have a Poisson's ratio greater than or equal to 0.15 or even greater than or equal to 0.2. In embodiments, the glass composition may have a Poisson's ratio less than or equal to 0.3, less than or equal to 0.27, or even less than or equal to 0.25. In embodiments, the glass composition may have a Poisson's ratio greater than or equal to 0.15 and less than or equal to 0.3, greater than or equal to 0.15 and less than or equal to 0.27, greater than or equal to 0.15 and less than or equal to 0.25, greater than or equal to 0.2 and less than or equal to 0.3, greater than or equal to 0.2 and less than or equal to 0.27, greater than or equal to 0.2 and less than or equal to 0.25, or any and all sub-ranges formed from any of these endpoints.

In embodiments, the glass composition may have a refractive index greater than or equal to 1.4, greater than or equal to 1.45, or even greater than or equal to 1.5. In embodiments, the glass composition may have a refractive index less than or equal to 1.6 or even less than or equal to 1.55. In embodiments, the glass composition may have a refractive index greater than or equal to 1.4 and less than or equal to 1.6, greater than or equal to 1.4 and less than or equal to 1.55, greater than or equal to 1.45 and less than or equal to 1.6, greater than or equal to 1.45 and less than or equal to 1.55, greater than or equal to 1.5 and less than or equal to 1.6, or even greater than or equal to 1.5 and less than or equal to 1.55, or any and all sub-ranges formed from any of these endpoints.

In embodiments, the glass composition may have a stress optical coefficient (SOC) greater than or equal to 3.0 nm/mm/MPa or even greater than or equal to 3.25 nm/mm/

MPa. In embodiments the glass composition may have a SOC less than or equal to 4.0 nm/mm/MPa or even less than or equal to 3.75 nm/mm/MPa. In embodiments, the glass composition may have a SOC greater than or equal to 3.0 nm/mm/MPa and less than or equal to 4.0 nm/mm/MPa, greater than or equal to 3.0 nm/mm/MPa and less than or equal to 3.75 nm/mm/MPa, greater than or equal to 3.25 nm/mm/MPa and less than or equal to 4.0 nm/mm/MPa, or even greater than or equal to 3.25 nm/mm/MPa and less than or equal to 3.75 nm/mm/MPa, or any and all sub-ranges formed from any of these endpoints.

In embodiments, the glass composition may have a liquidus temperature greater than or equal to 900° C. or even greater than or equal to 950° C. In embodiments, the glass composition may have a liquidus temperature less than or equal to 1250° C. or even less than or equal to 1200° C. In embodiments, the glass composition may have a liquidus temperature greater than or equal to 900° C. and less than or equal to 1250° C., greater than or equal to 900° C. and less than or equal to 1200° C., greater than or equal to 950° C. and less than or equal to 1250° C., or even greater than or equal to 950° C. and less than or equal to 1200° C., or any and all sub-ranges formed from any of these endpoints.

In embodiments, the glass composition may have a liquidus viscosity greater than or equal to 0.5 kP, greater than or equal to 1 kP, greater than or equal to 5 kP, greater than or equal to 25 kP, greater than or equal to 50 kP, greater than or equal to 75 kP, or even greater than or equal to 90 kP. In embodiments, the glass composition may have a liquidus viscosity less than or equal to 500 kP, less than or equal to 250 kP, less than or equal to 150 kP, less than or equal to 125 kP, less than or equal to 100 kP, less than or equal to 75 kP, less than or equal to 50 kP, or even less than or equal to 25 kP. In embodiments, the glass composition may have a liquidus viscosity greater than or equal to 0.5 kP and less than or equal to 500 kP, greater than or equal to 0.5 kP and less than or equal to 250 kP, greater than or equal to 0.5 kP and less than or equal to 150 kP, greater than or equal to 0.5 kP and less than or equal to 125 kP, greater than or equal to 0.5 kP and less than or equal to 100 kP, greater than or equal to 0.5 kP and less than or equal to 75 kP, greater than or equal to 0.5 kP and less than or equal to 50 kP, greater than or equal to 0.5 kP and less than or equal to 25 kP, greater than or equal to 1 kP and less than or equal to 500 kP, greater than or equal to 1 kP and less than or equal to 250 kP, greater than or equal to 1 kP and less than or equal to 150 kP, greater than or equal to 1 kP and less than or equal to 125 kP, greater than or equal to 1 kP and less than or equal to 100 kP, greater than or equal to 1 kP and less than or equal to 75 kP, greater than or equal to 1 kP and less than or equal to 50 kP, greater than or equal to 1 kP and less than or equal to 25 kP, greater than or equal to 5 kP and less than or equal to 500 kP, greater than or equal to 5 kP and less than or equal to 250 kP, greater than or equal to 5 kP and less than or equal to 150 kP, greater than or equal to 5 kP and less than or equal to 125 kP, greater than or equal to 5 kP and less than or equal to 100 kP, greater than or equal to 5 kP and less than or equal to 75 kP, greater than or equal to 5 kP and less than or equal to 50 kP, greater than or equal to 5 kP and less than or equal to 25 kP, greater than or equal to 25 kP and less than or equal to 500 kP, greater than or equal to 25 kP and less than or equal to 250 kP, greater than or equal to 25 kP and less than or equal to 150 kP, greater than or equal to 25 kP and less than or equal to 125 kP, greater than or equal to 25 kP and less than or equal to 100 kP, greater than or equal to 25 kP and less than or equal to 75 kP, greater than or equal to 25 kP and less than or equal to 50 kP, greater than or equal to 50 kP and less than or equal to 500 kP, greater than or equal to 50 kP and less than or equal to 250 kP, greater than or equal to 50 kP and less than or equal to 150 kP, greater than or equal to 50 kP and less than or equal to 125 kP, greater than or equal to 50 kP and less than or equal to 100 kP, greater than or equal to 50 kP and less than or equal to 75 kP, greater than or equal to 75 kP and less than or equal to 500 kP, greater than or equal to 75 kP and less than or equal to 250 kP, greater than or equal to 75 kP and less than or equal to 150 kP, greater than or equal to 75 kP and less than or equal to 125 kP, greater than or equal to 75 kP and less than or equal to 100 kP, greater than or equal to 90 kP and less than or equal to 500 kP, greater than or equal to 90 kP and less than or equal to 250 kP, greater than or equal to 90 kP and less than or equal to 150 kP, greater than or equal to 90 kP and less than or equal to 125 kP, or even greater than or equal to 90 kP and less than or equal to 100 kP, or any and all sub-ranges formed from any of these endpoints. These ranges of viscosities allow the glass compositions to be formed into sheets by a variety of different techniques including, without limitation, fusion forming, slot draw, floating, rolling, and other sheet-forming processes known to those in the art. However, it should be understood that other processes may be used for forming other articles (i.e., other than sheets).

In embodiments, the glass compositions described herein are ion exchangeable to facilitate strengthening the glass article made from the glass compositions. In typical ion exchange processes, smaller metal ions in the glass compositions are replaced or "exchanged" with larger metal ions of the same valence within a layer that is close to the outer surface of the glass article made from the glass composition. The replacement of smaller ions with larger ions creates a compressive stress within the layer of the glass article made from the glass composition. In embodiments, the metal ions are monovalent metal ions (e.g., $Li^+$, $Na^+$, $K^+$, and the like), and ion exchange is accomplished by immersing the glass article made from the glass composition in a bath comprising at least one molten salt of the larger metal ion that is to replace the smaller metal ion in the glass article. Alternatively, other monovalent ions such as $Ag^+$, $Tl^+$, $Cu^+$, and the like may be exchanged for monovalent ions. The ion exchange process or processes that are used to strengthen the glass article made from the glass composition may include, but are not limited to, immersion in a single bath or multiple baths of like or different compositions with washing and/or annealing steps between immersions. In embodiments, the glass articles made from the glass compositions may be ion exchanged by exposure to molten $NaNO_3$ salt at a temperature of 500° C. In such embodiments, the $Na^+$ ions replace some portion of the $Li^+$ ions in the glass article to develop a surface compressive layer and exhibit high crack resistance. The resulting compressive stress layer may have a depth (also referred to as a "depth of compression" or "DOC") of at least 100 µm on the surface of the glass article in 2 hours. In embodiments, the bath further comprises molten $KNO_3$ salt. In embodiments, the glass articles made from the glass compositions may be ion exchanged to achieve a depth of compression of 10 µm or greater, 20 µm or greater, 30 µm or greater, 40 µm or greater, 50 µm or greater, 60 µm or greater, 70 µm or greater, 80 µm or greater, 90 µm or greater, or 100 µm or greater. In embodiments, the glass articles made from the glass compositions may be ion exchanged to achieve a central tension of at least 10 MPa. The development of this surface compression layer is beneficial for achieving a better crack resistance and higher flexural strength compared to non-ion-exchanged materials. The surface compression layer has a higher concentration of the ions exchanged into the glass article in comparison to the concentration of the ions exchanged into the glass article for the body (i.e., the area not including the surface compression) of the glass article.

In embodiments, the glass article made from the glass composition may have a surface compressive stress after ion exchange strengthening greater than or equal to 20 MPa, greater than or equal to 50 MPa, greater than or equal to 75 MPa, greater than or equal to 100 MPa, greater than or equal to 250 MPa, greater than or equal to 500 MPa, greater than or equal to 750 MPa, or even greater than or equal to 1 GPa. In embodiments, the glass article made from the glass composition may have a surface compressive stress after ion exchange strengthening greater than or equal to 20 MPa and less than or equal to 1 GPa, greater than or equal to 20 MPa and less than or equal to 750 MPa, greater than or equal to 20 MPa and less than or equal to 500 MPa, greater than or equal to 20 MPa and less than or equal to 250 MPa, greater than or equal to 50 MPa and less than or equal to 1 GPa, greater than or equal to 50 MPa and less than or equal to 750 MPa, greater than or equal to 50 MPa and less than or equal to 500 MPa, greater than or equal to 50 MPa and less than or equal to 250 MPa, greater than or equal to 75 MPa and less than or equal to 1 GPa, greater than or equal to 75 MPa and less than or equal to 750 MPa, greater than or equal to 75 MPa and less than or equal to 500 MPa, greater than or equal to 75 MPa and less than or equal to 250 MPa, greater than or equal to 100 MPa and less than or equal to 1 GPa, greater than or equal to 100 MPa and less than or equal to 750 MPa, greater than or equal to 100 MPa and less than or equal to 500 MPa, greater than or equal to 100 MPa and less than or equal to 250 MPa, greater than or equal to 250 MPa and less than or equal to 1 GPa, greater than or equal to 250 MPa and less than or equal to 750 MPa, greater than or equal to 250 MPa and less than or equal to 500 MPa, greater than or equal to 500 MPa and less than or equal to 1 GPa, greater than or equal to 500 MPa and less than or equal to 750 MPa, or even greater than or equal to 750 MPa and less than or equal to 1 GPa, or any and all sub-ranges formed from any of these endpoints.

In embodiments, the glass article made from the glass composition may have a central tension after ion exchange strengthening greater than or equal to 10 MPa, greater than or equal to 25 MPa, or even greater than or equal to 50 MPa. In embodiments, the glass article made from the glass composition may have a central tension after ion exchange strengthening less than or equal to 250 MPa, less than or equal to 200 MPa, or even less than or equal to 150 MPa. In embodiments, the glass article made from the glass composition may have a central tension after ion exchange strengthening greater than or equal to 10 MPa and less than or equal to 250 MPa, greater than or equal to 25 MPa and less than or equal to 250 MPa, greater than or equal to 50 MPa and less than or equal to 250 MPa, greater than or equal to 10 MPa and less than or equal to 200 MPa, greater than or equal to 25 MPa and less than or equal to 200 MPa, greater than or equal to 50 MPa and less than or equal to 200 MPa, greater than or equal to 10 MPa and less than or equal to 150 MPa, greater than or equal to 25 MPa and less than or equal to 150 MPa, or even greater than or equal to 50 MPa and less than or equal to 150 MPa, or any and all sub-ranges formed from any of these endpoints.

In embodiments, the process for making a multi-phase glass includes subjecting a glass composition as described herein to a heat treatment at one or more preselected temperatures for one or more preselected times to induce phase separation. In embodiments, the heat treatment may include (i) heating a glass composition at an average heating rate greater than or equal to 1° C./min and less than or equal to 500° C./min to a phase separation temperature range; (ii) maintaining the glass composition at the phase separation temperature range for a time greater than or equal to 60 seconds and less than or equal to 48 hours to form a multi-phase glass; (iii) cooling the formed multi-phase glass at an average cooling rate greater than or equal to 1° C./min and less than or equal to 500° C./min to the effective annealing temperature of the multi-phase glass±20° C.; (iv) maintaining the multi-phase glass at the effective annealing temperature of the multi-phase glass±20° C. for a time greater than or equal to 15 minutes and less than or equal to 1 hour; and (v) cooling the multi-phase glass to room temperature.

In embodiments, the heat treatment may not include maintaining the pre-separated glass at the phase separation temperature range. Accordingly, in embodiments, the heat treatment may include i) heating a glass composition at an average heating rate greater than or equal to 1° C./min and less than or equal to 500° C./min to a phase separation temperature range to form a multi-phase glass; (ii) cooling the formed multi-phase glass at an average cooling rate greater than or equal to 1° C./min and less than or equal to 500° C./min to the effective annealing temperature of the multi-phase glass±20° C.; (iii) maintaining the multi-phase glass at the effective annealing temperature of the multi-phase glass±20° C. for a time greater than or equal to 15 minutes and less than or equal to 1 hour; and (iv) cooling the multi-phase glass to room temperature.

In embodiments, the heat treatment may not include cooling the multi-phase glass to an effective annealing temperature. Accordingly, in embodiments, the heat treatment may include (i) heating a glass composition at an average heating rate greater than or equal to 1° C./min and less than or equal to 500° C./min to a phase separation temperature range; (ii) maintaining the glass composition at the phase separation temperature range for a time greater than or equal to 60 seconds and less than or equal to 48 hours to produce a multi-phase glass; and (iii) cooling the formed multi-phase glass to room temperature.

In embodiments, the heat treatment does not include maintaining the pre-separated glass at the phase separation temperature range or cooling the multi-phase glass to an effective anneal temperature. Accordingly, in embodiments, the heat treatment may include (i) heating a glass composition at an average heating rate greater than or equal to 1° C./min and less than or equal to 500° C./min to a phase separation temperature range to form a multi-phase glass; and (ii) cooling the formed multi-phase glass to room temperature.

In embodiments, the steps of heating to and maintaining at a phase separation temperature range may be a two-stage process. Accordingly, in embodiments, the steps of heating to and maintaining at a phase separation temperature range may include (i) heating a glass composition at an average heating rate greater than or equal to 1° C./min and less than or equal to 500° C./min to a first phase separation temperature range; (ii) maintaining the glass composition at the first phase separation temperature range for a time greater than or equal to 60 seconds and less than or equal to 48 hours; (iii) heating the glass composition at an average heating rate greater than or equal to 1° C./min and less than or equal to 500° C./min to a second phase separation temperature range; (iv) maintaining the glass composition at the second phase separation temperature range for a time greater than or equal to 60 seconds and less than or equal to 48 hours to form a multi-phase glass.

In embodiments, the phase separation heat treatment may be performed directly post-forming (e.g., rolling, casting, fusion, slot draw, float, etc.) without the need to perform a reheating step. Referring now to FIG. 1, as shown with reference to thermal profile A, the heat treatment may include (i) cooling a formed glass composition at an average cooling rate greater than or equal to 1° C./min and less than or equal to 500° C./min from a forming process temperature $T_1$ to a phase separation temperature range $T_2$; (ii) maintaining the formed glass composition at the phase separation temperature range $T_2$ for a time greater than or equal to 60 seconds and less than or equal to 48 hours to produce a multi-phase glass; (iii) cooling the formed multi-phase glass at an average cooling rate greater than or equal to 1° C./min and less than or equal to 500° C./min to the effective annealing temperature of the multi-phase glass±20° C. $T_3$; (iv) maintaining the multi-phase glass at the effective annealing temperature of the multi-phase glass±20° C. $T_3$ for a time greater than or equal to 15 minutes and less than or equal to 1 hour; and (v) cooling the multi-phase glass to room temperature $T_4$.

In embodiments, referring now to thermal profile B in FIG. 1, the heat treatment may not include cooling to an effective annealing temperature. Accordingly, in embodiments, the heat treatment may include (i) cooling a formed glass composition at an average cooling rate greater than or equal to 1° C./min and less than or equal to 500° C./min from a forming process temperature $T_1$ to a phase separation temperature range $T_2$; (ii) maintaining the formed glass composition at the phase separation temperature range $T_2$ for a time greater than or equal to 60 seconds and less than or equal to 48 hours to form a multi-phase glass; (iii) cooling the multi-phase glass to room temperature $T_4$.

In embodiments, any of the heating steps or cooling described hereinabove may have a heating rate or cooling rate, respectively, that is constant or varies.

In embodiments, the phase separation temperature range $T_2$ may be greater than or equal to 400° C. and less than or equal to 950° C. In embodiments, the phase separation temperature range $T_2$ may be greater than or equal to 400° C., greater than or equal to 450° C., greater than or equal to 500° C., greater than or equal to 550° C., or even greater than or equal to 600° C. In embodiments, the phase separation temperature range $T_2$ may be less than or equal to 950° C., less than or equal to 900° C., less than or equal to 850° C., less than or equal to 800° C., less than or equal to 750° C., or even less than or equal to 700° C. In embodiments, the phase separation temperature range may be greater than or equal to 400° C. and less than or equal to 950° C., greater than or equal to 450° C. and less than or equal to 950° C., greater than or equal to 500° C. and less than or equal to 950° C., greater than or equal to 550° C. and less than or equal to 950° C., greater than or equal to 600° C. and less than or equal to 950° C., greater than or equal to 400° C. and less than or equal to 900° C., greater than or equal to 450° C. and less than or equal to 900° C., greater than or equal to 500° C. and less than or equal to 900° C., greater than or equal to 550° C. and less than or equal to 900° C., greater than or equal to 600° C. and less than or equal to 900° C., greater than or equal to 400° C. and less than or equal to 850° C., greater than or equal to 450° C. and less than or equal to 850° C., greater than or equal to 500° C. and less than or equal to 850° C., greater than or equal to 550° C. and less than or equal to 850° C., greater than or equal to 600° C. and less than or equal to 850° C., greater than or equal to 400° C. and less than or equal to 800° C., greater than or equal to 450° C. and less than or equal to 800° C., greater than or equal to 500° C. and less than or equal to 800° C., greater than or equal to 550° C. and less than or equal to 800° C., greater than or equal to 600° C. and less than or equal to 800° C., greater than or equal to 400° C. and less than or equal to 750° C., greater than or equal to 450° C. and less than or equal to 750° C., greater than or equal to 500° C. and less than or equal to 750° C., greater than or equal to 550° C. and less than or equal to 750° C., greater than or equal to 600° C. and less than or equal to 750° C., greater than or equal to 400° C. and less than or equal to 700° C., greater than or equal to 450° C. and less than or equal to 700° C., greater than or equal to 500° C. and less than or equal to 700° C., greater than or equal to 550° C. and less than or equal to 700° C., or even greater than or equal to 600° C. and less than or equal to 700° C., or any and all sub-ranges formed from any of these endpoints.

In embodiments, the heat treatment to form a multi-phase glass is performed during the 3D forming process such that no additional heat treatment before or after manufacturing is required.

Figure 2:
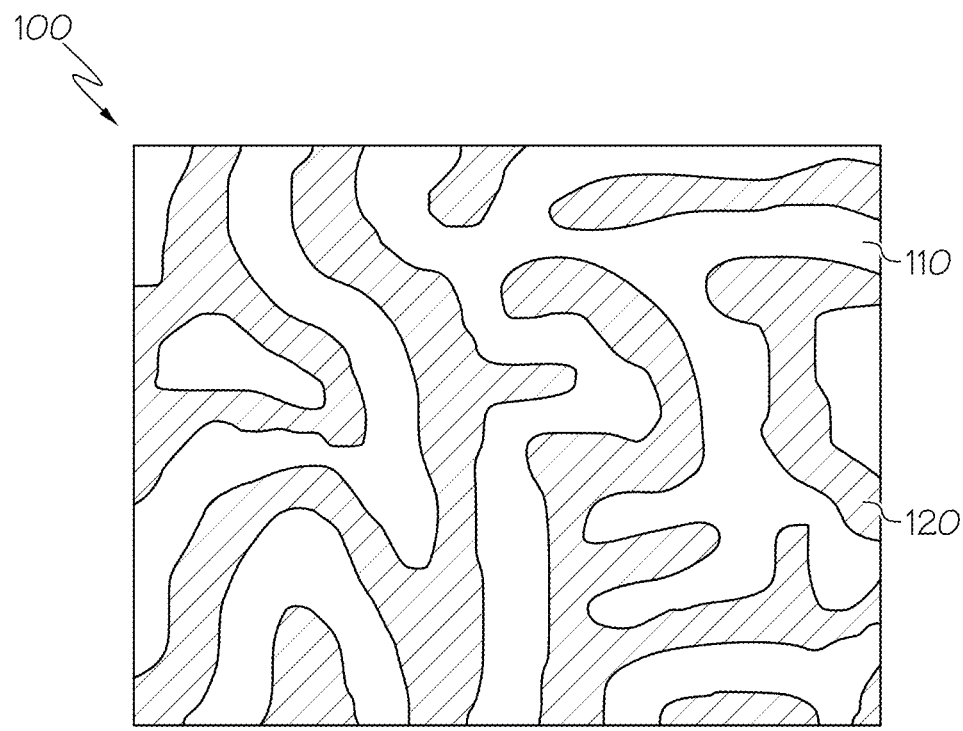
FIG. 2 is a schematic view of an exemplary multi-phase glass according to one or more embodiments described herein.
Figure 3:
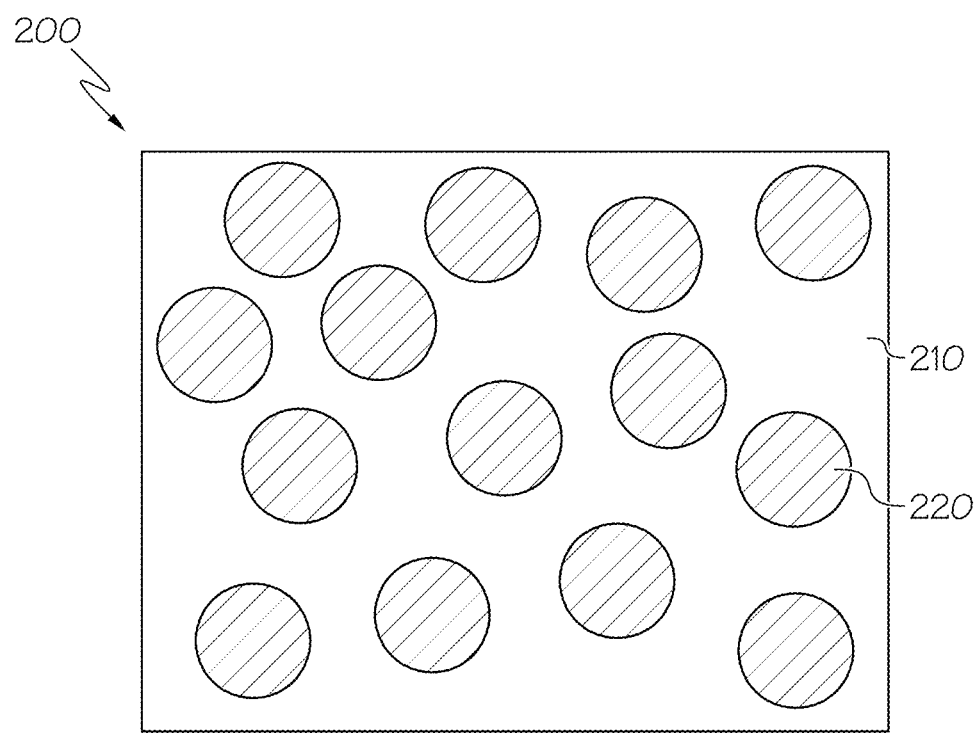
FIG. 3 is a schematic view of another exemplary multi-phase glass according to one or more embodiments described herein.

Referring now to FIG. 2, the multi-phase glass 100 includes at least two phases, a first phase 110 and a second phase 120. The properties of the multi-phase glass 100 depend on the components of the glass composition used to form the multi-phase glass and thermal history of the multi-phase glass 100. In embodiments, the aluminoborosilicate glass compositions described herein may separate into a silica-rich phase and a boron-aluminum rich phase. As shown FIG. 2, in embodiments, the first phase 110 and second phase 120 are continuous. Referring now to FIG. 3, the multi-phase glass 200 includes a first phase 110 and a second phase 220. The second phase 220 may be formed of spherical-like particles and may be dispersed in the first phase 210.

In embodiments, the size or "wavelength" of the second phase 120, 220 may be limited to micron size or sub-micron size (e.g., greater than or equal to 1 nm and less than or equal to 1 μm) to preserve transparency. The Rayleigh scattering of the multi-phase glass 100, 200 may be expressed by:

$$\frac{I}{I_0} \sim \exp\left(-\frac{8}{3\pi}\left(\frac{2\pi}{\lambda}\right)^4 r^6 \left(\frac{M^2-1}{M^2+2}\right)^2 Nt\right)$$

where $I_0$ is the input light intensity, I is the transmission with thickness t, M is the ratio of the refractive index of the scattering particle over that of the surrounding matrix, λ is the wave length of the light, r is the radius of the scattering particle, N is the volumetric number density of the particle. The scattering substantially increases with the wavelength of the light. For example, blue light with a wavelength of about 500 nm may be scattered much more than red light. Accordingly, the size of the second phase 120, 220 may be limited to reduce scattering and maintain transparency. In embodiments, in reducing the scattering of longer wavelength light (e.g., blue light), smaller wavelength light (e.g., UV) may still be scattered.

Another factor to reduce the scattering of light within the multi-phase glass is to reduce the refractive index mismatch between the first phase 110, 210 and the second phase 120, 220. In embodiments, the refractive index of the second phase 120, 220 may be greater than or equal to 1.4 and less than or equal to 1.6.

In embodiments, at least one of the phases of the multi-phase glass is ion-exchangeable.

In embodiments, the multi-phase glass may be transparent, transparent haze, translucent, or opaque.

It was unexpectedly found that multi-phase glasses including a nucleating agent may have an improved fracture toughness as compared to the glass composition or a non-multi-phase glass made from the glass composition. In embodiments, the multi-phase glass may have a fracture toughness ($K_{Ic}$) greater than or equal to 0.7 MPa·m$^{1/2}$. In embodiments, the glass-ceramics may have a fracture toughness greater than or equal to 0.7 MPa·m$^{1/2}$, greater than or equal to 0.8 MPa·m$^{1/2}$, greater than or equal to 0.9 MPa·m$^{1/2}$, greater than or equal to 1.0 MPa·m$^{1/2}$, greater than or equal to 1.1 MPa·m$^{1/2}$ greater than or equal to 1.2 MPa·m$^{1/2}$, greater than or equal to 1.3 MPa·m$^{1/2}$, greater than or equal to 1.4 MPa·m$^{1/2}$, or even greater than or equal to 1.5 MPa·m$^{1/2}$. In embodiments, the glass compositions may have a fracture toughness greater than or equal to greater than or equal to 0.7 MPa·m$^{1/2}$ and less than or equal to 1.5 MPa·m$^{1/2}$, or even greater than or equal to 0.9 MPa·m$^{1/2}$ and less than or equal to 1.2 MPa·m$^{1/2}$, or any and all sub-ranges formed from any of these endpoints.

In embodiments, the multi-phase glass may not include a crystalline phase. Accordingly, in embodiments, a multi-phase glass may be subjected to further heat treatment to form a glass-ceramic. In embodiments, the process for making the glass-ceramic includes heat treating the multi-phase glass at one or more preselected temperatures for one or more preselected times to induce crystallization (i.e., nucleation and growth) of one or more crystalline phases. In embodiments, the heat treatment to form a glass-ceramic may include (i) heating a multi-phase glass at an average heating rate greater than or equal to 1° C./min and less than or equal to 500° C./min to a nucleation temperature range; (ii) maintaining the multi-phase glass at the nucleation temperature range for a time greater than or equal to 0.25 hour and less than or equal to 8 hours to produce nucleated crystallizable glasses; (iii) heating the multi-phase glass at an average heating rate greater than or equal to 1° C./min and less than or equal to 500° C./min to a crystallization temperature (Tc) range to form a glass-ceramic; (iv) maintaining the multi-phase glass at the crystallization temperature range for a time greater than or equal to 0.25 hour and less than or equal to 4 hours to produce the glass-ceramic; (v) cooling the formed glass-ceramic at an average cooling rate greater than or equal to 1° C./min and less than or equal to 500° C./min to the effective annealing temperature of the glass-ceramic±20° C.; (vi) maintaining the glass-ceramic at the effective annealing temperature of the glass-ceramic±20° C. for a time greater than or equal to 15 minutes and less than or equal to 1 hour; and (vii) cooling the glass-ceramic to room temperature.

In embodiments, the heat treatment to form a glass-ceramic may not include maintaining the multi-phase glass at the crystallization temperature range. Accordingly, in embodiments, the heat treatment to form a glass-ceramic may include (i) heating a multi-phase glass at an average heating rate greater than or equal to 1° C./min and less than or equal to 500° C./min to a nucleation temperature range; (ii) maintaining the multi-phase glass at the nucleation temperature range for a time greater than or equal to 0.25 hour and less than or equal to 8 hours to produce nucleated crystallizable glasses; (iii) heating the multi-phase glass at an average heating rate greater than or equal to 1° C./min and less than or equal to 500° C./min to a crystallization temperature (Tc) range to form a glass-ceramic; (iv) cooling the formed glass-ceramic at an average cooling rate greater than or equal to 1° C./min and less than or equal to 500° C./min to the effective annealing temperature of the glass-ceramic±20° C.; (v) maintaining the glass-ceramic at the effective annealing temperature of the glass-ceramic±20° C. for a time greater than or equal to 15 minutes and less than or equal to 1 hour; and (vi) cooling the glass-ceramic to room temperature.

In embodiments, the heat treatment to form a glass-ceramic may not include cooling to and maintaining the formed glass-ceramic at an effective annealing temperature. Accordingly, in embodiments, the heat treatment to form a glass-ceramic may include (i) heating a multi-phase glass at an average heating rate greater than or equal to 1° C./min and less than or equal to 500° C./min to a nucleation temperature range; (ii) maintaining the multi-phase glass at the nucleation temperature range for a time greater than or equal to 0.25 hour and less than or equal to 8 hours to produce nucleated crystallizable glasses; (iii) heating the multi-phase glass at an average heating rate greater than or equal to 1° C./min and less than or equal to 500° C./min to a crystallization temperature (Tc) range; (iv) maintaining the multi-phase glass at the crystallization temperature range for a time greater than or equal to 0.25 hour and less than or equal to 4 hours to produce the glass-ceramic; and (v) cooling the formed glass-ceramic to room temperature.

In embodiments, the heat treatment to form a glass-ceramic may not include maintaining the multi-phase glass at the crystallization temperature range and cooling to and maintaining the formed glass-ceramic at an effective annealing temperature. Accordingly, in embodiments, the heat treatment to form a glass-ceramic may include (i) heating a multi-phase glass at an average heating rate greater than or equal to 1° C./min and less than or equal to 500° C./min to a nucleation temperature range; (ii) maintaining the multi-phase glass at the nucleation temperature range for a time greater than or equal to 0.25 hour and less than or equal to 8 hours to produce nucleated crystallizable glasses; (iii) heating the multi-phase glass at an average heating rate greater than or equal to 1° C./min to 500° C./min to a crystallization temperature (Tc) range to form a glass-ceramic; and (iv) cooling the formed glass-ceramic to room temperature.

In embodiments, the nucleation temperature range may be greater than or equal to 400° C. and less than or equal to 900° C. and the crystallization temperature range may be in a range greater than or equal to 700° C. and less than or equal to 1000° C.

In embodiments, the heat treatment to form a glass-ceramic may not include heating to and maintaining the multi-phase glass at a nucleation temperature range. Accordingly, in embodiments, the heat treatment to form a glass-ceramic may include (i) heating the multi-phase glass at an average heating rate greater than or equal to 1° C./min and less than or equal to 500° C./min to a crystallization temperature (Tc) range to form a glass-ceramic; (ii) maintaining the multi-phase glass at the crystallization temperature range for a time greater than or equal to 0.25 hour and less than or equal to 4 hours to produce the glass-ceramic; (iii) cooling the formed glass-ceramic at an average cooling rate greater than or equal to 1° C./min and less than or equal to 500° C./min to the effective annealing temperature of the glass-ceramic±20° C.; (iv) maintaining the glass-ceramic at the effective annealing temperature of the glass-ceramic±20° C. for a time greater than or equal to 15 minutes and less than or equal to 1 hour; and (v) cooling the glass-ceramic to room temperature.

In embodiments, the heat treatment to form a glass-ceramic may not include heating to and maintaining the multi-phase glass at a nucleation temperature range and maintaining the multi-phase glass at the crystallization temperature range. Accordingly, in embodiments, the heat treatment to form a glass-ceramic may include (i) heating the multi-phase glass at an average heating rate greater than or equal to 1° C./min and less than or equal to 500° C./min to a crystallization temperature (Tc) range to form a glass-ceramic; (ii) cooling the formed glass-ceramic at an average cooling rate greater than or equal to 1° C./min and less than or equal to 500° C./min to the effective annealing temperature of the glass-ceramic±20° C.; (iii) maintaining the glass-ceramic at the effective annealing temperature of the glass-ceramic±20° C. for a time greater than or equal to 15 minutes and less than or equal to 1 hour; and (iv) cooling the glass-ceramic to room temperature.

In embodiments, the heat treatment to form a glass-ceramic may not include heating to and maintaining the multi-phase glass at a nucleation temperature range and cooling to and maintaining the multi-phase glass at the effective annealing temperature. Accordingly, in embodiments, the heat treatment to form a glass-ceramic may include (i) heating the multi-phase glass at an average heating rate greater than or equal to 1° C./min and less than or equal to 500° C./min to a crystallization temperature (Tc) range; (ii) maintaining the multi-phase glass at the crystallization temperature range for a time greater than or equal to 0.25 hour and less than or equal to 4 hours to produce the glass-ceramic; and (iii) cooling the formed glass-ceramic to room temperature.

In embodiments, the heat treatment to form a glass-ceramic may not include heating to and maintaining the multi-phase glass at a nucleation temperature range, maintaining the multi-phase glass at the crystallization temperature range, or cooling to and maintaining the multi-phase glass at the effective annealing temperature. Accordingly, in embodiments, the heat treatment to form a glass-ceramic may include (i) heating the multi-phase glass at an average heating rate greater than or equal to 1° C./min and less than or equal to 500° C./min to a crystallization temperature (Tc) range to form a glass-ceramic; and (ii) cooling the formed glass-ceramic to room temperature.

Temperature-temporal profiles of heat treatment steps of heating to the crystallization temperature range and maintaining the temperature at the crystallization temperature range in addition to glass compositions are judiciously prescribed so as to produce one or more of the following desired attributes: crystalline phase(s) of the glass-ceramic, proportions of one or more major crystalline phases and/or one or more minor crystalline phases and glass, crystal phase assemblages of one or more predominate crystalline phases and/or one or more minor crystalline phases and glass, and grain sizes or grain size distribution among one or more major crystalline phases and/or one or more minor crystalline phases, which in turn may influence the final integrity, quality, color, and/or opacity of the resultant glass-ceramic. In embodiments, the crystalline phase of the glass-ceramic may include, but is not limited to, rutile, anatase, virgilitie, stuffed beta quartz, spodumene, zirconia, lithia phosphate, mullite, boromullite, or a combination thereof.

The resultant glass-ceramic may be provided as a sheet, which may then be reformed by pressing, blowing, bending, sagging, vacuum forming, or other means into curved or bent pieces of uniform thickness. Reforming may be done before thermally treating or the forming step may also serve as a thermal treatment step in which both forming and thermal treating are performed substantially simultaneously.

The glass compositions described herein may be used for a variety of applications including, for example, for cover glass or glass backplane applications in consumer or commercial electronic devices including, for example, LCD and LED displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; or for commercial or household appliance applications. In embodiments, a consumer electronic device (e.g., smartphones, tablet computers, personal computers, ultrabooks, televisions, and cameras), an architectural glass, and/or an automotive glass may comprise a glass article as described herein. An exemplary article incorporating any of the glass compositions disclosed herein may be a consumer electronic device including a housing; electrical components that are at least partially inside or entirely within the housing and including at least a controller, a memory, and a display at or adjacent to the front surface of the housing; and a cover substrate at or over the front surface of the housing such that it is over the display. In some embodiments, at least a portion of at least one of the cover substrate and/or the housing may include any of the glass compositions disclosed herein.

EXAMPLES

In order that various embodiments be more readily understood, reference is made to the following examples, which are intended to illustrate various embodiments of the glass compositions described herein.

Method of Determining Phases Present in Glass Composition after Heat Treatment

As defined hereinabove, phase separation may induce spinodal decomposition or nucleation and growth into at least two glass phases, may induce nucleation and growth thereby forming at least one crystalline phase and at least one residual glass phase, or may induce both spinodal decomposition into at least two glass phases and nucleation and growth thereby forming at least one crystalline phase.

As described below, an XRD spectrum is obtained and reviewed to determine the phases present in the specified glass composition after heat treatment.

If the XRD spectrum includes peaks evidencing a dispersed second phase, then it may be concluded that crystals with the detected phases nucleated and formed in the glass composition. An XRD spectrum with peaks is not conclusive evidence of either phase separation into at least one crystalline phase and at least one residual glass phase or ceramming to form a glass ceramic with no phase separation. At most, an XRD spectrum may indicate that crystals are present in the glass composition. An increase in the amount and/or intensity of the XRD peaks indicates a higher degree of crystallinity.

If the XRD spectrum does not include any peaks, then two possibilities may exist: (1) crystals are present in the glass composition in a small concentration such that the crystals are not detectable by XRD; or (2) the heat treatment resulted in a multi-phase glass with at least two glass phases and no crystallization. Heat treatment of the glass composition may change the appearance/transmission of the glass composition, suggesting that the phase formed in the glass composition is large enough to interact with light. Therefore, if crystal is present in the glass composition, it should be detectable by XRD. Accordingly, if the appearance/transmission of the glass composition changes (i.e., results in transparent haze, translucent, or opaque glass article) and the XRD spectrum does not include any peaks, then it may be concluded that the heat treatment resulted in a multi-phase glass with at least two glass phases and no crystallization.

XRD may be used in conjunction with electron diffraction to determine phase separation. EDS/EELS may be used in conjunction with XRD and/or TEM to determine the composition of the dispersed second phase.

Examples Group 1: No Nucleating Agent

Table 1 shows comparative glass compositions (in terms of mol %) and the respective properties of the glass compositions. Glasses are formed having the comparative glass compositions C1-C25. In particular, comparative glass compositions C1-C25 do not include any nucleating agent. Table 2 shows $K_{Ic}$ fracture toughness and appearance of comparative glass compositions C1-C5 after being subjected to various heat treatments.

TABLE 1

| Example | C1 | C2 | C3 | C4 | C5 | C6 | C7 |
|---|---|---|---|---|---|---|---|
| $SiO_2$ | 58.99 | 58.90 | 58.91 | 58.79 | 58.88 | 58.84 | 67.24 |
| $Al_2O_3$ | 15.89 | 15.83 | 15.81 | 15.79 | 15.79 | 15.80 | 10.09 |
| $B_2O_3$ | 14.94 | 15.09 | 15.03 | 15.17 | 15.01 | 13.06 | 14.67 |
| $P_2O_5$ | 0 | 0 | 0 | 0 | 0 | 0 | 0 |
| $TiO_2$ | 0 | 0 | 0 | 0 | 0 | 0 | 0 |
| $ZrO_2$ | 0 | 0 | 0 | 0 | 0 | 0 | 0 |
| $WO_3$ | 0 | 0 | 0 | 0 | 0 | 0 | 0 |
| $Y_2O_3$ | 0 | 0 | 0 | 0 | 0 | 0 | 0 |
| $Li_2O$ | 0 | 2.05 | 4.15 | 6.23 | 8.29 | 6.24 | 8.01 |
| $Na_2O$ | 2.00 | 2.00 | 1.98 | 1.97 | 1.98 | 1.97 | 0 |
| $K_2O$ | 0 | 0 | 0 | 0 | 0 | 0 | 0 |
| MgO | 8.10 | 6.07 | 4.07 | 2.01 | 0.02 | 4.03 | 0 |
| CaO | 0.06 | 0.05 | 0.04 | 0.03 | 0.01 | 0.04 | 0 |
| ZnO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |
| $Fe_2O_3$ | 0.01 | 0.01 | 0.01 | 0 | 0 | 0.01 | 0 |
| $SnO_2$ | 0 | 0 | 0 | 0 | 0 | 0 | 0 |
| $Al_2O_3 + B_2O_3$ | 30.83 | 30.92 | 30.84 | 30.96 | 30.80 | 28.86 | 24.76 |
| $P_2O_5 + TiO_2 + ZrO_2 + WO_3 + Y_2O_3 + ZnO$ | 0 | 0 | 0 | 0 | 0 | 0 | 0 |
| $Li_2O + N_2O$ | 2.00 | 4.05 | 6.13 | 8.20 | 10.27 | 8.21 | 8.01 |
| $R_2O$ | 2.00 | 4.05 | 6.13 | 8.20 | 10.27 | 8.21 | 8.01 |
| RO | 8.16 | 6.12 | 4.11 | 2.04 | 0.03 | 4.07 | 0 |
| $R_2O + RO$ | 10.16 | 10.17 | 10.24 | 10.24 | 10.30 | 12.28 | 8.01 |
| $Al_2O_3 - R_2O - RO$ | 5.73 | 5.66 | 5.57 | 5.55 | 5.49 | 3.52 | 2.08 |
| Density (g/cm$^3$) | — | — | — | — | — | — | 2.245 |
| CTE at 500° C. cooling (ppm) | — | — | — | — | — | — | 4.25 |
| CTE at 300° C. cooling(ppm) | — | — | — | — | — | — | 4 |
| CTE at 50° C. cooling(ppm) | — | — | — | — | — | — | 3.96 |
| Strain Pt. (° C.) | 634.2 | 588.2 | 561.6 | 541.2 | 516.4 | 554.4 | 510.5 |
| Anneal Pt. (° C.) | 682.4 | 636.7 | 608.8 | 588.8 | 563.5 | 600.8 | 559.9 |
| Softening Pt. (° C.) | — | — | — | — | — | 811.6 | – |
| Young's Modulus (GPa) | — | — | — | — | — | — | 64.1 |
| Shear modulus (GPa) | — | — | — | — | — | — | 26.3 |
| Poisson's ratio | — | — | — | — | — | — | 0.221 |
| Refractive index | — | — | — | — | — | — | 1.4924 |
| SOC (nm/mm/MPa) | — | — | — | — | — | — | 4.68 |
| Fulchers A | −1.707 | −2.061 | −1.286 | −0.585 | −1.858 | −0.848 | −3.148 |
| Fulchers B | 3486.3 | 4397.8 | 3022.2 | 2262.5 | 4518.8 | 2491.1 | 8613.9 |
| Fulchers $T_o$ | 576.6 | 430.2 | 589.5 | 658.6 | 350.9 | 636 | 6.2 |
| 200 P Temperature (° C.) | 1446 | 1438 | 1432 | 1443 | 1437 | 1427 | 1587 |
| 35000 P Temperature (° C.) | 1134 | 1096 | 1108 | 1100 | 1057 | 1098 | 1126 |
| 200000 P Temperature (° C.) | 1074 | 1028 | 1048 | 1043 | 982 | 1041 | 1026 |
| Liquidus (gradient boat) duration (hours) | 24 | 24 | 24 | 24 | 24 | 24 | 72 |
| Air interface liqudus temperature (° C.) | >1430 | 1430 | 1420 | 1340 | 1295 | 1335 | 1100 |

TABLE 1-continued

| | | | | | | | |
|---|---|---|---|---|---|---|---|
| Internal liqudus temperature (° C.) | >1430 | 1405 | 1420 | 1350 | 1300 | 1320 | 1095 |
| Platinum interface liquidus temperature (° C.) | >1430 | 1400 | 1420 | 1350 | 1305 | 1310 | 1085 |
| Primary Phase | Boromullite | Boromullite | Boromullite | Boromullite | Boromullite | Boromullite | Boromullite |
| Liquidus Viscosity (kP) | — | 0.28 | 0.23 | 0.49 | 0.80 | 0.62 | 57.99 |
| $K_{Ic}$ (CN) | — | 0.844 | 0.845 | — | 0.783 | — | 0.734 |
| Standard Deviation (CN) | — | 0.012 | 0.018 | — | 0.024 | — | — |

| Example | C8 | C9 | C10 | C11 | C12 | C13 | C14 |
|---|---|---|---|---|---|---|---|
| $SiO_2$ | 62.07 | 65.32 | 63.28 | 61.28 | 59.28 | 57.31 | 65.33 |
| $Al_2O_3$ | 13.10 | 12.07 | 14.07 | 16.10 | 17.99 | 19.91 | 12.05 |
| $B_2O_3$ | 14.73 | 14.60 | 14.60 | 14.62 | 14.68 | 14.76 | 14.60 |
| $P_2O_5$ | 0 | 0 | 0 | 0 | 0 | 0 | 0 |
| $TiO_2$ | 0 | 0 | 0 | 0 | 0 | 0 | 0 |
| $ZrO_2$ | 0 | 0 | 0 | 0 | 0 | 0 | 0 |
| $WO_3$ | 0 | 0 | 0 | 0 | 0 | 0 | 0 |
| $Y_2O_3$ | 0 | 0 | 0 | 0 | 0 | 0 | 0 |
| $Li_2O$ | 10.04 | 8.01 | 8.05 | 8.01 | 8.05 | 8.03 | 8.03 |
| $Na_2O$ | 0 | 0 | 0 | 0 | 0 | 0 | 0 |
| $K_2O$ | 0 | 0 | 0 | 0 | 0 | 0 | 0 |
| MgO | 0 | 0 | 0 | 0 | 0 | 0 | 0 |
| CaO | 0 | 0 | 0 | 0 | 0 | 0 | 0 |
| ZnO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |
| $Fe_2O_3$ | 0 | 0 | 0 | 0 | 0 | 0 | 0 |
| $SnO_2$ | 0.05 | 0 | 0 | 0 | 0 | 0 | 0 |
| $Al_2O_3 + B_2O_3$ | 27.83 | 26.67 | 28.67 | 30.72 | 32.67 | 34.67 | 26.65 |
| $P_2O_5 + TiO_2 + ZrO_2 + WO_3 + Y_2O_3 + ZnO$ | 0 | 0 | 0 | 0 | 0 | 0 | 0 |
| $Li_2O + N_2O$ | 10.04 | 8.01 | 8.05 | 8.01 | 8.05 | 8.03 | 8.03 |
| $R_2O$ | 10.04 | 8.01 | 8.05 | 8.01 | 8.05 | 8.03 | 8.03 |
| RO | 0 | 0 | 0 | 0 | 0 | 0 | 0 |
| $R_2O + RO$ | 10.04 | 8.01 | 8.05 | 8.01 | 8.05 | 8.03 | 8.03 |
| $Al_2O_3 - R_2O - RO$ | 3.06 | 4.06 | 6.02 | 8.09 | 9.94 | 11.88 | 4.02 |
| Density (g/cm³) | 2.283 | 2.265 | 2.287 | 2.31 | 2.332 | 2.355 | 2.265 |
| CTE at 500° C. cooling (ppm) | — | 4.2 | 4.16 | 4.12 | 4.16 | 4.22 | 4.28 |
| CTE at 300° C. cooling(ppm) | — | 3.9 | 3.91 | 3.9 | 3.77 | 3.86 | 4.01 |
| CTE at 50° C. cooling(ppm) | — | 3.5 | 3.45 | 3.39 | 3.13 | 3.24 | 3.53 |
| Strain Pt. (° C.) | 514.4 | 520.1 | 536 | 550.2 | 559 | 572.4 | 522.1 |
| Anneal Pt. (° C.) | 561.4 | 569.7 | 584.2 | 597.7 | 606.6 | 618.8 | 571.1 |
| Softening Pt. (° C.) | 788.3 | — | — | — | — | — | — |
| Young's Modulus (GPa) | 67.9 | 66.5 | 69.1 | 71.7 | 74.4 | 77.2 | 66.4 |
| Shear modulus (GPa) | 27.6 | 27.1 | 28 | 29.1 | 30.2 | 31.1 | 27.1 |
| Poisson's ratio | 0.23 | 0.227 | 0.232 | 0.231 | 0.234 | 0.239 | 0.225 |
| Refractive index | 1.5027 | 1.4969 | 1.5012 | 1.5060 | 1.5107 | 1.5154 | 1.4969 |
| SOC (nm/mm/MPa) | 3.675 | 3.832 | 3.706 | 3.572 | 3.5 | 3.398 | — |
| VFT A | −2.882 | −2.208 | −2.928 | — | — | — | −2.565 |
| VFT B | 7186.9 | 6126.4 | 7108 | — | — | — | 6770.8 |
| VFT $T_o$ | 99.4 | 200.4 | 140.1 | — | — | — | 154.7 |
| 200 P Temperature (° C.) | 1486 | 1559 | 1499 | — | — | — | 1546 |
| 35000 P Temperature (° C.) | 1067 | 1108 | 1091 | — | — | — | 1107 |
| 200000 P Temperature (° C.) | 978 | 1016 | 1004 | — | — | — | 1015 |
| Liquidus (gradient boat) duration (hours) | 72 | 72 | 72 | 72 | 72 | — | 72 |
| Air interface liqudus temperature (° C.) | 1220 | 1315 | >1380 | >1380 | >1380 | — | 1260 |
| Internal liqudus temperature (° C.) | 1215 | 1270 | >1380 | >1380 | >1380 | — | 1270 |
| Platinum interface liquidus temperature (° C.) | 1190 | 1275 | >1380 | >1380 | >1380 | — | 1275 |

TABLE 1-continued

| | | | | | | | |
|---|---|---|---|---|---|---|---|
| Primary Phase | Boromullite | Boromullite | Boromullite | Boromullite | Boromullite | Boromullite | Boromullite |
| Liquidus Viscosity (kP) | 3.63 | 3.31 | — | — | — | — | 3.21 |
| $K_{Ic}$ (CN) | 0.758 | 0.758 | 0.781 | 0.810 | 0.844 | 0.876 | 0.781 |
| Standard Deviation (CN) | 0.015 | — | — | — | — | — | — |

| Example | C15 | C16 | C17 | C18 | C19 | C20 | C21 |
|---|---|---|---|---|---|---|---|
| $SiO_2$ | 63.29 | 61.77 | 59.59 | 57.66 | 55.65 | 51.66 | 49.81 |
| $Al_2O_3$ | 12.09 | 11.95 | 12.07 | 12.07 | 12.06 | 15.95 | 17.90 |
| $B_2O_3$ | 16.60 | 18.29 | 20.34 | 22.25 | 24.27 | 24.42 | 24.33 |
| $P_2O_5$ | 0 | 0 | 0 | 0 | 0 | 0 | 0 |
| $TiO_2$ | 0 | 0 | 0 | 0 | 0 | 0 | 0 |
| $ZrO_2$ | 0 | 0 | 0 | 0 | 0 | 0 | 0 |
| $WO_3$ | 0 | 0 | 0 | 0 | 0 | 0 | 0 |
| $Y_2O_3$ | 0 | 0 | 0 | 0 | 0 | 0 | 0 |
| $Li_2O$ | 8.02 | 7.98 | 8.00 | 8.02 | 8.01 | 7.98 | 7.96 |
| $Na_2O$ | 0 | 0 | 0 | 0 | 0 | 0 | 0 |
| $K_2O$ | 0 | 0 | 0 | 0 | 0 | 0 | 0 |
| MgO | 0 | 0 | 0 | 0 | 0 | 0 | 0 |
| CaO | 0 | 0 | 0 | 0 | 0 | 0 | 0 |
| ZnO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |
| $Fe_2O_3$ | 0 | 0 | 0 | 0 | 0 | 0 | 0 |
| $SnO_2$ | 0 | 0 | 0 | 0 | 0 | 0 | 0 |
| $Al_2O_3 + B_2O_3$ | 28.69 | 30.24 | 32.41 | 34.32 | 36.33 | 40.37 | 42.23 |
| $P_2O_5 + TiO_2 + ZrO_2 + WO_3 + Y_2O_3 + ZnO$ | 0 | 0 | 0 | 0 | 0 | 0 | 0 |
| $Li_2O + N_2O$ | 8.02 | 7.98 | 8.00 | 8.02 | 8.01 | 7.98 | 7.96 |
| $R_2O$ | 8.02 | 7.98 | 8.00 | 8.02 | 8.01 | 7.98 | 7.96 |
| RO | 0 | 0 | 0 | 0 | 0 | 0 | 0 |
| $R_2O + RO$ | 8.02 | 7.98 | 8.00 | 8.02 | 8.01 | 7.98 | 7.96 |
| $Al_2O_3 - R_2O - RO$ | 4.07 | 3.97 | 4.07 | 4.05 | 4.05 | 7.97 | 9.94 |
| Density (g/cm³) | 2.258 | 2.251 | 2.245 | 2.239 | 2.233 | 2.281 | 2.307 |
| CTE at 500° C. cooling (ppm) | 4.4 | 4.53 | 4.59 | 4.92 | 5.2 | 4.85 | 4.84 |
| CTE at 300° C. cooling(ppm | 4.09 | 4.17 | 4.24 | 4.35 | 4.45 | 4.38 | 4.39 |
| CTE at 50° C. cooling(ppm) | 3.72 | 3.86 | 3.82 | 4.02 | 4.01 | 3.91 | 3.83 |
| Strain Pt. (° C.) | 504.6 | 499.6 | 489.1 | 479.1 | 475.5 | 506.7 | 519.4 |
| Anneal Pt. (° C.) | 552.8 | 546.1 | 534.9 | 524.4 | 519.9 | 550.9 | 563.7 |
| Softening Pt. (° C.) | — | — | — | — | — | — | — |
| Young's Modulus (GPa) | 65.1 | 63.7 | 62.8 | 61.7 | 60.4 | 66.8 | 69.7 |
| Shear modulus (GPa) | 26.5 | 25.9 | 25.4 | 24.9 | 24.3 | 26.7 | 27.9 |
| Poisson's ratio | 0.229 | 0.23 | 0.235 | 0.236 | 0.24 | 0.25 | 0.249 |
| Refractive index | 1.4974 | 1.4972 | 1.4977 | 1.498 | 1.4984 | 1.5080 | 1.5129 |
| SOC (nm/mm/MPa) | 3.886 | 3.995 | 4.001 | — | — | 3.834 | 3.7 |
| VFT A | −1.68 | −1.632 | −1.292 | −0.629 | −1.483 | — | — |
| VFT B | 4680.8 | 4543.1 | 3806.5 | 2604.1 | 3981.9 | — | — |
| VFT $T_o$ | 340.4 | 323 | 387.9 | 531.3 | 335.1 | — | — |
| 200 P Temperature (° C.) | 1516 | 1478 | 1447 | 1420 | 1387 | — | — |
| 35000 P Temperature (° C.) | 1092 | 1059 | 1040 | 1035 | 996 | — | — |
| 200000 P Temperature (° C.) | 1011 | 978 | 965 | 970 | 922 | — | — |
| Liquidus (gradient boat) duration (hours) | 72 | 72 | 72 | 72 | 72 | 72 | 72 |
| Air interface liqudus temperature (° C.) | 1295 | 1230 | 1250 | 1260 | 1230 | >1370 | >1375 |
| Internal liqudus temperature (° C.) | 1290 | 1250 | 1255 | 1240 | 1230 | >1370 | >1375 |
| Platinum interface liquidus temperature (° C.) | 1270 | 1250 | 1260 | 1250 | 1235 | >1370 | >1375 |
| Primary Phase | Boromullite | Boromullite | Boromullite | Boromullite | Boromullite | Boromullite | Boromullite |
| Liquidus Viscosity (kP) | 1.78 | 1.86 | 1.25 | 1.11 | 0.93 | — | — |

TABLE 1-continued

| | | | | | | | |
|---|---|---|---|---|---|---|---|
| $K_{Ic}$ (CN) | 0.760 | 0.783 | 0.791 | 0.771 | 0.788 | — | — |
| Standard Deviation (CN) | — | — | — | — | — | — | — |

| Example | C22 | C23 | C24 | C25 |
|---|---|---|---|---|
| $SiO_2$ | 47.81 | 49.79 | 47.87 | 45.79 |
| $Al_2O_3$ | 19.85 | 15.96 | 17.92 | 19.89 |
| $B_2O_3$ | 24.33 | 24.34 | 24.38 | 24.40 |
| $P_2O_5$ | 0 | 0 | 0 | 0 |
| $TiO_2$ | 0 | 0 | 0 | 0 |
| $ZrO_2$ | 0 | 0 | 0 | 0 |
| $WO_3$ | 0 | 0 | 0 | 0 |
| $Y_2O_3$ | 0 | 0 | 0 | 0 |
| $Li_2O$ | 8.01 | 9.90 | 9.84 | 9.91 |
| $Na_2O$ | 0 | 0 | 0 | 0 |
| $K_2O$ | 0 | 0 | 0 | 0 |
| MgO | 0 | 0 | 0 | 0 |
| CaO | 0 | 0 | 0 | 0 |
| ZnO | 0 | 0 | 0 | 0 |
| SrO | 0 | 0 | 0 | 0 |
| BaO | 0 | 0 | 0 | 0 |
| $Fe_2O_3$ | 0 | 0 | 0 | 0 |
| $SnO_2$ | 0 | 0 | 0 | 0 |
| $Al_2O_3 + B_2O_3$ | 44.18 | 40.30 | 42.30 | 44.29 |
| $P_2O_5 + TiO_2 + ZrO_2 + WO_3 + Y_2O_3 + ZnO$ | 0 | 0 | 0 | 0 |
| $Li_2O + N_2O$ | 8.01 | 9.90 | 9.84 | 9.91 |
| $R_2O$ | 8.01 | 9.90 | 9.84 | 9.91 |
| RO | 0 | 0 | 0 | 0 |
| $R_2O$ + RO | 8.01 | 9.90 | 9.84 | 9.91 |
| $Al_2O_3 - R_2O - RO$ | 11.84 | 6.06 | 8.08 | 9.98 |
| Density (g/cm³) | 2.33 | 2.279 | 2.304 | 2.328 |
| CTE at 500° C. cooling (ppm) | 4.78 | 5.33 | 5.29 | 5.18 |
| CTE at 300° C. cooling(ppm) | 4.39 | 4.75 | 4.81 | 4.74 |
| CTE at 50° C. cooling(ppm) | 3.87 | 4.25 | 4.24 | 4.14 |
| Strain Pt. (° C.) | 533.3 | 492.7 | 504.6 | 518.8 |
| Anneal Pt. (° C.) | 577.2 | 535.5 | 546.5 | 560.7 |
| Softening Pt. (° C.) | — | — | — | — |
| Young's Modulus (GPa) | 72.8 | 65.7 | 68.6 | 72.1 |
| Shear modulus (GPa) | 29.0 | 26.3 | 27.4 | 28.7 |
| Poisson's ratio | 0.255 | 0.251 | 0.251 | 0.255 |
| Refractive index | 1.5177 | 1.5099 | 1.5144 | 1.5197 |
| SOC (nm/mm/MPa) | 3.595 | 3.822 | 3.669 | 3.548 |
| VFT A | −0.012 | — | — | — |
| VFT B | 897.8 | — | — | — |
| VFT $T_o$ | 875.6 | — | — | — |
| 200 P Temperature (° C.) | 1264 | — | — | — |
| 35000 P Temperature (° C.) | 1073 | — | — | — |
| 200000 P Temperature (° C.) | 1045 | — | — | — |
| Liquidus (gradient boat) duration (hours) | 72 | 72 | 72 | 72 |
| Air interface liqudus temperature (° C.) | >1400 | >1385 | >1385 | >1425 |
| Internal liqudus temperature (° C.) | >1400 | >1385 | >1385 | >1425 |
| Platinum interface liquidus temperature (° C.) | >1400 | >1385 | >1385 | >1425 |
| Primary Phase | Boromullite | Boromullite | Boromullite | Boromullite |
| Liquidus Viscosity (kP) | — | — | — | — |
| $K_{Ic}$ (CN) | — | — | — | — |
| Standard Deviation (CN) | — | — | — | — |

TABLE 2

|  | C1 | C2 | C3 | C4 | C5 |
|---|---|---|---|---|---|
| $K_{Ic}$ (CN) | — | 0.844 | 0.845 | — | 0.783 |
| Standard Deviation (CN) | — | 0.012 | 0.018 | — | 0.024 |
| 700° C. for 1 hr. | | | | | |
| $K_{Ic}$ (CN) | — | — | — | — | — |
| Standard Deviation (CN) | — | — | — | — | — |
| Appearance | — | — | Transparent | Transparent | Transparent |
| 700° C. for 2 hrs. | | | | | |
| $K_{Ic}$ (CN) | — | — | — | — | 0.787 |
| Standard Deviation (CN) | — | — | — | — | 0.02 |
| Appearance | — | — | Transparent | Transparent | Transparent |
| 700° C. for 3 hrs. | | | | | |
| $K_{Ic}$ (CN) | — | — | — | — | 0.787 |
| Standard Deviation (CN) | — | — | — | — | 0.017 |
| Appearance | — | — | Transparent | Transparent | Transparent haze |
| 725° C. for 1 hr. | | | | | |
| $K_{Ic}$ (CN) | — | — | — | 0.822 | — |
| Standard Deviation (CN) | — | — | — | 0.009 | — |
| Appearance | — | — | Transparent | Transparent haze | — |
| 725° C. for 2 hrs. | | | | | |
| $K_{Ic}$ (CN) | — | — | — | 0.808 | — |
| Standard Deviation (CN) | — | — | — | 0.011 | — |
| Appearance | — | — | Transparent | Transparent haze | — |
| 725° C. for 3 hrs. | | | | | |
| $K_{Ic}$ (CN) | — | — | — | — | — |
| Standard Deviation (CN) | — | — | — | — | — |
| Appearance | — | — | Transparent | Translucent | — |
| 750° C. for 2 hrs. | | | | | |
| $K_{Ic}$ (CN) | — | — | 0.845 | — | — |
| Standard Deviation (CN) | — | — | 0.015 | — | — |
| Appearance | Clear | Clear | Transparent haze | Translucent | Translucent |
| 750° C. for 3 hrs. | | | | | |
| $K_{Ic}$ (CN) | — | — | — | — | — |
| Standard Deviation (CN) | — | — | — | — | — |
| Appearance | — | Transparent | Translucent | Opaque | Opaque |
| 750° C. for 4 hrs. | | | | | |
| $K_{Ic}$ (CN) | — | — | — | — | — |
| Standard Deviation (CN) | — | — | — | — | — |
| Appearance | Transparent | Transparent | Translucent | Opaque | Opaque |
| 800° C. for 0.5 hr. | | | | | |
| $K_{Ic}$ (CN) | — | — | — | — | — |
| Standard Deviation (CN) | — | — | — | — | — |
| Appearance | Transparent | Transparent | — | — | — |
| 800° C. for 1 hr. | | | | | |
| $K_{Ic}$ (CN) | — | 0.836 | — | — | — |
| Standard Deviation (CN) | — | 0.008 | — | — | — |
| Appearance | Transparent | Transparent haze | — | — | — |
| 800° C. for 2 hrs. | | | | | |
| $K_{Ic}$ (CN) | — | — | — | — | — |
| Standard Deviation (CN) | — | — | — | — | — |
| Appearance | Transparent | Translucent | — | — | — |
| 800° C. for 3 hrs. | | | | | |
| $K_{Ic}$ (CN) | — | — | — | — | — |
| Standard Deviation (CN) | — | — | — | — | — |
| Appearance | Transparent haze | — | — | — | — |

Figure 4:
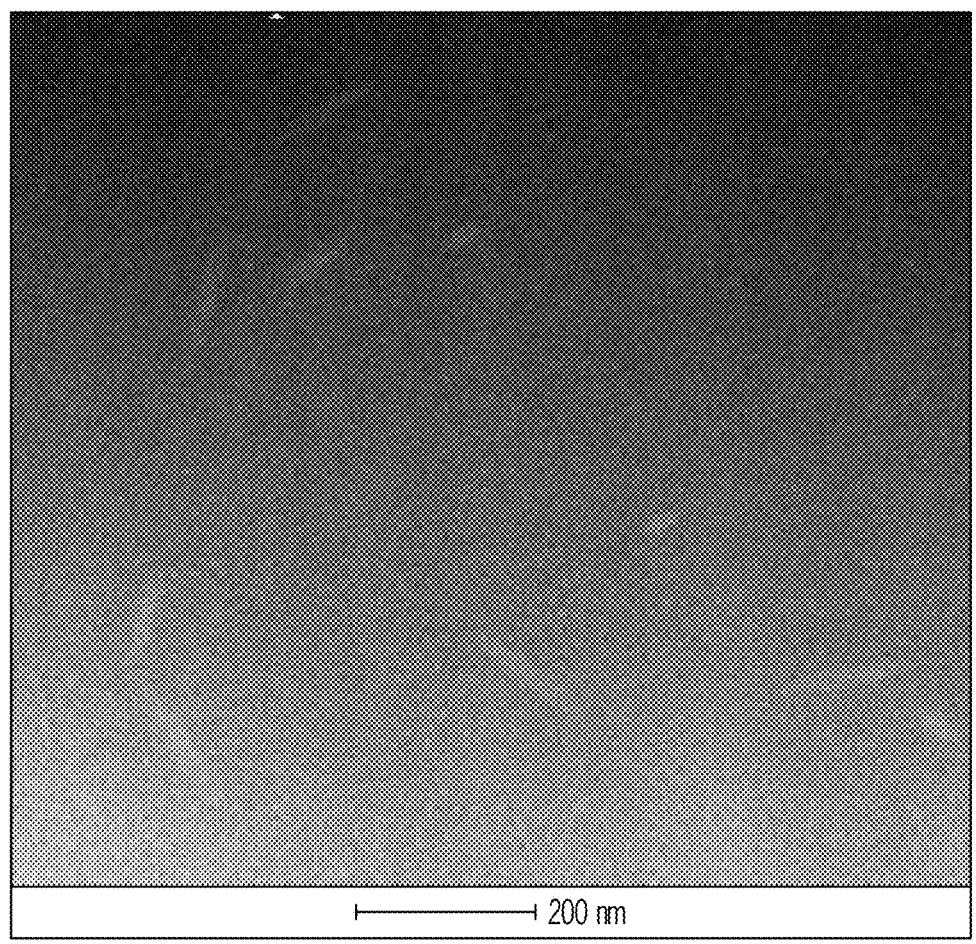
FIG. 4 is a transmission electron microscopy (TEM) image of a glass article made from a comparative glass composition and subjected to heat treatment.

Comparative glass compositions C1-C5 and C8-C25 phase separate due to the relatively high amount of $Al_2O_3+B_2O_3$ (e.g., at least 26.65 mol %). However, as shown in Table 2, comparative glass compositions C2, C3, and C5 do not show improvement in $K_{Ic}$ fracture toughness after being subjected to heat treatment. While not wishing to be bound by theory, it is believed that the lack of improvement in $K_{Ic}$ fracture toughness is due to the absence of a nucleating agent in these comparative glass compositions. For example, the lack of improvement may be due to lack of formation of the second phase to affect crack motion or the shape of the second phase is insufficient (e.g., the second phase may be in the form of droplets instead of an interconnected structure). Referring now to FIG. 4, the TEM image of comparative glass composition C3 after heat treatment of 700° C. for 3 hours shows a dispersed second phase of nano-sized crystalline needles. The lack of improvement in $K_{Ic}$ fracture toughness of comparative glass composition C3 after heat treatment of 700° C. for 3 hours may be attributed to the limited amount of crystalline needles. EDS/EELS indicates that the second phase enriched in aluminum/boron relative to the bulk glass compositions. While not wishing to be bound by theory, in view of the dispersed second phase and evidence of crystallization, it is believed that heat treatment of 700° C. for 3 hours to comparative glass composition C3 lacking a nucleating agent nucleates and forms crystals with the detected phase in the comparative glass composition C3.

Comparative glass compositions C6 and C7 do not phase separate. While not wishing to be bound by theory, it is believed that comparative glass composition C6 does not phase separate because of the relatively high amount of MgO (i.e., 4.03 mol %), which stabilizes the glass composition. While not wishing to be bound by theory, it is believed that comparative glass composition C7 does not phase separate because of the relatively low amount of $Al_2O_3+B_2O_3$ (i.e., 24.76 mol %) and the absence of a nucleating agent.

Examples Group 2: $P_2O_5$, $ZrO_2$, ZnO, or $WO_3$ as a Nucleating Agent

Table 3 shows comparative glass compositions (in terms of mol %) and the respective properties of the glass compositions. Glasses are formed having the comparative glass compositions C26-C37. In particular, comparative compositions C26-C37 include $P_2O_5$, $ZrO_2$, ZnO, or $WO_3$ as a nucleating agent. Table 4 shows $K_{Ic}$ fracture toughness and appearance of comparative glass composition C28 after being subjected to various heat treatments.

TABLE 3

| Example | C26 | C27 | C28 | C29 | C30 | C31 | C32 |
|---|---|---|---|---|---|---|---|
| $SiO_2$ | 63.09 | 62.72 | 61.83 | 63.14 | 62.63 | 61.61 | 63.12 |
| $Al_2O_3$ | 12.05 | 12.08 | 12.03 | 12.03 | 12.03 | 12.03 | 12.03 |
| $B_2O_3$ | 14.43 | 14.30 | 14.24 | 14.41 | 14.38 | 14.38 | 14.44 |
| $P_2O_5$ | 0 | 0 | 0 | 0.50 | 1.00 | 2.00 | 0 |
| $TiO_2$ | 0 | 0 | 0 | 0 | 0 | 0 | 0 |
| $ZrO_2$ | 0.51 | 1.03 | 2.04 | 0 | 0 | 0 | 0 |
| $WO_3$ | 0 | 0 | 0 | 0 | 0 | 0 | 0 |
| $Y_2O_3$ | 0 | 0 | 0 | 0 | 0 | 0 | 0 |
| $Li_2O$ | 7.88 | 7.82 | 7.80 | 7.87 | 7.92 | 7.93 | 7.87 |
| $Na_2O$ | 1.84 | 1.85 | 1.84 | 1.84 | 1.84 | 1.84 | 1.83 |
| $K_2O$ | 0.20 | 0.19 | 0.20 | 0.19 | 0.19 | 0.20 | 0.19 |
| MgO | 0 | 0 | 0 | 0 | 0 | 0 | 0 |
| CaO | 0.01 | 0.01 | 0.01 | 0.01 | 0.01 | 0.01 | 0.01 |
| ZnO | 0 | 0 | 0 | 0 | 0 | 0 | 0.51 |
| SrO | 0 | 0 | 0 | 0 | 0 | 0 | 0 |
| BaO | 0 | 0 | 0 | 0 | 0 | 0 | 0 |
| $Fe_2O_3$ | 0 | 0 | 0 | 0 | 0 | 0 | 0 |
| $SnO_2$ | 0 | 0 | 0 | 0 | 0 | 0 | 0 |
| $Al_2O_3 + B_2O_3$ | 26.48 | 26.38 | 26.29 | 26.44 | 26.41 | 26.41 | 26.47 |
| $P_2O_5 + TiO_2 + ZrO_2 + WO_3 + Y_2O_3 + ZnO$ | 0.51 | 1.03 | 2.04 | 0.50 | 1.00 | 2.00 | 0.51 |
| $Li_2O + N_2O$ | 9.72 | 9.67 | 9.64 | 9.71 | 9.76 | 9.77 | 9.7 |
| $R_2O$ | 9.92 | 9.86 | 9.84 | 9.9 | 9.95 | 9.97 | 9.89 |
| RO | 0.01 | 0.01 | 0.01 | 0.01 | 0.01 | 0.01 | 0.52 |
| $R_2O + RO$ | 9.93 | 9.87 | 9.85 | 9.91 | 9.96 | 9.98 | 10.41 |
| $Al_2O_3 - R_2O - RO$ | 2.12 | 2.21 | 2.2 | 2.12 | 2.07 | 2.05 | 1.62 |
| Density (g/cm³) | 2.291 | 2.307 | 2.335 | 2.273 | 2.271 | 2.265 | 2.288 |
| CTE at 500° C. cooling (ppm) | — | — | — | — | — | — | — |
| CTE at 300° C. cooling(ppm) | — | — | — | — | — | — | — |
| CTE at 50° C. cooling(ppm) | — | — | — | — | — | — | — |
| Strain Pt. (° C.) | 499.5 | 500 | 509 | 489.8 | 486.9 | 481 | 490.8 |
| Anneal Pt. (° C.) | 547.9 | 548.3 | 556.8 | 538.1 | 535.9 | 529.1 | 538.8 |
| Softening Pt. (° C.) | — | — | — | — | — | — | — |
| Young's Modulus (GPa) | 66.3 | 66.3 | 66.3 | 65.6 | 64.9 | 63.7 | 66.5 |
| Shear modulus (GPa) | 27.2 | 27.5 | 28.1 | 26.7 | 26.5 | 26.1 | 27.0 |
| Poisson's ratio | 0.229 | 0.232 | 0.231 | 0.229 | 0.227 | 0.222 | 0.228 |
| Refractive index | — | — | — | — | — | — | — |

TABLE 3-continued

| | | | | | | | |
|---|---|---|---|---|---|---|---|
| SOC (nm/mm/MPa) | — | — | — | — | — | — | — |
| VFT A | −4.191 | −2.873 | −2.249 | −3.099 | −3.32 | −3.294 | −3.086 |
| VFT B | 11065.7 | 7338.2 | 5689.1 | 8104.3 | 8657.4 | 8735.7 | 8020.4 |
| VFT $T_o$ | −203.3 | 75.4 | 228.3 | 19.7 | −22.5 | −38.5 | 19.5 |
| 200 P Temperature (° C.) | 1501 | 1494 | 1479 | 1520 | 1518 | 1523 | 1508 |
| 35000 P Temperature (° C.) | 1064 | 1065 | 1066 | 1080 | 1078 | 1076 | 1071 |
| 200000 P Temperature (° C.) | 962 | 973 | 982 | 984 | 982 | 978 | 976 |
| Liquidus (gradient boat) duration (hours) | 24 | 24 | 24 | 24 | 24 | 24 | 24 |
| Air interface liqudus temperature (° C.) | 1295 | >1365 | >1430 | 1070 | 1045 | 915 | 1060 |
| Internal liqudus temperature (° C.) | 1240 | >1365 | >1430 | 1070 | 1020 | 910 | 1060 |
| Platinum interface liquidus temperature (° C.) | 1210 | >1365 | >1430 | 1040 | 995 | 905 | 1040 |
| Primary Phase | Zircon | Zircon | Zircon | Boromullite | Boromullite | Spodumene | Boromullite |
| Liquidus Viscosity (kP) | 2.99 | <0.66 | <0.31 | 41.42 | 96.49 | 824.17 | 41.90 |
| $K_{Ic}$ (CN) | 0.753 | 0.748 | 0.756 | 0.705 | 0.683 | — | 0.757 |
| Standard Deviation (CN) | 0.014 | 0.032 | 0.01 | 0.037 | 0.037 | — | 0.019 |

| Example | C33 | C34 | C35 | C36 | C37 |
|---|---|---|---|---|---|
| $SiO_2$ | 62.79 | 61.84 | 62.95 | 62.42 | 61.22 |
| $Al_2O_3$ | 12.07 | 12.09 | 12.06 | 12.08 | 12.11 |
| $B_2O_3$ | 14.3 | 14.16 | 14.50 | 14.47 | 14.55 |
| $P_2O_5$ | 0 | 0 | 0 | 0 | 0 |
| $TiO_2$ | 0 | 0 | 0 | 0 | 0 |
| $ZrO_2$ | 0 | 0 | 0 | 0 | 0 |
| $WO_3$ | 0 | 0 | 0.49 | 0.98 | 1.99 |
| $Y_2O_3$ | 0 | 0 | 0 | 0 | 0 |
| $Li_2O$ | 7.79 | 7.86 | 7.96 | 8.00 | 8.07 |
| $Na_2O$ | 1.82 | 1.81 | 1.85 | 1.85 | 1.86 |
| $K_2O$ | 0.19 | 0.19 | 0.19 | 0.19 | 0.20 |
| MgO | 0 | 0 | 0 | 0 | 0 |
| CaO | 0.01 | 0.01 | 0 | 0 | 0 |
| ZnO | 1.03 | 2.05 | 0 | 0 | 0 |
| SrO | 0 | 0 | 0 | 0 | 0 |
| BaO | 0 | 0 | 0 | 0 | 0 |
| $Fe_2O_3$ | 0 | 0 | 0 | 0 | 0 |
| $SnO_2$ | 0 | 0 | 0 | 0 | 0 |
| $Al_2O_3 + B_2O_3$ | 26.37 | 26.25 | 26.56 | 26.55 | 26.66 |
| $P_2O_5 + TiO_2 + ZrO_2 + WO_3 + Y_2O_3 + ZnO$ | 1.03 | 2.05 | 0.49 | 0.98 | 1.99 |
| $Li_2O + N_2O$ | 9.61 | 9.67 | 9.81 | 9.85 | 9.93 |
| $R_2O$ | 9.8 | 9.86 | 10.00 | 10.04 | 10.13 |
| RO | 1.04 | 2.06 | 0 | 0 | 0 |
| $R_2O$ + RO | 10.84 | 11.92 | 10.00 | 10.04 | 10.13 |
| $Al_2O_3 - R_2O - RO$ | 1.23 | 0.17 | 2.06 | 2.04 | 1.98 |
| Density (g/cm³) | 2.299 | 2.322 | 2.301 | 2.325 | 2.374 |
| CTE at 500° C. cooling (ppm) | — | — | — | — | — |
| CTE at 300° C. cooling(ppm) | — | — | — | — | — |
| CTE at 50° C. cooling(ppm) | — | — | — | — | — |
| Strain Pt. (° C.) | 487.1 | 485.7 | 493.7 | 484.7 | 475.6 |
| Anneal Pt. (° C.) | 534.2 | 531.5 | 541.6 | 532.4 | 522.3 |
| Softening Pt. (° C.) | — | — | — | — | — |
| Young's Modulus (GPa) | 67.2 | 67.8 | 65.8 | 65.5 | 65.1 |
| Shear modulus (GPa) | 27.3 | 27.6 | 26.8 | 26.6 | 26.5 |
| Poisson's ratio | 0.229 | 0.23 | 0.23 | 0.229 | 0.23 |
| Refractive index | — | — | — | — | — |
| SOC (nm/mm/MPa) | — | — | — | — | — |
| VFT A | −3.083 | −2.858 | −3.099 | −3.007 | −2.704 |
| VFT B | 7953.5 | 7318.1 | 8027.7 | 7783.8 | 7106.4 |
| VFT $T_o$ | 17.1 | 53 | 22.6 | 30.7 | 62.5 |

TABLE 3-continued

| | | | | | |
|---|---|---|---|---|---|
| 200 P Temperature (° C.) | 1494 | 1472 | 1509 | 1497 | 1482 |
| 35000 P Temperature (° C.) | 1060 | 1042 | 1073 | 1062 | 1043 |
| 200000 P Temperature (° C.) | 966 | 950 | 978 | 968 | 950 |
| Liquidus (gradient boat) duration (hours) | 24 | 24 | 24 | 24 | 24 |
| Air interface liqudus temperature (° C.) | 1120 | 1170 | 1100 | 1115 | 1095 |
| Internal liqudus temperature (° C.) | 1080 | 1115 | 1080 | 1110 | 1090 |
| Platinum interface liquidus temperature (° C.) | 1070 | 1105 | 1080 | 1095 | 1090 |
| Primary Phase | Gahnite | Gahnite | Boromullite | Boromullite | Boromullite |
| Liquidus Viscosity (kP) | 25.11 | 10.79 | 31.11 | 16.03 | 16.30 |
| $K_{Ic}$ (CN) | 0.716 | 0.729 | 0.764 | 0.706 | 0.712 |
| Standard Deviation (CN) | 0.037 | — | 0.013 | 0.011 | 0.029 |

TABLE 4

| Example | C28 |
|---|---|
| $K_{Ic}$ (CN) | 0.756 |
| Standard Deviation (CN) | 0.010 |
| 750° C. for 3.5 hrs. | |
| $K_{Ic}$ (CN) | 0.745 |
| Standard Deviation (CN) | 0.010 |
| Appearance | Transparent |
| 800° C. for 2 hrs. | |
| $K_{Ic}$ (CN) | — |
| Standard Deviation (CN) | — |
| Appearance | Transparent haze; blue |

Comparative glass compositions C26, C27, and C29-C37 do not phase separate as evidenced by the glass compositions remaining transparent after being subjected to heat treatment.

Figure 5:
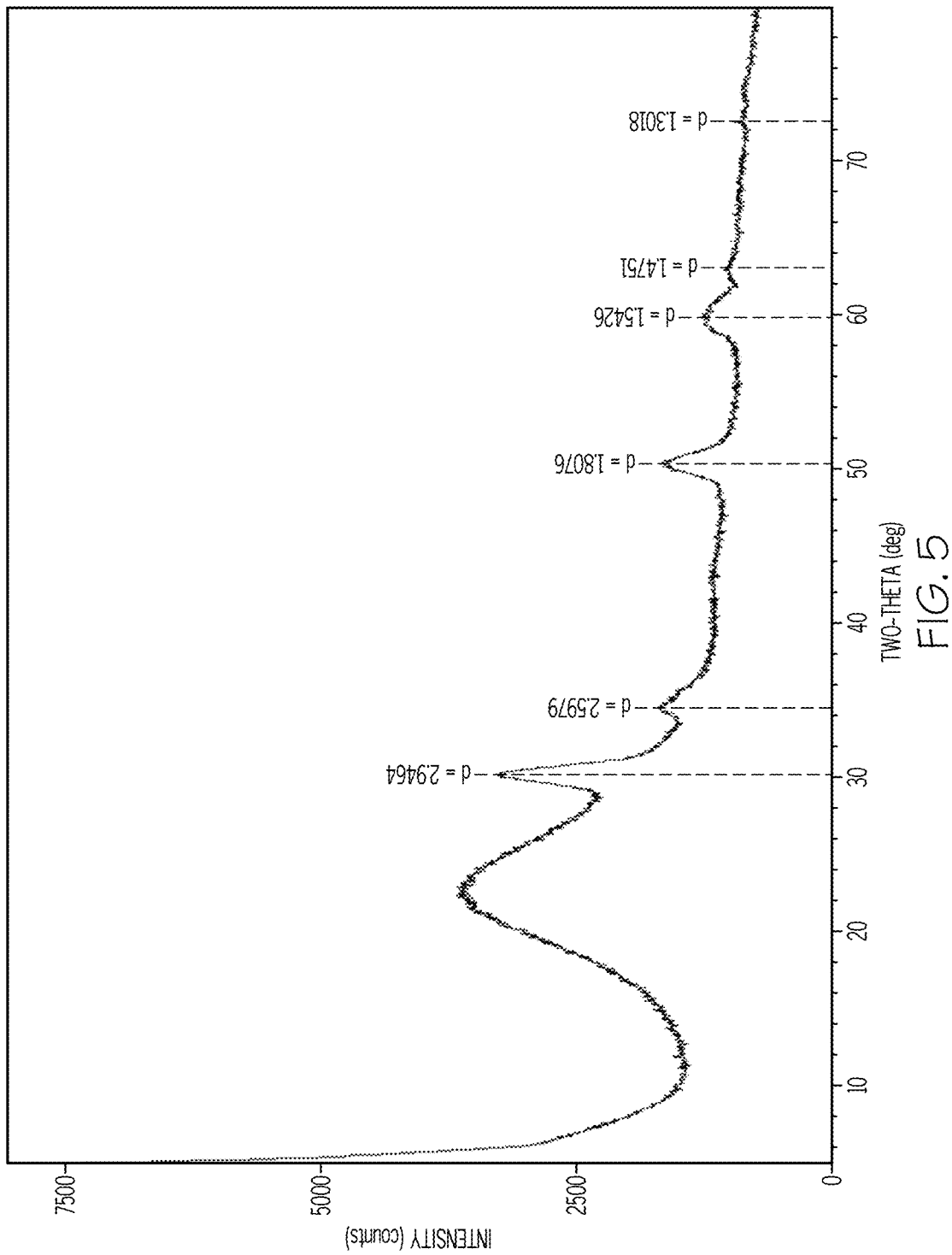
FIG. 5 is an X-ray diffraction (XRD) spectrum of a glass article made from a comparative glass composition and subjected to heat treatment.

Referring now to FIG. 5, the XRD spectrum for comparative glass composition C28 after being subjected to heat treatment of 750° C. for 2 hours includes peaks that evidence the presence of a dispersed second phase. While not wishing to be bound by theory, heat treatment of 750° C. for 2 hours to comparative glass composition C28 including $ZrO_2$ as a nucleating agent nucleates and forms crystals with the detected phases in the comparative glass composition C28. Moreover, as shown in Table 4, comparative glass composition C28 does not show improvement in $K_{Ic}$ fracture toughness after being subjected to heat treatment of 750° C. for 2 hours.

Examples Group 3: $TiO_2$, $Y_2O_3$, or a Combination Thereof as a Nucleating Agent Table 5 shows example glass compositions (in terms of mol %) and the respective properties of the glass compositions. Glasses are formed having example glass compositions 1-49. In particular, example glass compositions 1-49 include $TiO_2$, $Y_2O_3$, or a combination thereof as a nucleating agent. Table 6 shows $K_{Ic}$ fracture toughness and appearance of example glass compositions 1, 2, and 16-19 after being subjected to various heat treatments.

TABLE 5

| Example | 1 | 2 | 3 | 4 | 5 | 6 | 7 |
|---|---|---|---|---|---|---|---|
| $SiO_2$ | 61.56 | 61.58 | 59.52 | 58.55 | 58.51 | 57.47 | 59.52 |
| $Al_2O_3$ | 12.02 | 12.01 | 12.03 | 13.03 | 12.04 | 13.02 | 12.05 |
| $B_2O_3$ | 14.54 | 14.37 | 14.58 | 14.49 | 15.47 | 15.48 | 14.56 |
| $P_2O_5$ | 0 | 0 | 0 | 0 | 0 | 0 | 0 |
| $TiO_2$ | 1.97 | 0 | 0.01 | 0.01 | 0.01 | 0.01 | 1.96 |
| $ZrO_2$ | 0 | 0 | 0 | 0 | 0 | 0 | 0 |
| $WO_3$ | 0 | 0 | 0 | 0 | 0 | 0 | 0 |
| $Y_2O_3$ | 0 | 1.94 | 2.00 | 2.00 | 2.00 | 2.01 | 0 |
| $Li_2O$ | 7.86 | 8.03 | 9.74 | 9.79 | 9.85 | 9.90 | 9.79 |
| $Na_2O$ | 1.85 | 1.87 | 1.89 | 1.89 | 1.89 | 1.88 | 1.89 |
| $K_2O$ | 0.19 | 0.19 | 0.20 | 0.20 | 0.20 | 0.20 | 0.20 |
| MgO | 0 | 0 | 0 | 0 | 0 | 0 | 0 |
| CaO | 0 | 0.01 | 0 | 0 | 0 | 0 | 0 |
| ZnO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |

TABLE 5-continued

| | | | | | | | |
|---|---|---|---|---|---|---|---|
| Fe$_2$O$_3$ | 0 | 0 | 0 | 0 | 0 | 0 | 0 |
| SnO$_2$ | 0 | 0 | 0 | 0 | 0 | 0 | 0 |
| Al$_2$O$_3$ + B$_2$O$_3$ | 26.56 | 26.38 | 26.61 | 27.52 | 27.51 | 28.5 | 26.61 |
| P$_2$O$_5$ + TiO$_2$ + ZrO$_2$ + WO$_3$ + Y$_2$O$_3$ + ZnO | 1.97 | 1.94 | 2.01 | 2.01 | 2.01 | 2.02 | 1.96 |
| Li$_2$O + N$_2$O | 9.71 | 9.9 | 11.63 | 11.68 | 11.74 | 11.78 | 11.68 |
| R$_2$O | 9.90 | 10.09 | 11.83 | 11.88 | 11.94 | 11.98 | 11.88 |
| RO | 0.01 | 0 | 0 | 0 | 0 | 0 | 0 |
| R$_2$O + RO | 9.91 | 10.09 | 11.83 | 11.88 | 11.94 | 11.98 | 11.88 |
| Al$_2$O$_3$ − R$_2$O − RO | 2.11 | 1.92 | 0.20 | 1.15 | 0.10 | 1.04 | 0.17 |
| Density (g/cm$^3$) | 2.294 | 2.400 | — | — | — | — | — |
| CTE at 500° C. cooling (ppm) | — | — | — | — | — | — | — |
| CTE at 300° C. cooling(ppm | — | — | — | — | — | — | — |
| CTE at 50° C. cooling(ppm) | — | — | — | — | — | — | — |
| Strain Pt. (° C.) | 487.3 | 525 | — | — | — | — | — |
| Anneal Pt. (° C.) | 534 | 572.3 | — | — | — | — | — |
| Softening Pt. (° C.) | — | — | — | — | — | — | — |
| Young's Modulus (GPa) | 66.3 | 72.7 | — | — | — | — | — |
| Shear modulus (GPa) | 27.1 | 29.5 | — | — | — | — | — |
| Poisson's ratio | 0.224 | 0.231 | — | — | — | — | — |
| Refractive index | — | — | — | — | — | — | — |
| SOC (nm/mm/MPa) | — | — | — | — | — | — | — |
| VFT A | −3.083 | −2.172 | −1.983 | −2.063 | −2.092 | −2.045 | −2.478 |
| VFT B | 7793 | 5425.5 | 4909.8 | 4933.8 | 5058.2 | 4844 | 6443.4 |
| VFT T$_o$ | 25.1 | 224.5 | 212.7 | 235.1 | 199.9 | 228.8 | 74.0 |
| 200 P Temperature (° C.) | 1473 | 1437 | 1359 | 1366 | 1351 | 1343 | 1422 |
| 35000 P Temperature (° C.) | 1047 | 1032 | 965 | 982 | 962 | 964 | 992 |
| 200000 P Temperature (° C.) | 955 | 951 | 887 | 905 | 884 | 888 | 902 |
| Liquidus (gradient boat) duration (hours) | 24 | 24 | 24 | 24 | 24 | 24 | 24 |
| Air interface liqudus temperature (° C.) | 1075 | 1200 | 1190 | 1195 | 1200 | 1185 | 1060 |
| Internal liqudus temperature (° C.) | 1090 | 1095 | 1120 | 1175 | 1195 | 1160 | 1030 |
| Platinum interface liquidus temperature (° C.) | 1070 | 1095 | 1130 | 1120 | 1175 | 1125 | 1030 |
| Primary Phase | Boromullite | Unknown | Keivyite | Keivyite | Keivyite | Rutile | Rutile |
| Liquidus Viscosity (kP) | 17.18 | 11.5 | 2.68 | 1.54 | 0.98 | 1.44 | 18.28 |
| K$_{Ic}$ (CN) | 0.763 | 0.787 | — | — | — | — | — |
| Standard Deviation (CN) | 0.013 | 0.016 | — | — | — | — | — |

| Example | 8 | 9 | 10 | 11 | 12 | 13 | 14 |
|---|---|---|---|---|---|---|---|
| SiO$_2$ | 58.46 | 57.35 | 57.59 | 58.64 | 58.60 | 57.50 | 57.51 |
| Al$_2$O$_3$ | 13.05 | 14.04 | 13.04 | 12.07 | 12.06 | 13.12 | 12.04 |
| B$_2$O$_3$ | 14.65 | 14.66 | 15.42 | 15.44 | 14.35 | 14.35 | 15.49 |
| P$_2$O$_5$ | 0 | 0 | 0 | 0 | 0 | 0 | 0 |
| TiO$_2$ | 1.96 | 1.97 | 1.97 | 1.97 | 0.01 | 0.01 | 0.01 |
| ZrO$_2$ | 0 | 0 | 0 | 0 | 0 | 0 | 0 |
| WO$_3$ | 0 | 0 | 0 | 0 | 0 | 0 | 0 |
| Y$_2$O$_3$ | 0 | 0 | 0 | 0 | 2.01 | 2.03 | 2.01 |
| Li$_2$O | 9.77 | 9.86 | 9.85 | 9.76 | 10.85 | 10.86 | 10.83 |
| Na$_2$O | 1.88 | 1.90 | 1.89 | 1.89 | 1.90 | 1.88 | 1.88 |
| K$_2$O | 0.20 | 0.20 | 0.20 | 0.19 | 0.20 | 0.20 | 0.20 |
| MgO | 0 | 0 | 0 | 0 | 0 | 0 | 0 |
| CaO | 0 | 0 | 0 | 0 | 0 | 0 | 0 |
| ZnO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |

TABLE 5-continued

|  |  |  |  |  |  |  |  |
|---|---|---|---|---|---|---|---|
| $Fe_2O_3$ | 0 | 0 | 0 | 0 | 0 | 0 | 0 |
| $SnO_2$ | 0 | 0 | 0 | 0 | 0 | 0 | 0 |
| $Al_2O_3 + B_2O_3$ | 27.7 | 28.7 | 28.46 | 27.51 | 26.41 | 27.47 | 27.53 |
| $P_2O_5 + TiO_2 + ZrO_2 +$ $WO_3 + Y_2O_3 + ZnO$ | 1.96 | 1.97 | 1.97 | 1.97 | 2.02 | 2.04 | 2.02 |
| $Li_2O + N_2O$ | 11.65 | 11.76 | 11.74 | 11.65 | 12.75 | 12.74 | 12.71 |
| $R_2O$ | 11.85 | 11.96 | 11.94 | 11.84 | 12.95 | 12.94 | 12.91 |
| RO | 0 | 0 | 0 | 0 | 0 | 0 | 0 |
| $R_2O + RO$ | 11.85 | 11.96 | 11.94 | 11.84 | 12.95 | 12.94 | 12.91 |
| $Al_2O_3 - R_2O - RO$ | 1.20 | 2.08 | 1.10 | 0.23 | −0.89 | 0.18 | −0.87 |
| Density (g/cm³) | — | — | — | — | — | — | — |
| CTE at 500° C. cooling (ppm) | — | — | — | — | — | — | — |
| CTE at 300° C. cooling(ppm | — | — | — | — | — | — | — |
| CTE at 50° C. cooling(ppm) | — | — | — | — | — | — | — |
| Strain Pt. (° C.) | — | — | — | — | — | — | — |
| Anneal Pt. (° C.) | — | — | — | — | — | — | — |
| Softening Pt. (° C.) | — | — | — | — | — | — | — |
| Young's Modulus (GPa) | — | — | — | — | — | — | — |
| Shear modulus (GPa) | — | — | — | — | — | — | — |
| Poisson's ratio | — | — | — | — | — | — | — |
| Refractive index | — | — | — | — | — | — | — |
| SOC (nm/mm/MPa) | — | — | — | — | — | — | — |
| VFT A | −2.68 | −2.484 | −2.198 | −2.601 | −1.796 | −1.853 | −1.758 |
| VFT B | 6591.9 | 6022.3 | 5576.9 | 6714.6 | 4505.6 | 4588.6 | 4444.1 |
| VFT $T_o$ | 86.4 | 137.2 | 158.9 | 44.7 | 228.9 | 237.4 | 226.6 |
| 200 P Temperature (° C.) | 1410 | 1396 | 1398 | 1414 | 1329 | 1342 | 1321 |
| 35000 P Temperature (° C.) | 999 | 994 | 986 | 984 | 940 | 955 | 932 |
| 200000 P Temperature (° C.) | 912 | 911 | 903 | 894 | 864 | 879 | 856 |
| Liquidus (gradient boat) duration (hours) | 24 | 24 | 24 | 24 | 24 | 24 | 24 |
| Air interface liqudus temperature (° C.) | 1055 | 1095 | 1060 | 1040 | 1210 | 1190 | 1200 |
| Internal liqudus temperature (° C.) | 1030 | 1095 | 1025 | 1010 | 1170 | 1160 | 1175 |
| Platinum interface liquidus temperature (° C.) | 1025 | 1060 | 1010 | 1005 | 1145 | 1150 | 1145 |
| Primary Phase | Boromullite | Rutile | Keivyite | Rutile | Keivyite | Keivyite | Keivyite |
| Liquidus Viscosity (kP) | 20.23 | 6.36 | 17.42 | 22.64 | 0.98 | 1.32 | 0.85 |
| $K_{Ic}$ (CN) | — | — | — | — | — | — | — |
| Standard Deviation (CN) | — | — | — | — | — | — | — |

| Example | 15 | 16 | 17 | 18 | 19 | 20 | 21 |
|---|---|---|---|---|---|---|---|
| $SiO_2$ | 56.57 | 58.77 | 57.57 | 56.67 | 56.63 | 57.81 | 58.29 |
| $Al_2O_3$ | 13.04 | 12.05 | 13.07 | 14.04 | 13.07 | 12.08 | 13.17 |
| $B_2O_3$ | 15.50 | 14.35 | 14.50 | 14.41 | 15.37 | 15.28 | 14.90 |
| $P_2O_5$ | 0 | 0 | 0 | 0 | 0 | 0 | 0 |
| $TiO_2$ | 0.01 | 1.97 | 1.97 | 1.98 | 1.97 | 1.97 | 0.01 |
| $ZrO_2$ | 0 | 0 | 0 | 0 | 0 | 0 | 0 |
| $WO_3$ | 0 | 0 | 0 | 0 | 0 | 0 | 0 |
| $Y_2O_3$ | 2.00 | 0 | 0 | 0 | 0 | 0 | 1.42 |
| $Li_2O$ | 10.77 | 10.74 | 10.78 | 10.77 | 10.83 | 10.73 | 10.06 |
| $Na_2O$ | 1.88 | 1.89 | 1.88 | 1.89 | 1.88 | 1.91 | 1.92 |
| $K_2O$ | 0.20 | 0.20 | 0.19 | 0.20 | 0.20 | 0.20 | 0.20 |
| MgO | 0 | 0 | 0 | 0 | 0 | 0 | 0.02 |
| CaO | 0 | 0 | 0 | 0 | 0 | 0 | 0.02 |
| ZnO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |

TABLE 5-continued

| | | | | | | | |
|---|---|---|---|---|---|---|---|
| Fe$_2$O$_3$ | 0 | 0 | 0 | 0 | 0 | 0 | 0 |
| SnO$_2$ | 0 | 0 | 0 | 0 | 0 | 0 | 0 |
| Al$_2$O$_3$ + B$_2$O$_3$ | 28.54 | 26.4 | 27.57 | 28.45 | 28.44 | 27.36 | 28.07 |
| P$_2$O$_5$ + TiO$_2$ + ZrO$_2$ + WO$_3$ + Y$_2$O$_3$ + ZnO | 2.01 | 1.97 | 1.97 | 1.98 | 1.97 | 1.97 | 1.43 |
| Li$_2$O + N$_2$O | 12.65 | 12.63 | 12.66 | 12.66 | 12.71 | 12.64 | 11.98 |
| R$_2$O | 12.85 | 12.83 | 12.85 | 12.86 | 12.91 | 12.84 | 12.18 |
| RO | 0 | 0 | 0 | 0 | 0 | 0 | 0.04 |
| R$_2$O + RO | 12.85 | 12.83 | 12.85 | 12.86 | 12.91 | 12.84 | 12.22 |
| Al$_2$O$_3$ − R$_2$O − RO | 0.19 | −0.78 | 0.22 | 1.18 | 0.16 | −0.76 | 0.95 |
| Density (g/cm$^3$) | — | — | — | — | — | — | — |
| CTE at 500° C. cooling (ppm) | — | — | — | — | — | — | — |
| CTE at 300° C. cooling(ppm | — | — | — | — | — | — | — |
| CTE at 50° C. cooling(ppm) | — | — | — | — | — | — | — |
| Strain Pt. (° C.) | — | — | — | — | — | — | — |
| Anneal Pt. (° C.) | — | — | — | — | — | — | — |
| Softening Pt. (° C.) | — | — | — | — | — | — | — |
| Young's Modulus (GPa) | — | — | — | — | — | — | — |
| Shear modulus (GPa) | — | — | — | — | — | — | — |
| Poisson's ratio | — | — | — | — | — | — | — |
| Refractive index | — | 1.5146 | 1.5144 | 1.5162 | 1.5154 | 1.5156 | — |
| SOC (nm/mm/MPa) | — | 3.719 | 3.802 | 3.634 | 3.719 | 3.632 | — |
| VFT A | −1.966 | −2.135 | −2.213 | −2.406 | −2.278 | −2.192 | −1.942 |
| VFT B | 4658 | 5737.3 | 5620.4 | 5840 | 5667.6 | 5786.7 | 4894.4 |
| VFT T$_o$ | 230.6 | 96.1 | 138.4 | 135.9 | 123.1 | 86.2 | 200.2 |
| 200 P Temperature (° C.) | 1322 | 1389 | 1383 | 1377 | 1361 | 1374 | 1354 |
| 35000 P Temperature (° C.) | 946 | 955 | 970 | 976 | 954 | 945 | 955 |
| 200000 P Temperature (° C.) | 872 | 868 | 886 | 894 | 871 | 858 | 876 |
| Liquidus (gradient boat) duration (hours) | 24 | 24 | 24 | 24 | 24 | 24 | 24 |
| Air interface liqudus temperature (° C.) | 1190 | 1040 | 1030 | 1055 | 1040 | 1030 | 1180 |
| Internal liqudus temperature (° C.) | 1175 | 1030 | 1030 | 1045 | 1030 | 1020 | 1125 |
| Platinum interface liquidus temperature (° C.) | 1125 | 1000 | 1005 | 1030 | 1030 | 1010 | 1135 |
| Primary Phase | Keivyite | Rutile | Rutile | Rutile | Rutile | Rutile | Keivyite |
| Liquidus Viscosity (kP) | 0.93 | 10.19 | 12.32 | 10.42 | 9.36 | 10.11 | 2.24 |
| K$_{Ic}$ (CN) | — | — | — | — | — | 0.815 | — |
| Standard Deviation (CN) | — | — | — | — | — | 0.012 | — |

| Example | 22 | 23 | 24 | 25 | 26 | 27 | 28 |
|---|---|---|---|---|---|---|---|
| SiO$_2$ | 56.80 | 57.65 | 56.51 | 58.63 | 57.33 | 56.52 | 58.26 |
| Al$_2$O$_3$ | 13.01 | 13.04 | 13.05 | 13.10 | 13.06 | 13.00 | 13.06 |
| B$_2$O$_3$ | 15.74 | 14.66 | 15.74 | 14.58 | 14.74 | 15.69 | 14.71 |
| P$_2$O$_5$ | 0 | 0 | 0 | 0 | 0 | 0 | 0 |
| TiO$_2$ | 0.01 | 0.01 | 0.01 | 0.01 | 0.01 | 0 | 0 |
| ZrO$_2$ | 0 | 0 | 0 | 0 | 0 | 0 | 0 |
| WO$_3$ | 0 | 0 | 0 | 0 | 0 | 0 | 0 |
| Y$_2$O$_3$ | 1.41 | 1.61 | 1.62 | 1.62 | 1.82 | 1.81 | 1.81 |
| Li$_2$O | 10.89 | 10.89 | 10.96 | 9.92 | 10.91 | 10.85 | 10.01 |
| Na$_2$O | 1.90 | 1.90 | 1.89 | 1.90 | 1.89 | 1.90 | 1.91 |
| K$_2$O | 0.20 | 0.20 | 0.20 | 0.20 | 0.20 | 0.20 | 0.20 |
| MgO | 0.02 | 0.02 | 0.02 | 0.02 | 0.01 | 0.02 | 0.01 |
| CaO | 0.02 | 0.02 | 0.02 | 0.02 | 0.02 | 0.02 | 0.02 |
| ZnO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |

TABLE 5-continued

| | | | | | | | |
|---|---|---|---|---|---|---|---|
| Fe₂O₃ | 0 | 0 | 0 | 0 | 0 | 0 | 0 |
| SnO₂ | 0 | 0 | 0 | 0 | 0 | 0 | 0 |
| Al₂O₃ + B₂O₃ | 28.75 | 27.7 | 28.79 | 27.68 | 27.8 | 28.69 | 27.77 |
| P₂O₅ + TiO₂ + ZrO₂ + WO₃ + Y₂O₃ + ZnO | 1.42 | 1.62 | 1.63 | 1.63 | 1.83 | 1.81 | 1.81 |
| Li₂O + N₂O | 12.79 | 12.79 | 12.85 | 11.82 | 12.80 | 12.75 | 11.92 |
| R₂O | 12.99 | 12.99 | 13.05 | 12.02 | 13.00 | 12.95 | 12.12 |
| RO | 0.04 | 0.04 | 0.04 | 0.04 | 0.03 | 0.04 | 0.03 |
| R₂O + RO | 13.03 | 13.03 | 13.09 | 12.06 | 13.03 | 12.99 | 12.15 |
| Al₂O₃ − R₂O − RO | −0.02 | 0.01 | −0.04 | 1.04 | 0.03 | 0.01 | 0.91 |
| Density (g/cm³) | — | — | — | — | — | — | — |
| CTE at 500° C. cooling (ppm) | — | — | — | — | — | — | — |
| CTE at 300° C. cooling(ppm) | — | — | — | — | — | — | — |
| CTE at 50° C. cooling(ppm) | — | — | — | — | — | — | — |
| Strain Pt. (° C.) | — | — | — | — | — | — | — |
| Anneal Pt. (° C.) | — | — | — | — | — | — | — |
| Softening Pt. (° C.) | — | — | — | — | — | — | — |
| Young's Modulus (GPa) | — | — | — | — | — | — | — |
| Shear modulus (GPa) | — | — | — | — | — | — | — |
| Poisson's ratio | — | — | — | — | — | — | — |
| Refractive index | — | — | — | — | — | — | — |
| SOC (nm/mm/MPa) | — | — | — | — | — | — | — |
| VFT A | −2.114 | −2.134 | −1.998 | −2.293 | −1.942 | −1.852 | −2.226 |
| VFT B | 5125.7 | 5099.2 | 4836.6 | 5459.4 | 4894.4 | 4494.8 | 5259.4 |
| VFT T₀ | 172.1 | 185.5 | 191.3 | 170.1 | 200.2 | 230.6 | 185.8 |
| 200 P Temperature (° C.) | 1333 | 1335 | 1316 | 1358 | 1354 | 1313 | 1348 |
| 35000 P Temperature (° C.) | 942 | 949 | 931 | 969 | 955 | 933 | 963 |
| 200000 P Temperature (° C.) | 863 | 871 | 854 | 889 | 876 | 859 | 885 |
| Liquidus (gradient boat) duration (hours) | 24 | 42 | 24 | 24 | 24 | 24 | 24 |
| Air interface liqudus temperature (° C.) | 1155 | 1140 | 1175 | 1145 | 1160 | 1160 | 1160 |
| Internal liqudus temperature (° C.) | 1130 | 1115 | 1135 | 1100 | 1135 | 1135 | 1095 |
| Platinum interface liquidus temperature (° C.) | 1090 | 1075 | 1115 | 1080 | 1100 | 1095 | 1095 |
| Primary Phase | Keivyite | Keivyite | Keivyite | Keivyite | Keivyite | Keivyite | Keivyite |
| Liquidus Viscosity (kP) | 1.73 | 2.25 | 1.34 | 3.78 | 1.58 | 1.31 | 3.62 |
| $K_{Ic}$ (CN) | — | — | — | — | — | — | — |
| Standard Deviation (CN) | — | — | — | — | — | — | — |

| Example | 29 | 30 | 31 | 32 | 33 | 34 | 35 |
|---|---|---|---|---|---|---|---|
| SiO₂ | 59.51 | 58.44 | 57.48 | 61.22 | 61.85 | 60.08 | 60.83 |
| Al₂O₃ | 12.14 | 12.13 | 12.14 | 12.11 | 12.12 | 12.17 | 12.36 |
| B₂O₃ | 14.39 | 14.24 | 14.27 | 14.47 | 14.37 | 14.19 | 12.28 |
| P₂O₅ | 1.5 | 1.52 | 1.52 | 0.51 | 0.01 | 0.01 | 2.09 |
| TiO₂ | 1.98 | 1.99 | 1.99 | 1.98 | 1.99 | 1.99 | 2.02 |
| ZrO₂ | 0 | 0 | 0 | 0 | 0 | 0 | 0 |
| WO₃ | 0 | 0 | 0 | 0 | 0 | 0 | 0 |
| Y₂O₃ | 0 | 0 | 0 | 0 | 0 | 0 | 0 |
| Li₂O | 0 | 0 | 0 | 0 | 0 | 0 | 8.23 |
| Na₂O | 10.45 | 11.65 | 12.58 | 9.69 | 9.64 | 9.63 | 1.95 |
| K₂O | 0 | 0 | 0 | 0 | 0 | 1.89 | 0.20 |
| MgO | 0.01 | 0.01 | 0.01 | 0.01 | 0.01 | 0.01 | 0.01 |
| CaO | 0.02 | 0.02 | 0.02 | 0.02 | 0.02 | 0.02 | 0.02 |
| ZnO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |

TABLE 5-continued

| | | | | | | | |
|---|---|---|---|---|---|---|---|
| Fe₂O₃ | 0 | 0 | 0 | 0 | 0 | 0 | 0 |
| SnO₂ | 0 | 0 | 0 | 0 | 0 | 0 | 0 |
| Al₂O₃ + B₂O₃ | 26.53 | 26.37 | 26.41 | 26.58 | 26.49 | 26.36 | 24.64 |
| P₂O₅ + TiO₂ + ZrO₂ + WO₃ + Y₂O₃ + ZnO | 3.48 | 3.51 | 3.51 | 2.49 | 2.00 | 2.00 | 4.11 |
| Li₂O + N₂O | 10.45 | 11.65 | 12.58 | 9.69 | 9.64 | 9.63 | 10.18 |
| R₂O | 10.45 | 11.65 | 12.58 | 9.69 | 9.64 | 11.52 | 10.38 |
| RO | 0.03 | 0.03 | 0.03 | 0.03 | 0.03 | 0.03 | 0.03 |
| R₂O + RO | 10.48 | 11.68 | 12.61 | 9.72 | 9.67 | 11.55 | 10.41 |
| Al₂O₃ − R₂O − RO | 1.66 | 0.45 | −0.47 | 2.39 | 2.45 | 0.62 | 1.95 |
| Density (g/cm³) | 2.308 | 2.322 | 2.337 | 2.306 | 2.311 | 2.323 | 2.296 |
| CTE at 500° C. cooling (ppm) | — | — | — | — | — | — | — |
| CTE at 300° C. cooling(ppm) | — | — | — | — | — | — | 4.88 |
| CTE at 50° C. cooling(ppm) | — | — | — | — | — | — | — |
| Strain Pt. (° C.) | — | — | — | — | — | — | 489 |
| Anneal Pt. (° C.) | — | — | — | — | — | — | 535 |
| Softening Pt. (° C.) | — | — | — | — | — | — | 777.1 |
| Young's Modulus (GPa) | — | — | — | — | — | — | — |
| Shear modulus (GPa) | — | — | — | — | — | — | — |
| Poisson's ratio | — | — | — | — | — | — | — |
| Refractive index | — | — | — | — | — | — | — |
| SOC (nm/mm/MPa) | — | — | — | — | — | — | — |
| VFT A | −3.951 | −3.718 | −3.023 | −3.751 | −3.628 | −3.863 | −3.006 |
| VFT B | 10529.8 | 10082.9 | 8353.1 | 9431.8 | 9630 | 10364.3 | 7878.3 |
| VFT T₀ | −126.7 | −135.2 | −51.5 | −31.5 | −47.2 | −114.6 | 18.4 |
| 200 P Temperature (° C.) | 1558 | 1540 | 1517 | 1527 | 1577 | 1567 | 1503 |
| 35000 P Temperature (° C.) | 1113 | 1085 | 1052 | 1106 | 1131 | 1118 | 1062 |
| 200000 P Temperature (° C.) | 1011 | 983 | 952 | 1010 | 1031 | 1016 | 967 |
| Liquidus (gradient boat) duration (hours) | 72 | 72 | 72 | 72 | 72 | 72 | 72 |
| Air interface liqudus temperature (° C.) | 1045 | 1040 | 1005 | 1050 | 1125 | 1055 | 1085 |
| Internal liqudus temperature (° C.) | 1045 | 1030 | 1000 | 1065 | 1120 | 1045 | 1070 |
| Platinum interface liquidus temperature (° C.) | 1035 | 1030 | 995 | 1040 | 1110 | 1050 | 1065 |
| Primary Phase | Rutile | Rutile | Rutile | Boromullite | Boromullite | Rutile | Rutile |
| Liquidus Viscosity (kP) | 108.59 | 86.17 | 83.37 | 70.91 | 41.93 | 118.80 | 30.60 |
| K_{Ic} (CN) | — | — | — | — | — | — | — |
| Standard Deviation (CN) | — | — | — | — | — | — | — |

| Example | 36 | 37 | 38 | 39 | 40 | 41 | 42 |
|---|---|---|---|---|---|---|---|
| SiO₂ | 62.45 | 60.59 | 61.37 | 61.37 | 61.40 | 57.82 | 58.42 |
| Al₂O₃ | 11.35 | 13.37 | 13.09 | 12.08 | 13.10 | 12.04 | 13.07 |
| B₂O₃ | 12.3 | 10.64 | 12.37 | 12.52 | 11.48 | 14.57 | 12.52 |
| P₂O₅ | 1.56 | 2.08 | 1.02 | 1.03 | 1.02 | 1.52 | 1.01 |
| TiO₂ | 2.02 | 2.01 | 1.98 | 1.98 | 1.98 | 1.97 | 1.98 |
| ZrO₂ | 0 | 0 | 0 | 0 | 0 | 0 | 0 |
| WO₃ | 0 | 0 | 0 | 0 | 0 | 0 | 0 |
| Y₂O₃ | 0 | 0 | 0 | 0 | 0 | 0 | 0 |
| Li₂O | 8.14 | 9.12 | 8.05 | 8.90 | 8.90 | 7.98 | 8.90 |
| Na₂O | 1.95 | 1.94 | 1.90 | 1.90 | 1.89 | 3.86 | 3.86 |
| K₂O | 0.20 | 0.20 | 0.20 | 0.20 | 0.20 | 0.20 | 0.20 |
| MgO | 0.01 | 0.02 | 0.02 | 0.01 | 0.02 | 0.01 | 0.01 |
| CaO | 0.01 | 0.02 | 0.01 | 0.02 | 0.02 | 0.02 | 0.02 |
| ZnO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |

TABLE 5-continued

|  |  |  |  |  |  |  |  |
|---|---|---|---|---|---|---|---|
| $Fe_2O_3$ | 0 | 0 | 0 | 0 | 0 | 0 | 0 |
| $SnO_2$ | 0 | 0 | 0 | 0 | 0 | 0 | 0 |
| $Al_2O_3 + B_2O_3$ | 23.65 | 24.01 | 25.46 | 24.6 | 24.58 | 26.61 | 25.59 |
| $P_2O_5 + TiO_2 + ZrO_2 + WO_3 + Y_2O_3 + ZnO$ | 3.58 | 4.09 | 3.00 | 3.01 | 3.00 | 3.49 | 2.99 |
| $Li_2O + N_2O$ | 10.09 | 11.06 | 9.95 | 10.80 | 10.79 | 11.84 | 12.76 |
| $R_2O$ | 10.29 | 11.26 | 10.15 | 11.00 | 10.99 | 12.04 | 12.96 |
| RO | 0.02 | 0.04 | 0.03 | 0.03 | 0.04 | 0.03 | 0.03 |
| $R_2O + RO$ | 10.31 | 11.30 | 10.18 | 11.03 | 11.03 | 12.07 | 12.99 |
| $Al_2O_3 - R_2O - RO$ | 1.04 | 2.07 | 2.91 | 1.05 | 2.07 | −0.03 | 0.08 |
| Density (g/cm³) | 2.294 | 2.314 | 2.306 | 2.302 | 2.312 | 2.311 | 2.330 |
| CTE at 500° C. cooling (ppm) | — | — | — | — | — | — | — |
| CTE at 300° C. cooling(ppm) | 4.94 | 5.08 | 5.60 | 5.11 | 4.99 | 5.78 | 5.94 |
| CTE at 50° C. cooling(ppm) | — | — | — | — | — | — | — |
| Strain Pt. (° C.) | 481.0 | 500.0 | 507.0 | 488.0 | 502.0 | 466.0 | 478.0 |
| Anneal Pt. (° C.) | 526.0 | 545.0 | 554.0 | 532.0 | 548.0 | 507.0 | 518.0 |
| Softening Pt. (° C.) | 768.3 | 778.3 | 793.1 | 762.1 | 781.5 | 713.6 | 728.4 |
| Young's Modulus (GPa) | — | — | — | — | — | — | — |
| Shear modulus (GPa) | — | — | — | — | — | — | — |
| Poisson's ratio | — | — | — | — | — | — | — |
| Refractive index | — | — | — | — | — | — | — |
| SOC (nm/mm/MPa) | — | — | — | — | — | — | — |
| VFT A | −3.092 | −3.104 | −2.915 | −2.826 | −3.068 | −2.532 | −2.636 |
| VFT B | 8339 | 7924.3 | 7397.1 | 7376.9 | 7801.3 | 6823.2 | 6855.3 |
| VFT $T_o$ | −28.4 | 23.7 | 80.5 | 45.2 | 35.4 | 17.2 | 40.5 |
| 200 P Temperature (° C.) | 1518 | 1490 | 1499 | 1484 | 1488 | 1429 | 1429 |
| 35000 P Temperature (° C.) | 1064 | 1060 | 1072 | 1046 | 1060 | 981 | 995 |
| 200000 P Temperature (° C.) | 965 | 967 | 981 | 953 | 968 | 888 | 904 |
| Liquidus (gradient boat) duration (hours) | 72 | 72 | 72 | 72 | 72 | 72 | 72 |
| Air interface liqudus temperature (° C.) | 1060 | 1055 | 1120 | 1055 | 1055 | 1040 | 1030 |
| Internal liqudus temperature (° C.) | 1045 | 1040 | 1125 | 1045 | 1040 | 1025 | 1015 |
| Platinum interface liquidus temperature (° C.) | 1040 | 1040 | 1125 | 1045 | 1040 | 1015 | 1010 |
| Primary Phase | Rutile | Rutile | Boromullite | Rutile | Rutile | Rutile | Rutile |
| Liquidus Viscosity (kP) | 47.51 | 49.34 | 14.69 | 35.68 | 49.84 | 17.31 | 25.04 |
| $K_{Ic}$ (CN) | — | — | — | — | — | — | — |
| Standard Deviation (CN) | — | — | — | — | — | — | — |

| Example | 43 | 44 | 45 | 46 | 47 | 48 | 49 |
|---|---|---|---|---|---|---|---|
| $SiO_2$ | 56.43 | 53.24 | 54.23 | 56.16 | 55.15 | 56.25 | 57.05 |
| $Al_2O_3$ | 13.09 | 14.98 | 13.99 | 14.01 | 13.99 | 13.00 | 12.98 |
| $B_2O_3$ | 12.51 | 14.82 | 14.91 | 13.87 | 14.78 | 14.87 | 14.73 |
| $P_2O_5$ | 1.02 | 0 | 0 | 0 | 0 | 0 | 0 |
| $TiO_2$ | 1.98 | 1.97 | 1.97 | 1.97 | 1.96 | 1.97 | 1.96 |
| $ZrO_2$ | 0 | 0 | 0 | 0 | 0 | 0 | 0 |
| $WO_3$ | 0 | 0 | 0 | 0 | 0 | 0 | 0 |
| $Y_2O_3$ | 0 | 0 | 0 | 0 | 0 | 0 | 0 |
| $Li_2O$ | 8.92 | 12.88 | 12.78 | 11.87 | 11.99 | 11.81 | 11.16 |
| $Na_2O$ | 5.82 | 1.88 | 1.90 | 1.90 | 1.90 | 1.88 | 1.89 |
| $K_2O$ | 0.20 | 0.20 | 0.20 | 0.20 | 0.20 | 0.20 | 0.20 |
| MgO | 0.01 | 0.02 | 0.01 | 0.01 | 0.01 | 0.01 | 0.01 |
| CaO | 0.02 | 0.01 | 0.01 | 0.01 | 0.01 | 0.01 | 0.01 |
| ZnO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |

TABLE 5-continued

| | | | | | | | |
|---|---|---|---|---|---|---|---|
| Fe$_2$O$_3$ | 0 | 0 | 0 | 0 | 0 | 0 | 0 |
| SnO$_2$ | 0 | 0 | 0 | 0 | 0 | 0 | 0 |
| Al$_2$O$_3$ + B$_2$O$_3$ | 25.6 | 29.8 | 28.9 | 27.88 | 28.77 | 27.87 | 27.71 |
| P$_2$O$_5$ + TiO$_2$ + ZrO$_2$ + WO$_3$ + Y$_2$O$_3$ + ZnO | 3.00 | 1.97 | 1.97 | 1.97 | 1.96 | 1.97 | 1.96 |
| Li$_2$O + N$_2$O | 14.74 | 14.76 | 14.68 | 13.77 | 13.89 | 13.69 | 13.05 |
| R$_2$O | 14.94 | 14.96 | 14.88 | 13.97 | 14.09 | 13.89 | 13.25 |
| RO | 0.03 | 0.03 | 0.02 | 0.02 | 0.02 | 0.02 | 0.02 |
| R$_2$O + RO | 14.97 | 14.99 | 14.90 | 13.99 | 14.11 | 13.91 | 13.27 |
| Al$_2$O$_3$ − R$_2$O − RO | −1.88 | −0.01 | −0.91 | 0.02 | −0.12 | −0.91 | −0.29 |
| Density (g/cm$^3$) | 2.356 | 2.340 | — | 2.335 | — | — | 2.320 |
| CTE at 500° C. cooling (ppm) | — | 6.73 | 6.94 | 6.48 | 6.51 | — | — |
| CTE at 300° C. cooling(ppm) | 68.1 | 6.23 | 6.31 | 5.93 | 5.92 | — | — |
| CTE at 50° C. cooling(ppm) | — | 5.33 | 5.54 | 5.15 | 4.75 | — | — |
| Strain Pt. (° C.) | 472.0 | 469.5 | 464.5 | — | — | — | — |
| Anneal Pt. (° C.) | 508.0 | 510.1 | 503.8 | — | — | — | — |
| Softening Pt. (° C.) | 690.9 | — | — | — | — | — | — |
| Young's Modulus (GPa) | — | 71.6 | — | — | — | — | — |
| Shear modulus (GPa) | — | 29.0 | — | — | — | — | — |
| Poisson's ratio | — | 0.235 | — | — | — | — | — |
| Refractive index | — | 1.5239 | 1.5238 | 1.5210 | 1.5210 | — | — |
| SOC (nm/mm/MPa) | — | 3.457 | 3.423 | 3.487 | 3.504 | — | — |
| VFT A | −2.144 | −2.159 | −2.019 | −2.31 | −2.256 | −2.101 | −2.391 |
| VFT B | 5841.7 | 5099.9 | 5054.6 | 5677.3 | 5562 | 5435 | 6028.3 |
| VFT T$_o$ | 57.2 | 160.9 | 127.6 | 130.5 | 117.4 | 105.5 | 90.1 |
| 200 P Temperature (° C.) | 1371 | 1304 | 1298 | 1362 | 1338 | 1340 | 1375 |
| 35000 P Temperature (° C.) | 931 | 922 | 898 | 959 | 935 | 923 | 959 |
| 200000 P Temperature (° C.) | 842 | 845 | 818 | 876 | 853 | 840 | 874 |
| Liquidus (gradient boat) duration (hours) | 72 | 24 | 24 | 24 | 24 | 24 | 24 |
| Air interface liqudus temperature (° C.) | 1005 | 1010 | 1015 | 1030 | 1025 | 1010 | 1010 |
| Internal liqudus temperature (° C.) | 985 | 1010 | 1005 | 1020 | 1010 | 1005 | 1005 |
| Platinum interface liquidus temperature (° C.) | 980 | 1005 | 990 | 1015 | 1005 | 995 | 1005 |
| Primary Phase | Rutile | Rutile | Rutile | Unknown | Rutile | Rutile | Rutile |
| Liquidus Viscosity (kP) | 14.20 | 7.03 | 5.52 | 11.82 | 9.45 | 8.73 | 15.78 |
| K$_{Ic}$ (CN) | — | 0.821 | 0.810 | — | — | — | 0.795 |
| Standard Deviation (CN) | — | 0.012 | 0.002 | — | — | — | 0.014 |

TABLE 6

| Example | 1 | 1 | 2 | 2 | 16 |
|---|---|---|---|---|---|
| Base K$_{Ic}$ (CN) | 0.763 | 0.763 | 0.787 | 0.787 | — |
| Standard Deviation (CN) | 0.013 | 0.013 | 0.016 | 0.016 | — |
| Treatment | 675° C. for 5 hrs. | 700° C. for 1 hrs. + 750° C. for 3 hrs. | 750° C. for 3 hrs. | 800° C. for 2 hrs. | 650° C. for 0.25 hrs. |
| K$_{Ic}$ (CN) after treatment | 0.932 | 0.748 | 0.991 | 1.238 | 0.92-0.96 |
| Standard Deviation (CN) | 0.024 | — | — | — | — |
| Appearance after treatment | Transparent haze | Opaque | Transparent haze | Translucent | — |

TABLE 6-continued

| Example | 17 | 18 | 19 |
|---|---|---|---|
| Base $K_{Ic}$ (CN) | — | — | — |
| Standard Deviation (CN) | — | — | — |
| Treatment | 650° C. for 0.5 hrs. | 650° C. for 1 hr. | 650° C. for 0.66 hrs. |
| $K_{Ic}$ (CN) after treatment | 0.976 | 0.922 | 0.968 |
| Standard Deviation (CN) | 0.019 | 0.017 | — |
| Appearance after treatment | — | — | — |

Example glass compositions 1-49 phase separate due to the relatively high amount of $Al_2O_3+B_2O_3$ and presence of a nucleating agent.

Figure 6:
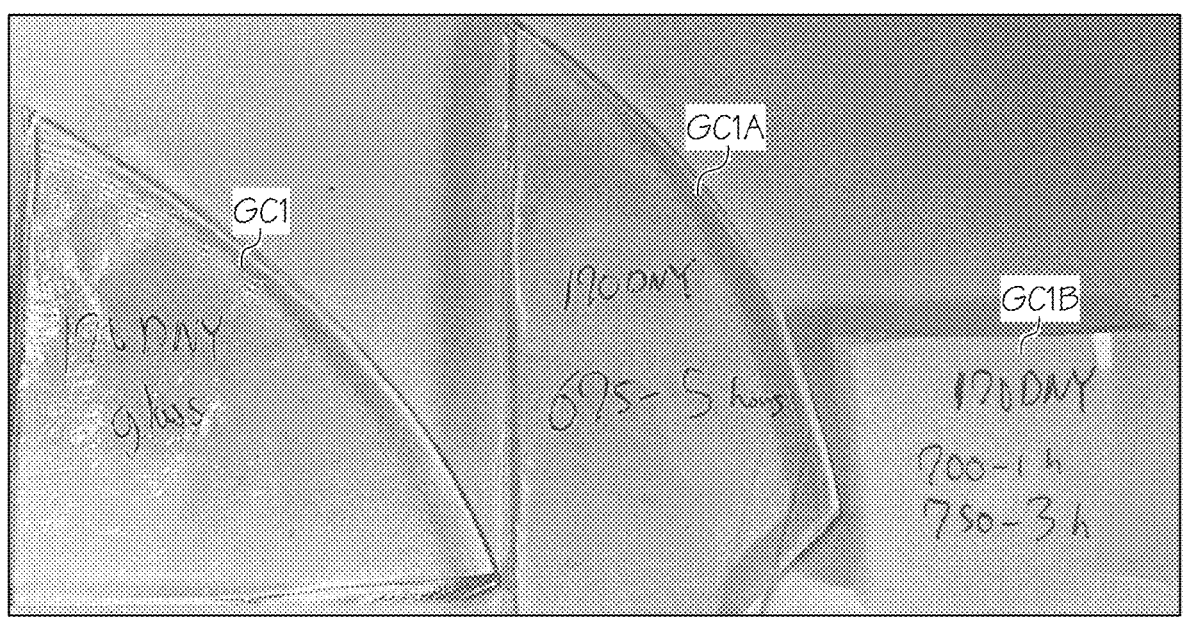
FIG. 6 is a photograph of glass articles made from an exemplary glass composition and subjected to heat treatment according to one or more embodiments described herein.
Figure 7:
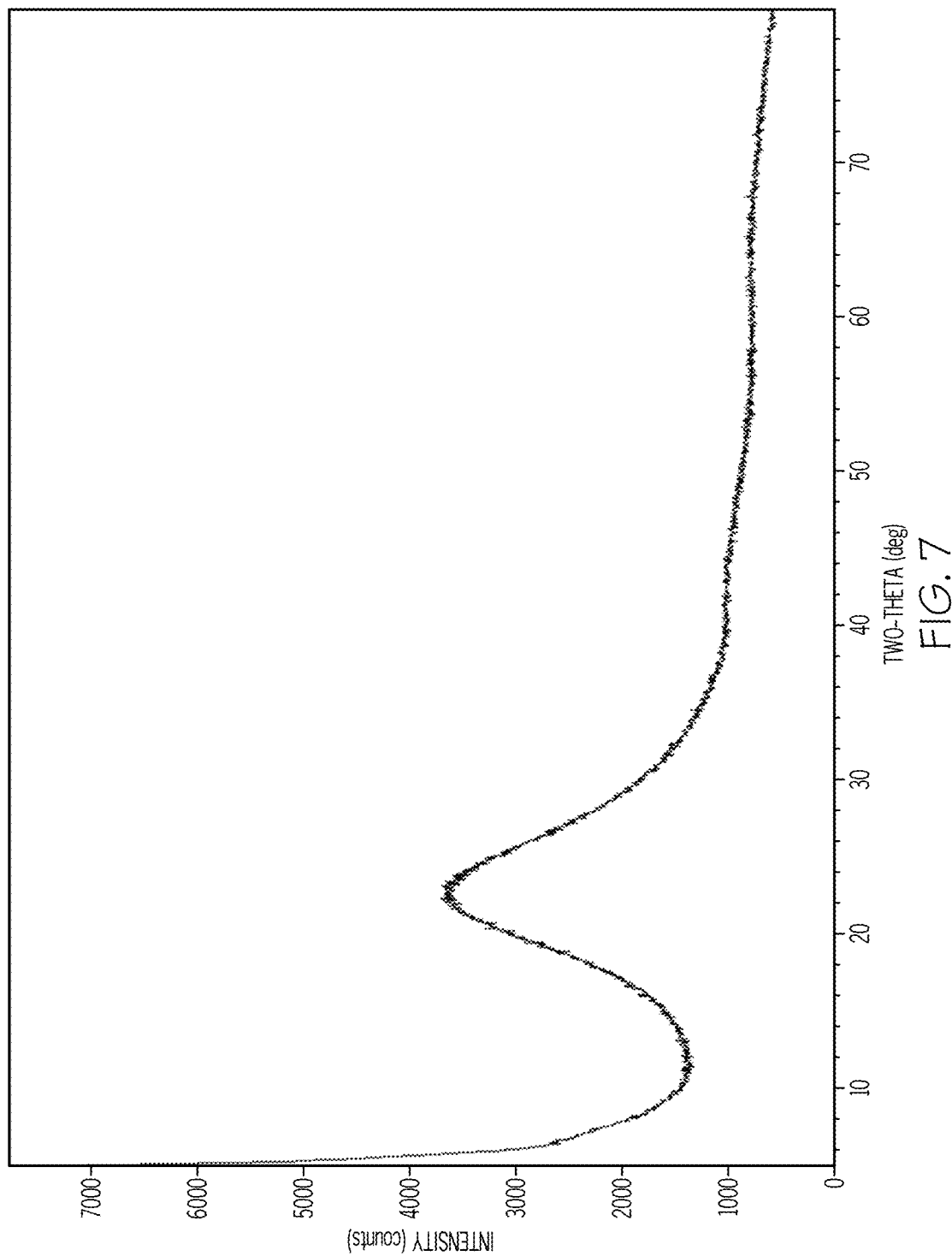
FIG. 7 is an XRD spectrum of a glass article shown in FIG. 6.

Referring now to FIG. 6, heat treating example glass composition 1 GC1 at 675° C. for 5 hours resulted in a transparent haze glass article GC1A. As shown in Table 6, this heat treatment increases the $K_{Ic}$ fracture toughness from 0.763 MPa·m$^{1/2}$ for example glass composition 1 to 0.932 MPa·m$^{1/2}$ after heat treatment of 675° C. for 5 hours. Referring back to FIG. 6, a two-step heat treatment of glass composition 1 GC1 of 700° C. for 1 hour and 750° C. for 3 hours results in an opaque glass article GC1B. As shown in Table 6, this two-step heat treatment does not improve the $K_{Ic}$ fracture toughness of example glass composition 1. Referring now to FIG. 7, the XRD spectrum for example glass composition 1 after being subjected to a heat treatment of 700° C. for 2 hours shows no evidence of crystallization. This heat treatment of glass composition 1 resulted in a transparent haze glass article. While not wishing to be bound by theory, in view of the transparent haze of the glass article and the lack of evidence of crystallization, it is believed that heat treatment of 700° C. for 2 hours to example glass composition 1 including $TiO_2$ as a nucleating agent results in a multi-phase glass with at least two glass phases and no crystallization.

Figure 8:
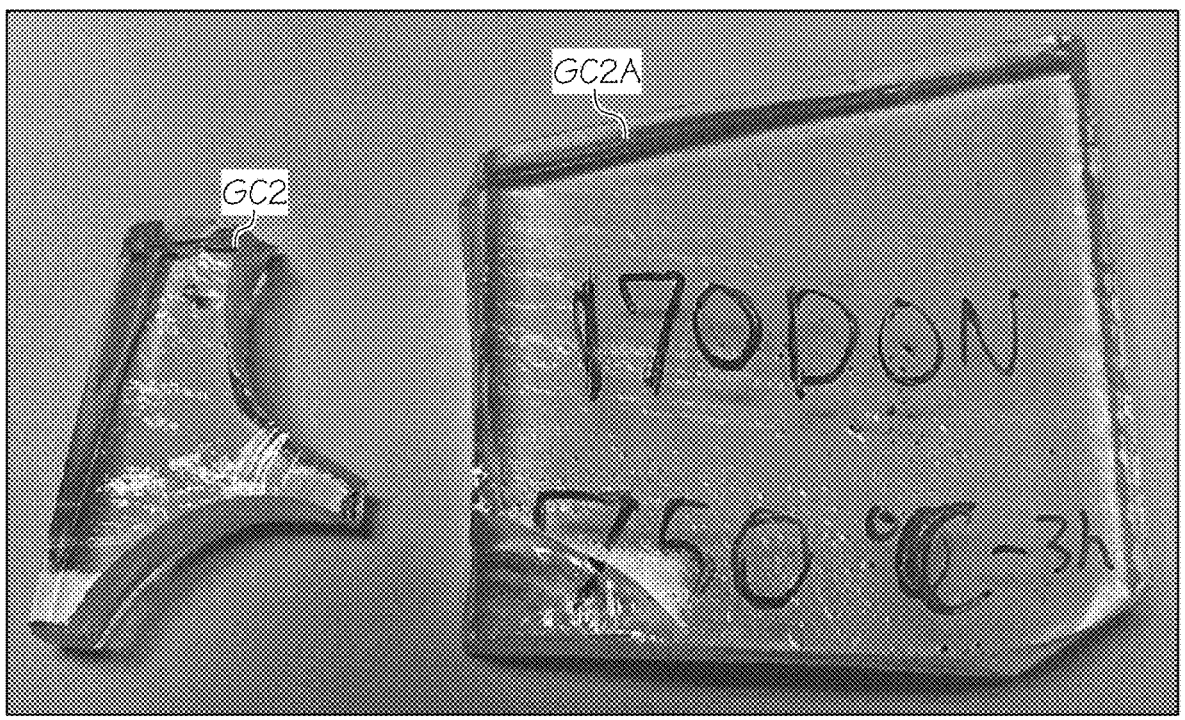
FIG. 8 is a photograph of glass articles made from an exemplary glass composition and subjected to heat treatment according to one or more embodiments described herein.
Figure 9:
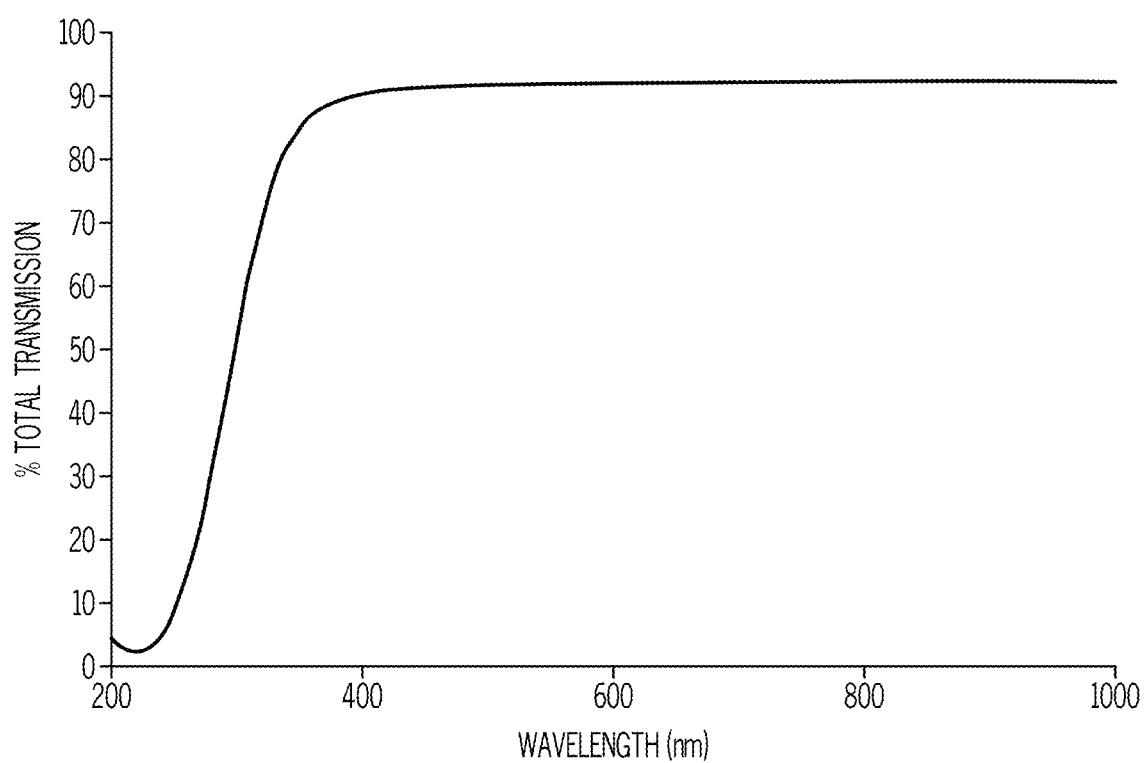
FIG. 9 is a plot of total transmission versus wavelength of one of the glass articles shown in FIG. 8 having a thickness of 0.6 mm.
Figure 10:
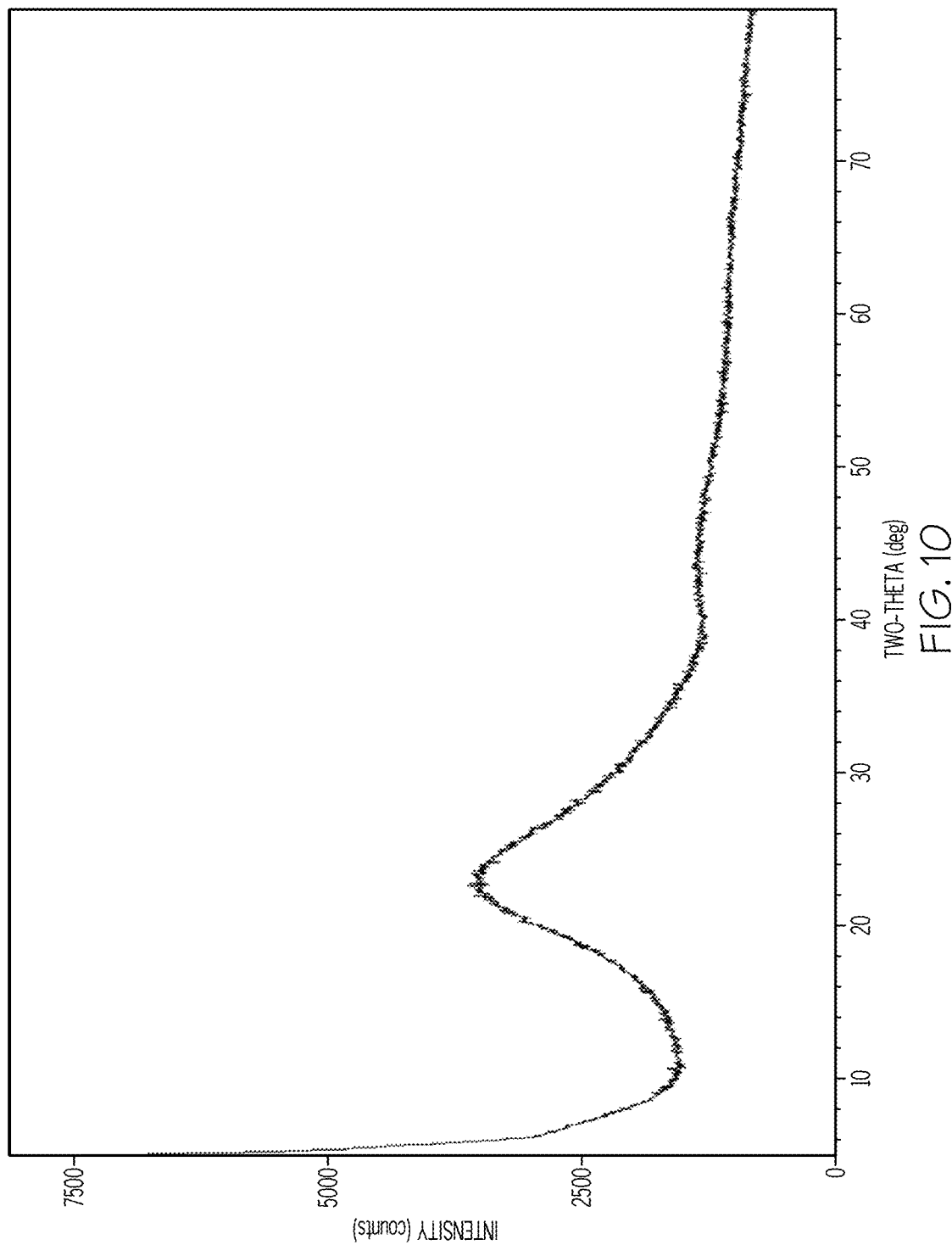
FIG. 10 is an XRD spectrum of a glass article shown in FIG. 8.
Figure 11:
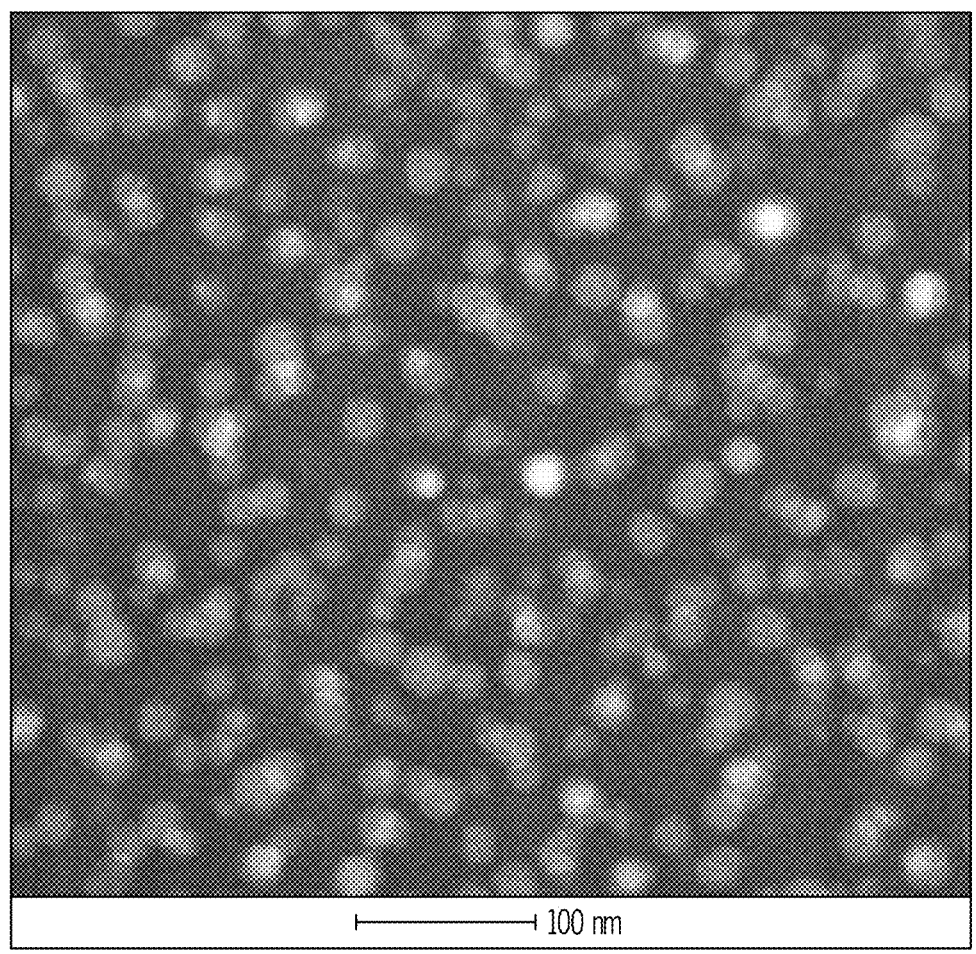
FIG. 11 is a TEM image of a glass article shown in FIG. 8.

Referring now to FIG. 8, heating treating example glass composition 2 GC2 at 750° C. for 3 hours results in a transparent glass article GC2A. Referring now to FIG. 9, the glass article GC2A having a thickness of 0.6 mm formed from example glass composition 2 has greater than 90% total transmission over the wavelength range from 400 nm to 800 nm. As shown in Table 6, the heat treatment also increases the $K_{Ic}$ fracture toughness from 0.787 MPa·m$^{1/2}$ for example glass composition 2 to 0.991 MPa·m$^{1/2}$ after heat treatment of 750° C. for 3 hours. Referring now to FIG. 10, the XRD spectrum for example glass composition 2 after heat treatment of 750° C. for 3 hours shows no evidence of crystallization. Referring now to FIG. 11, the TEM image of example glass composition 2 after heat treatment of 750° C. for 3 hours shows a uniformly dispersed second phase of amorphous nanospheres approximately 20-30 nm in diameter. EDS/EELS indicates that the dispersed second phase is primarily composed of yttrium, boron, and aluminum. While not wishing to be bound by theory, in view of the dispersed second phase and lack of evidence of crystallization, it is believed that heat treatment of 750° C. for 3 hours to example glass composition 2 including $Y_2O_3$ as a nucleating agent results in a multi-phase glass with at least two glass phases and no crystallization.

As exemplified by example glass compositions 1 and 2, it was surprisingly found that a $Li_2O$-containing glass composition may remain XRD amorphous (i.e., no peaks) even when the glass composition turns a transparent haze after being subjected to heat treatment. While not wishing to be bound by theory, the lack of evidence of crystallization even when the glass composition turns transparent haze indicates that certain heat treatment of the $Li_2O$-containing glass composition results in a multi-phase glass with at least two glass phases and no crystallization.

Figure 12:
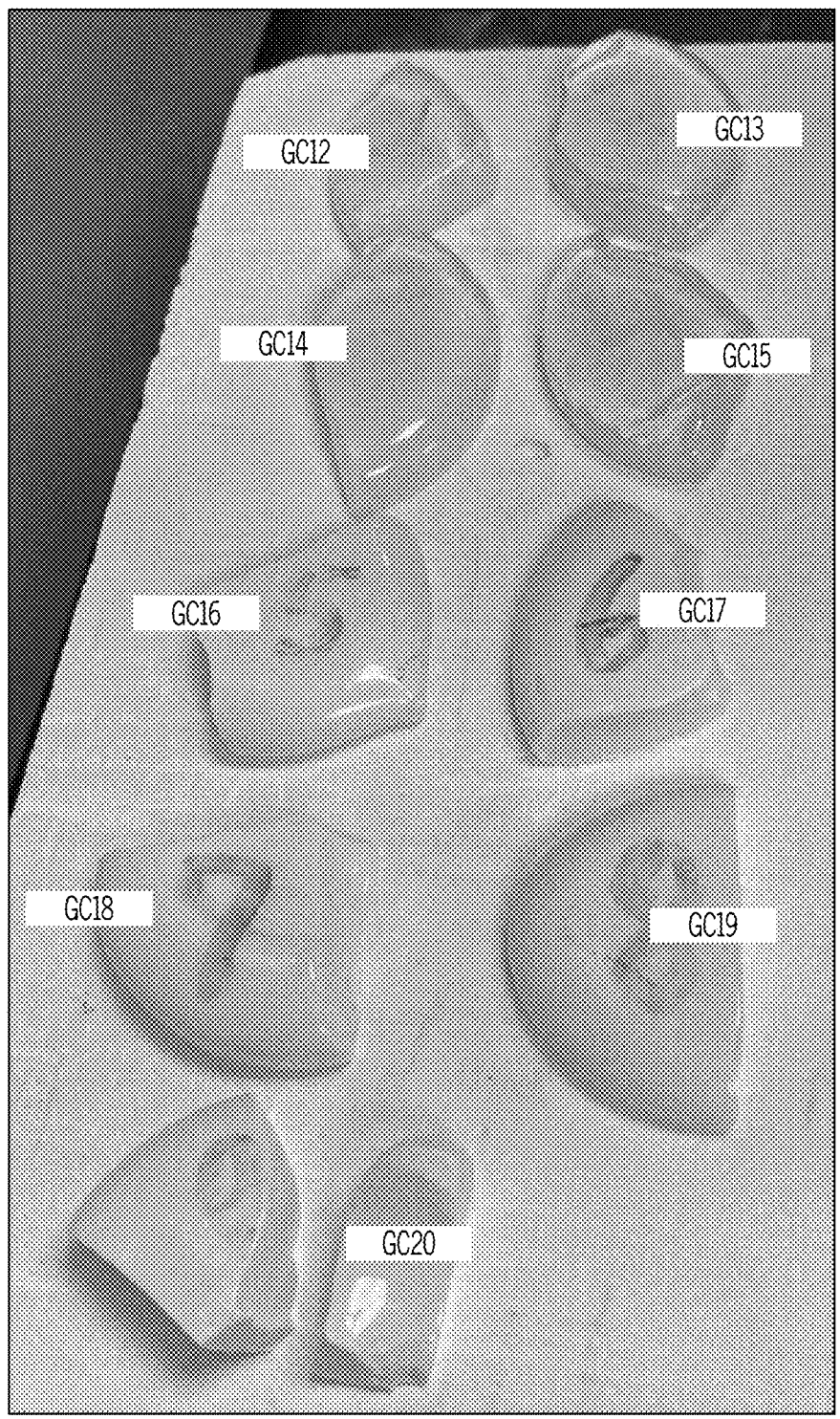
FIG. 12 is a photograph of glass articles made from exemplary glass compositions and subjected to heat treatment according to one or more embodiments described herein.

Referring now to FIG. 12, heating treating example glass compositions 12-20 GC12-GC20 at 750° C. for 1.5 hours results in articles formed from example glass compositions 12-15 GC12-15 being translucent and articles formed from example glass compositions 16-20 GC16-GC20 being opaque.

Figure 13:
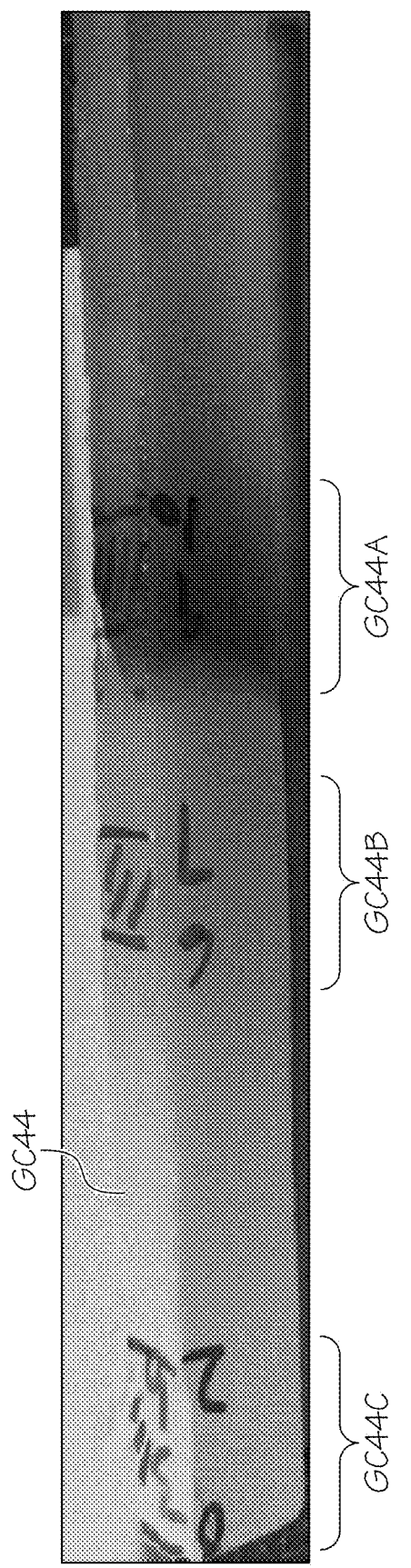
FIG. 13 is a photograph of a bar sample made from an exemplary glass composition and subjected to heat treatment according to one or more embodiments described herein.
Figure 14:
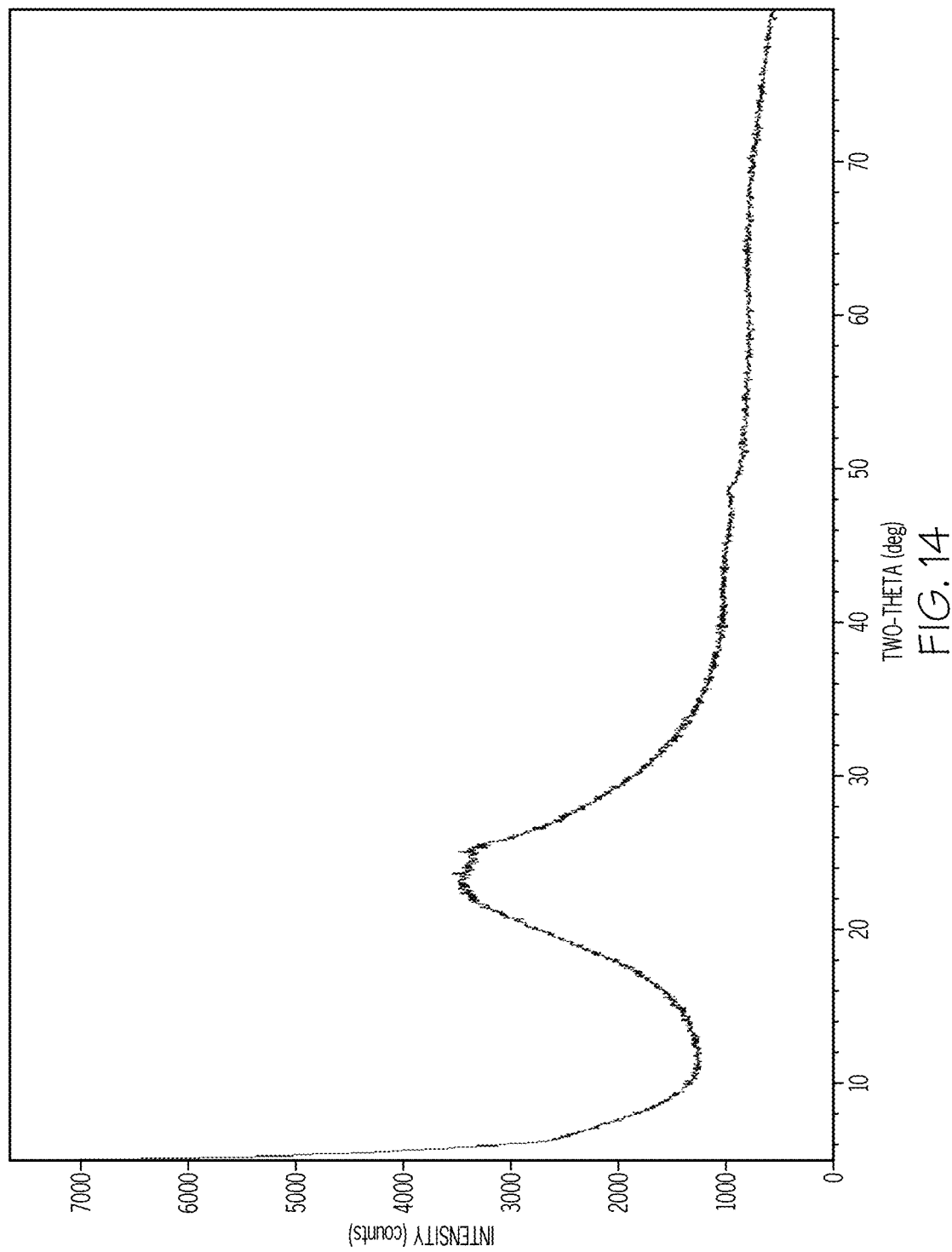
FIG. 14 is an XRD spectrum of a section of the bar sample shown in FIG. 13.

FIG. 13, a bar sample of example glass composition 44 GC44 is subjected to a heat treatment under gradient temperature as described in Haller, W., et al. (1970). *Journal of the American Ceramic Society* 53(1): 34-39. In particular, the bar sample GC44 is heat treated under gradient temperature from 760° C. (0 cm on left side of figure) to 500° C. (10 cm on right side of figure). The section from 9 cm to 10 cm of the bar sample of example glass composition 44 GC44A (right side of figure), corresponding to a heat treatment of about 550° C. to 570° C. for 3 hours, results in this section of the bar sample GC44 being transparent haze. Referring now to FIG. 14, the XRD spectrum for the 9 cm to 10 cm section of the bar sample of example glass composition 44 GC44A, corresponding to a heat treatment of about 550° C. to 570° C. for 3 hours, includes peaks evidencing the presence of virgilite as a dispersed phase. While not wishing to be bound by theory, it is believed that heat treatment of about 550° C. to 570° C. for 3 hours to example glass composition 44 nucleates and forms crystals with the detected phase in the example glass composition 44.

Figure 15:
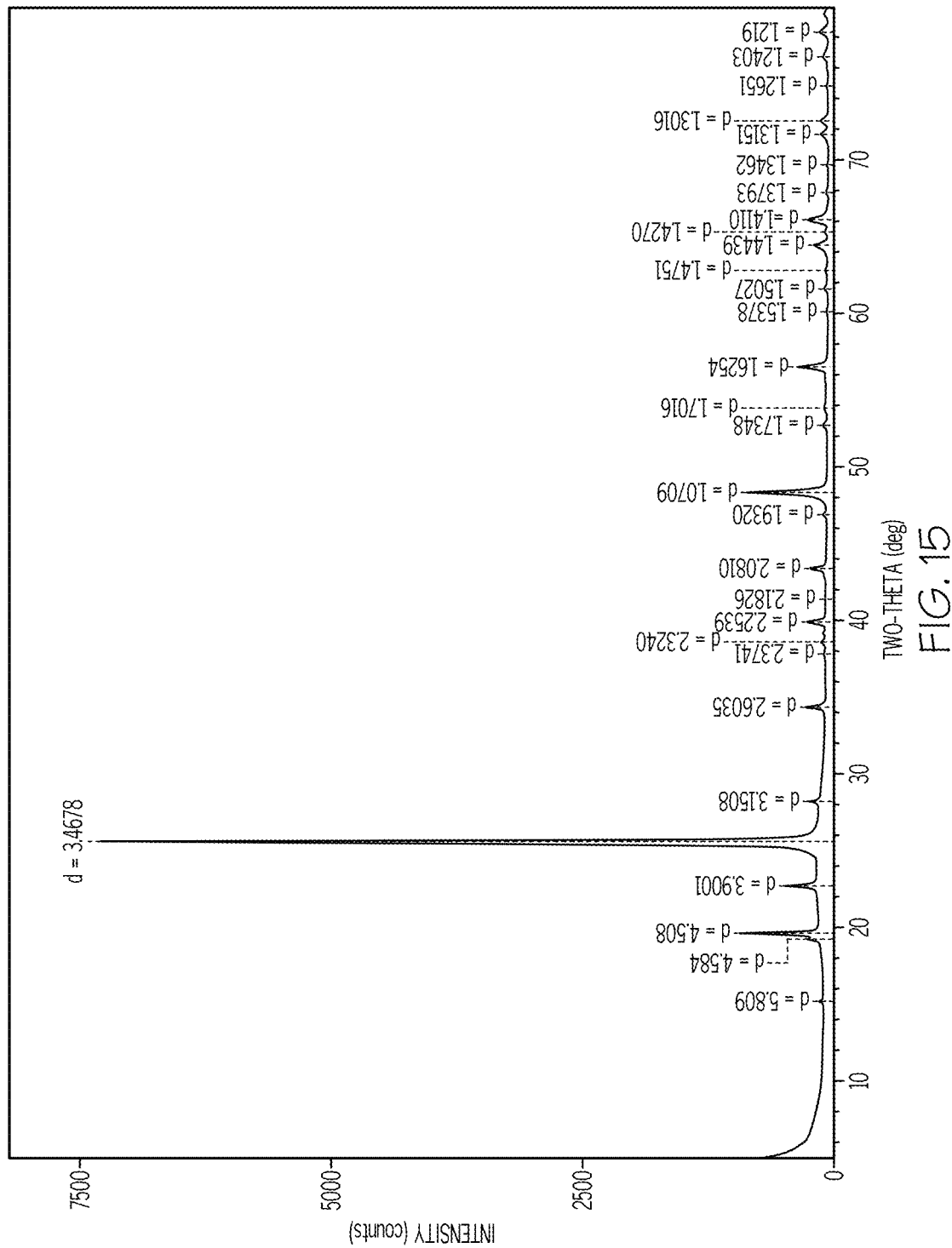
FIG. 15 is an XRD spectrum of another section of the bar sample shown in FIG. 13.

Referring back to FIG. 13, the section from 6 cm to 7 cm of the bar sample of example glass composition 44 GC44B (middle of figure), corresponding to a heat treatment of about 620° C. to 640° C. for 3 hours, results in this section of the bar sample GC44 being translucent. Referring now to FIG. 15, the XRD spectrum for the 6 cm to 7 cm section of the bar sample of example glass composition 44 GC44B, corresponding to a heat treatment of about 620° C. to 640° C. for 3 hours, includes peaks evidencing the presence of virgilite, beta spodumene, and anatase as dispersed phases. While not wishing to be bound by theory, it is believed that the heat treatment of about 620° C. to 640° C. for 3 hours to example glass composition 44 nucleates and forms crystals with the detected phases in the example glass composition 44.

Figure 16:
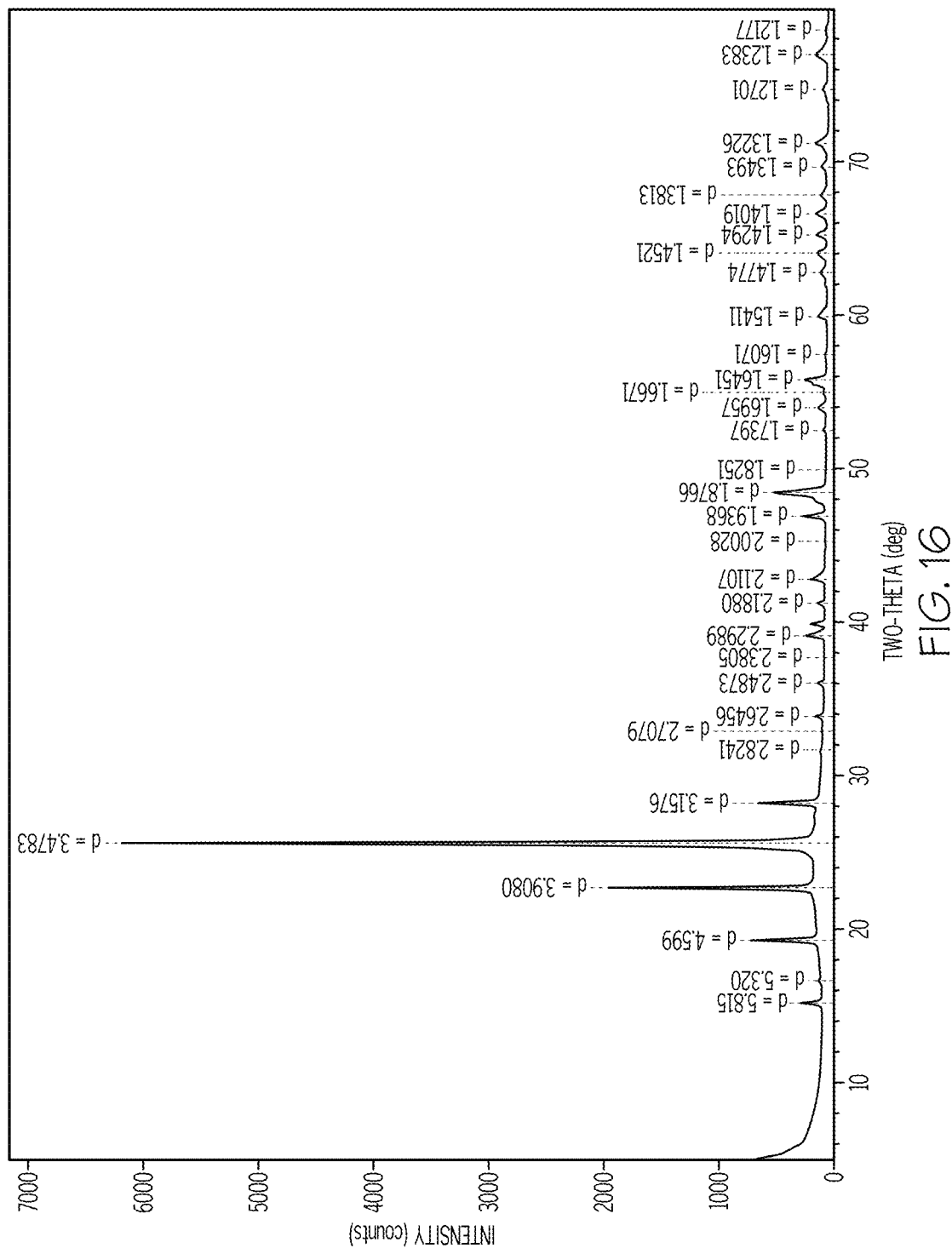
FIG. 16 is an XRD spectrum of another section of the bar sample shown in FIG. 13.

Referring back to FIG. 13, the section from 0 cm to 2 cm of the bar sample of example glass composition 44 GC44C (left side of figure), corresponding to a heat treatment of about 720° C. to 760° C. for 3 hours, results in this section of the bar sample GC44 being opaque. Referring now to FIG. 16, the XRD spectrum for the 0 cm to 2 cm of the bar sample of example glass composition 44 GC44C corresponding to a heat treatment of about 720° C. to 760° C. for 3 hours, includes peaks evidencing the presence of beta spodumene, anatase, and rutile as dispersed phases. While not wishing to be bound by theory, it is believed that the heat treatment of about 720° C. to 760° C. for 3 hours to example glass composition 44 nucleates and forms crystals with the detected phases in the example glass composition 44.

Figure 17:
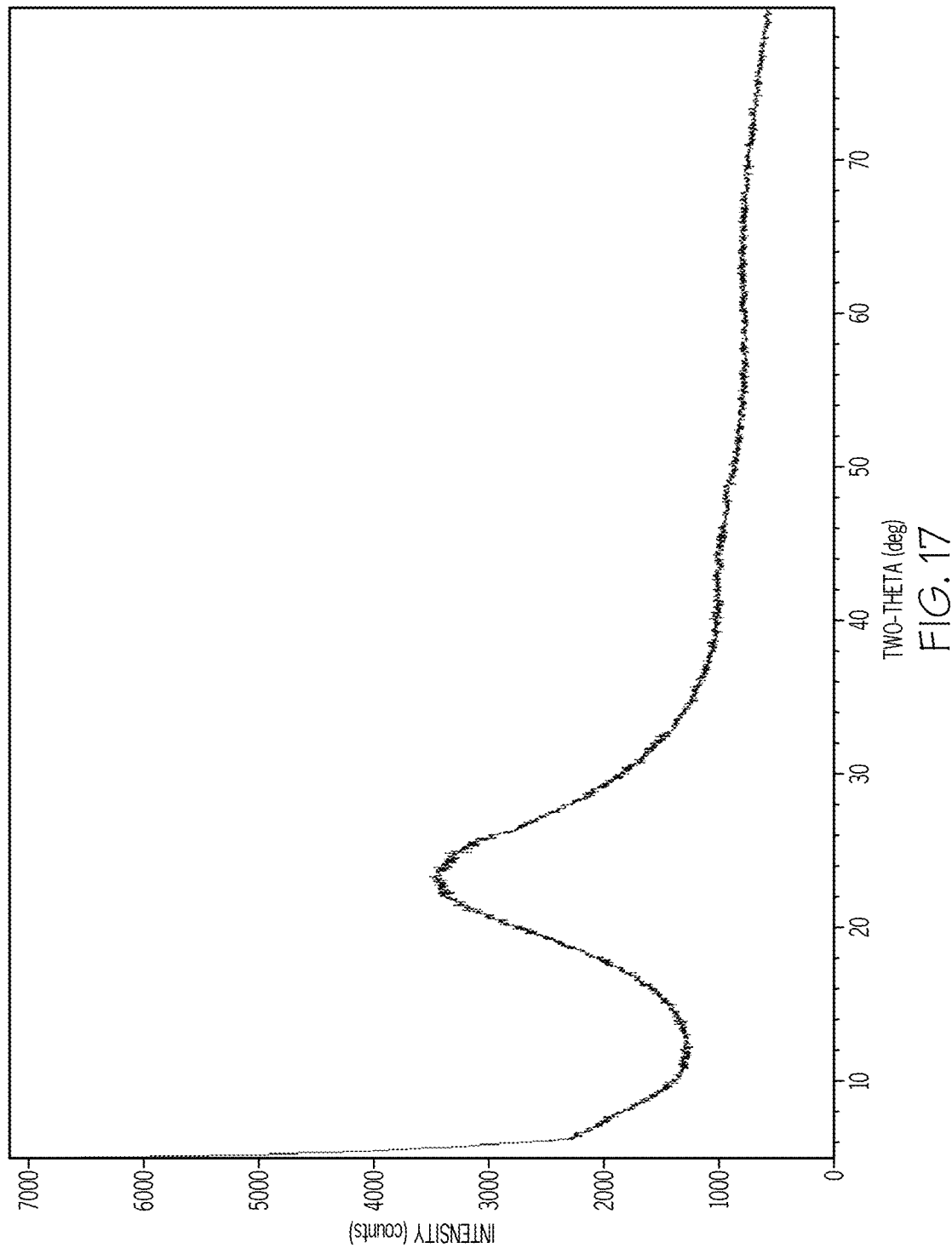
FIG. 17 is an XRD spectrum of a glass article made from an exemplary glass composition and subjected to heat treatment according to one or more embodiments described herein.

Referring now to FIG. 17, the XRD spectrum for example glass composition 45 after being subjected to heat treatment of about 550° C. to 600° C. for 1 hour shows no evidence of crystallization. Moreover, subjecting example glass composition 45 to this heat treatment of about 550° C. to 600° C. for 1 hour results in a transparent haze glass article. While not wishing to be bound by theory, in view of the glass article being a transparent haze and lack of evidence of crystallization, it is believed that the heat treatment of about 550° C. to 600° C. for 1 hour to example glass composition 45 results in a multi-phase with at least two glass phases and no crystallization.

Figure 18:
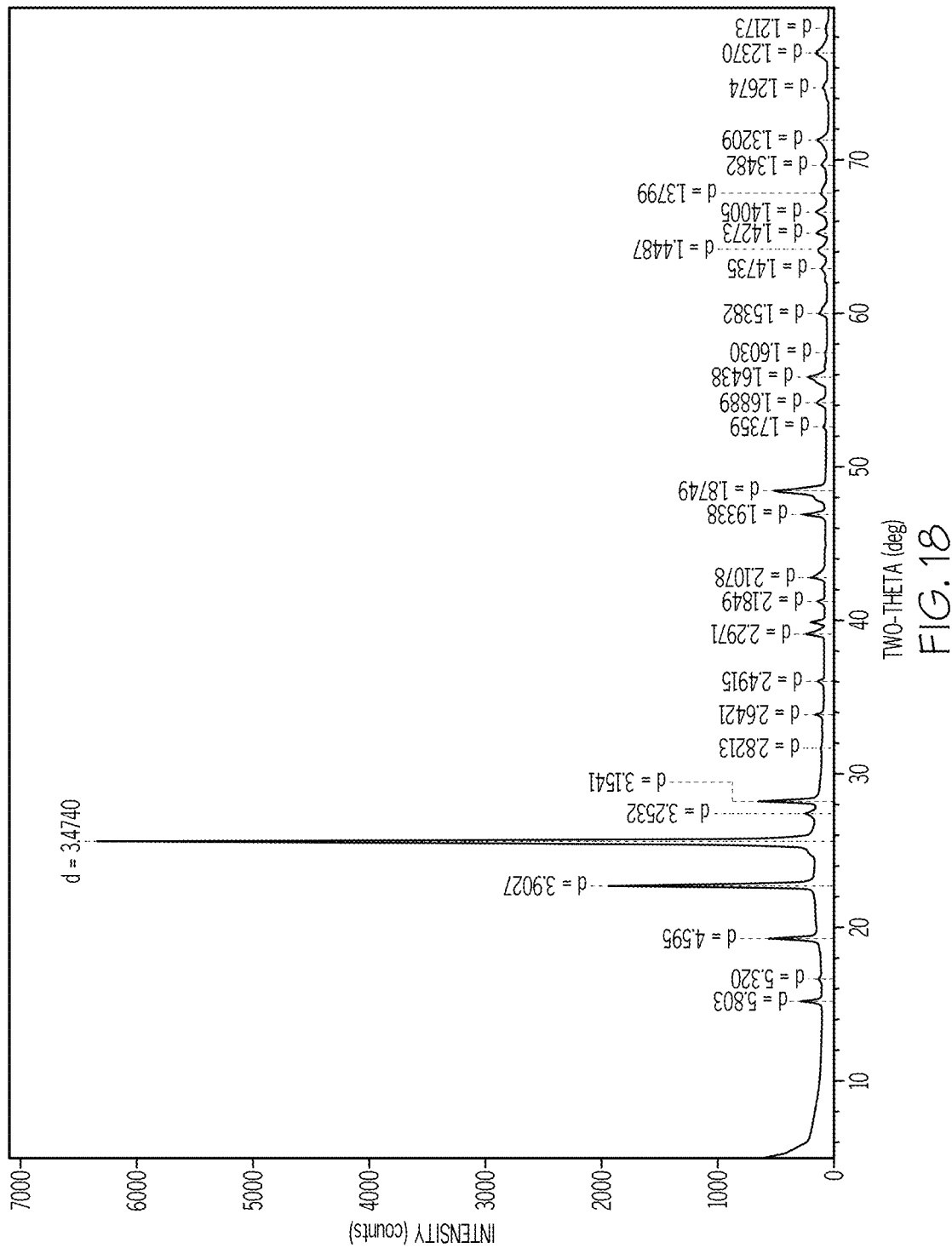
FIG. 18 is an XRD spectrum of a glass article made from an exemplary glass composition and subjected to heat treatment according to one or more embodiments described herein.

Referring now to FIG. 18, the XRD spectrum for example glass composition 45 after being subjected to a heat treatment of about 620° C. to 650° C. for 1 hour includes peaks evidencing the presence of spodumene and rutile as dispersed phases. While not wishing to be bound by theory, it is believed that the heat treatment of about 620° C. to 650° C. for 1 hour to example glass composition 45 nucleates and forms crystals with the detected phases in the example glass composition 45.

Figure 19:
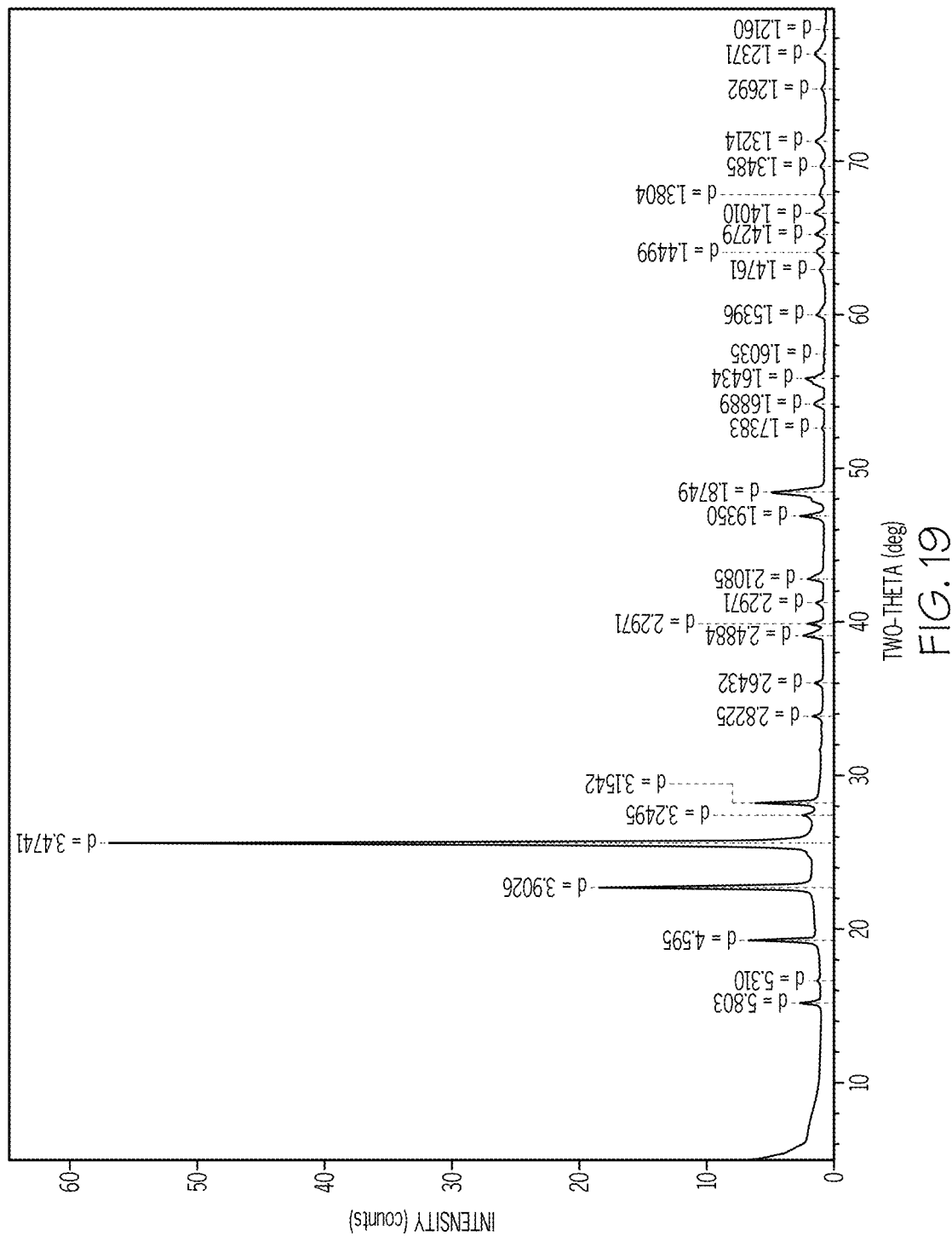
FIG. 19 is an XRD spectrum of a glass article made from an exemplary glass composition and subjected to heat treatment according to one or more embodiments described herein.

Referring now to FIG. 19, the XRD spectrum for the example glass composition 45 after being subjected to a heat treatment of about 660° C. to 700° C. for 1 hour includes peaks evidencing the presence of spodumene as a dispersed phase. While not wishing to be bound by theory, it is believed that the heat treatment of about 660° C. to 700° C. for 1 hour to example glass composition 45 nucleates and forms crystals with the detected phase in the example glass composition 45.

Figure 20:
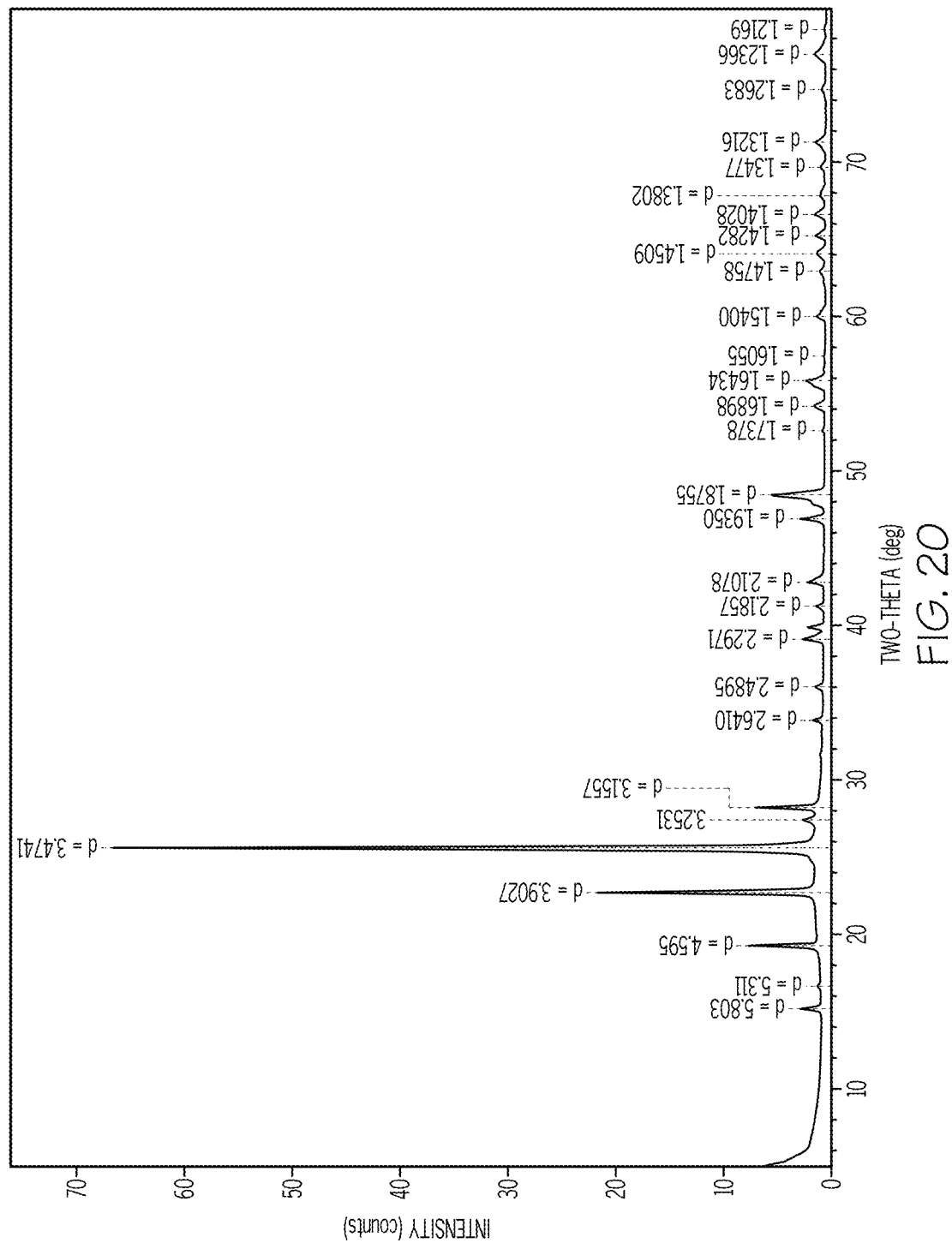
FIG. 20 is an XRD spectrum of a glass article made from an exemplary glass composition and subjected to heat treatment according to one or more embodiments described herein.

Referring now to FIG. 20, the XRD spectrum for the example glass composition 45 after being subjected to a heat treatment of about 630° C. to 720° C. for 22 hours includes peaks evidencing the presence of spodumene and rutile as dispersed phases. While not wishing to be bound by theory, it is believed that the heat treatment of about 630° C. to 720° C. for 22 hours to example glass composition 45 nucleates and forms crystals with the detected phase in the example glass composition 45.

As exemplified by example glass compositions 44 and 45, for $Li_2O$-containing glass compositions with $TiO_2$ as a nucleating agent, polymorphs of lithium aluminosilicate and $TiO_2$ are detected by XRD at different heat treatment temperatures. While not wishing to be bound by theory, a polymorph of lithium aluminosilicate virgilite is the early nucleating phase during heat treatment where the transmittance of the glass composition is largely unaffected. For a longer period of time, or at a higher temperature, beta spodumene and rutile or anatase appear and the glass composition turns translucent and eventually turns opaque.

Figure 21:
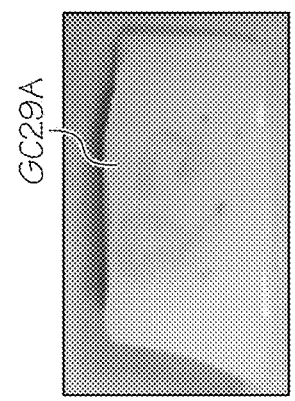
FIG. 21 is a photograph of a glass article made from an exemplary glass composition and subjected to heat treatment according to one or more embodiments described herein.
Figure 22:
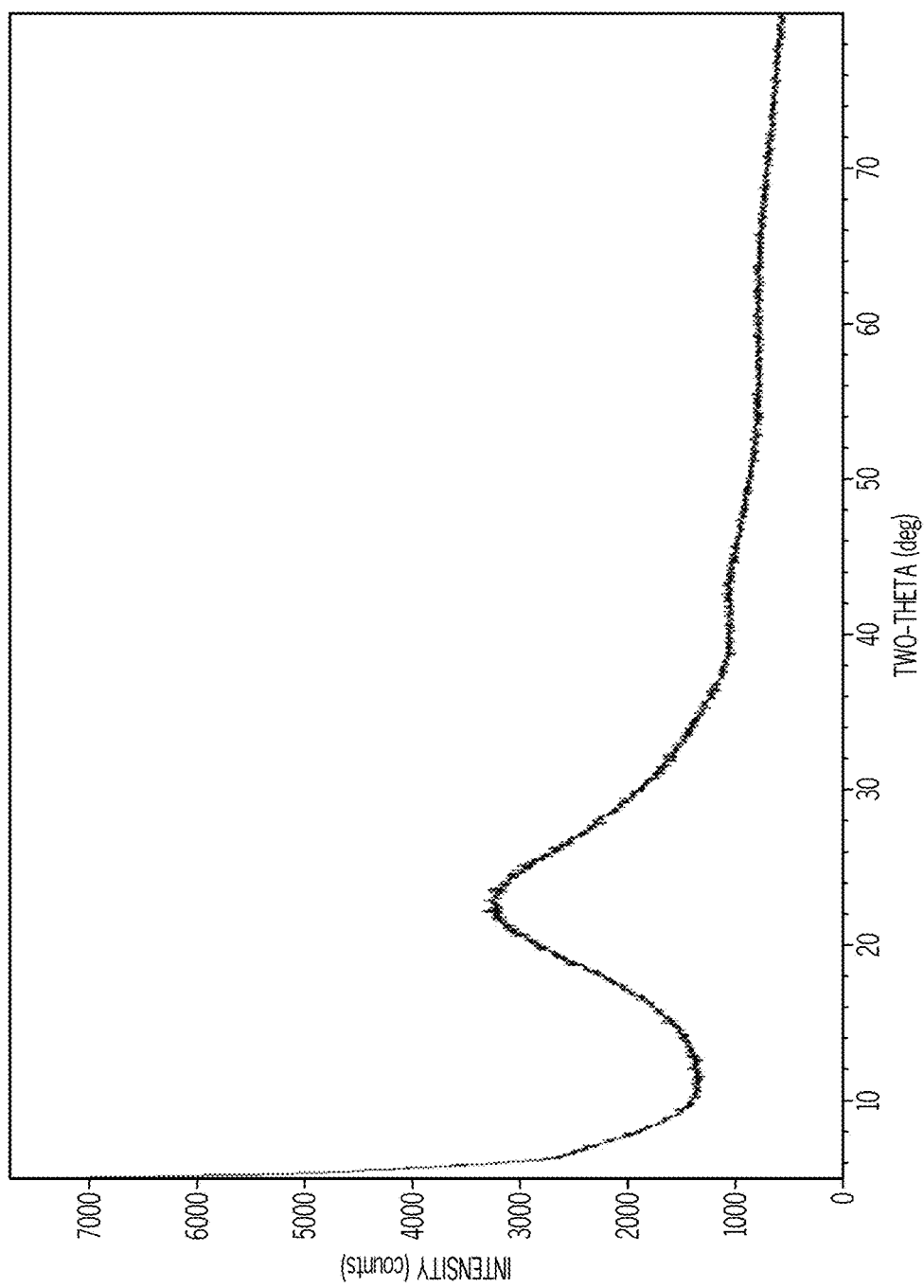
FIG. 22 is an XRD spectrum of the glass article shown in FIG. 21.

Referring now to FIG. 21, heat treating example glass composition 29 at 825° C. for 0.5 hour results in an opaque glass article GC29A. Referring now to FIG. 22, the XRD spectrum for example glass composition 29 after heat treatment of 825° C. for 0.5 hour shows no evidence of crystallization. While not wishing to be bound by theory, in view of the resulting opaque glass article and the lack of evidence of crystallization, it is believed that the heat treatment of 825° C. for 0.5 hour to example glass composition 29 results in a multi-phase glass with at least two glass phases and no crystallization.

Figure 23:
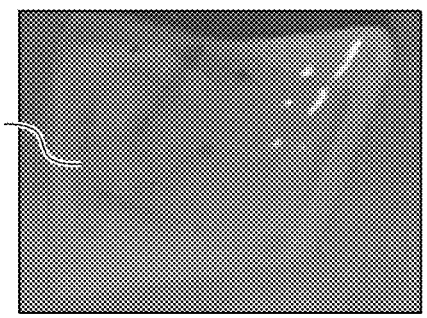
FIG. 23 is a photograph of a glass article made from an exemplary glass composition and subjected to heat treatment according to one or more embodiments described herein.
Figure 24:
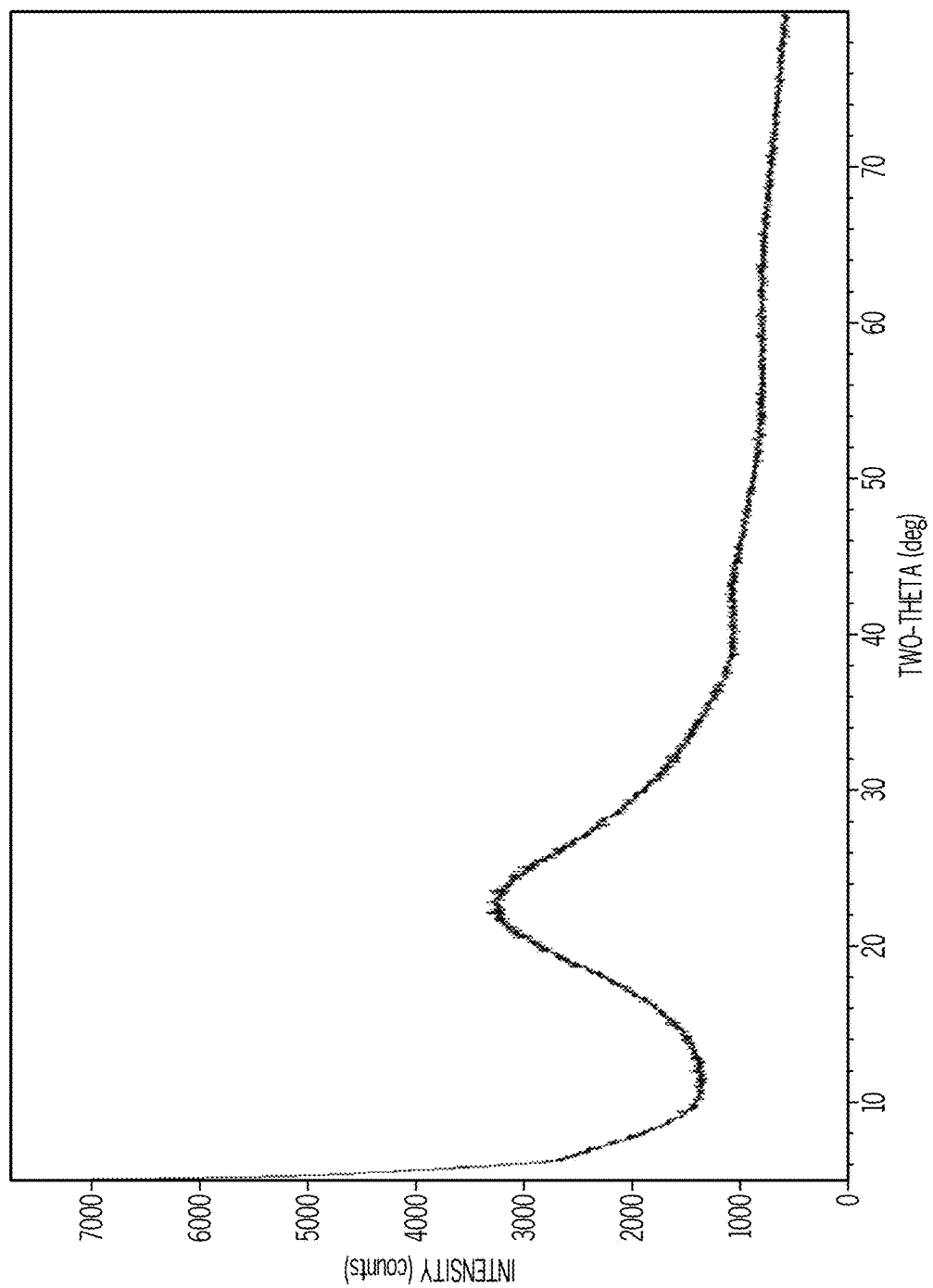
FIG. 24 is an XRD spectrum of the glass article shown in FIG. 23.

Referring now to FIG. 23, heat treating example glass composition 29 at 780° C. for 0.66 hour results in an opaque glass article GC29B. Referring now to FIG. 24, the XRD spectrum for example glass composition 29 after heat treatment of 780° C. for 0.66 hour shows no evidence of crystallization. While not wishing to be bound by theory, in view of the resulting opaque glass article and the lack of evidence of crystallization, it is believed that the heat treatment of 780° C. for 0.66 hour to example glass composition 29 results in a multi-phase glass with at least two glass phases and no crystallization.

Figure 25:
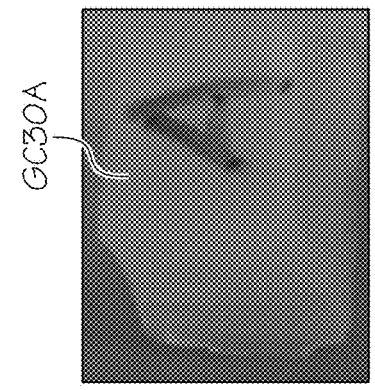
FIG. 25 is a photograph of a glass article made from an exemplary glass composition and subjected to heat treatment according to one or more embodiments described herein.
Figure 26:
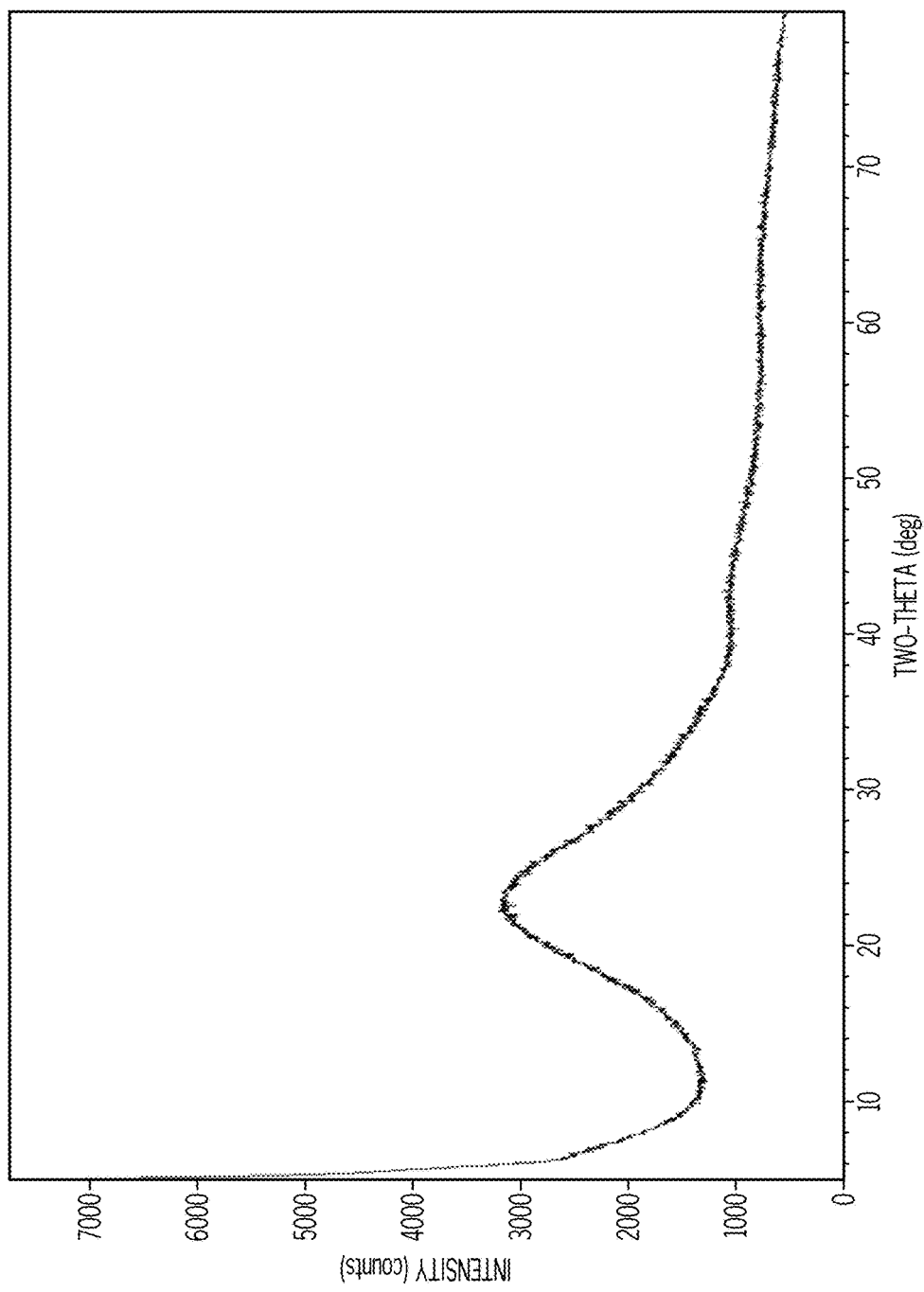
FIG. 26 is an XRD spectrum of the glass article shown in FIG. 25.

Referring now to FIG. 25, heat treating example glass composition 30 at 730° C. for 0.5 hour results in an opaque glass article GC30A. Referring now to FIG. 26, the XRD spectrum for example glass composition 30 after heat treatment of 730° C. for 0.5 hour shows no evidence of crystallization. While not wishing to be bound by theory, in view of the resulting opaque glass article and the lack of evidence of crystallization, it is believed that the heat treatment of 730° C. for 0.5 hour to example glass composition 30 results in a multi-phase glass with at least two glass phases and no crystallization.

Figure 27:
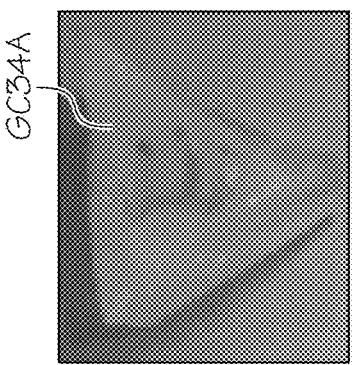
FIG. 27 is a photograph of a glass article made from an exemplary glass composition and subjected to heat treatment according to one or more embodiments described herein.
Figure 28:
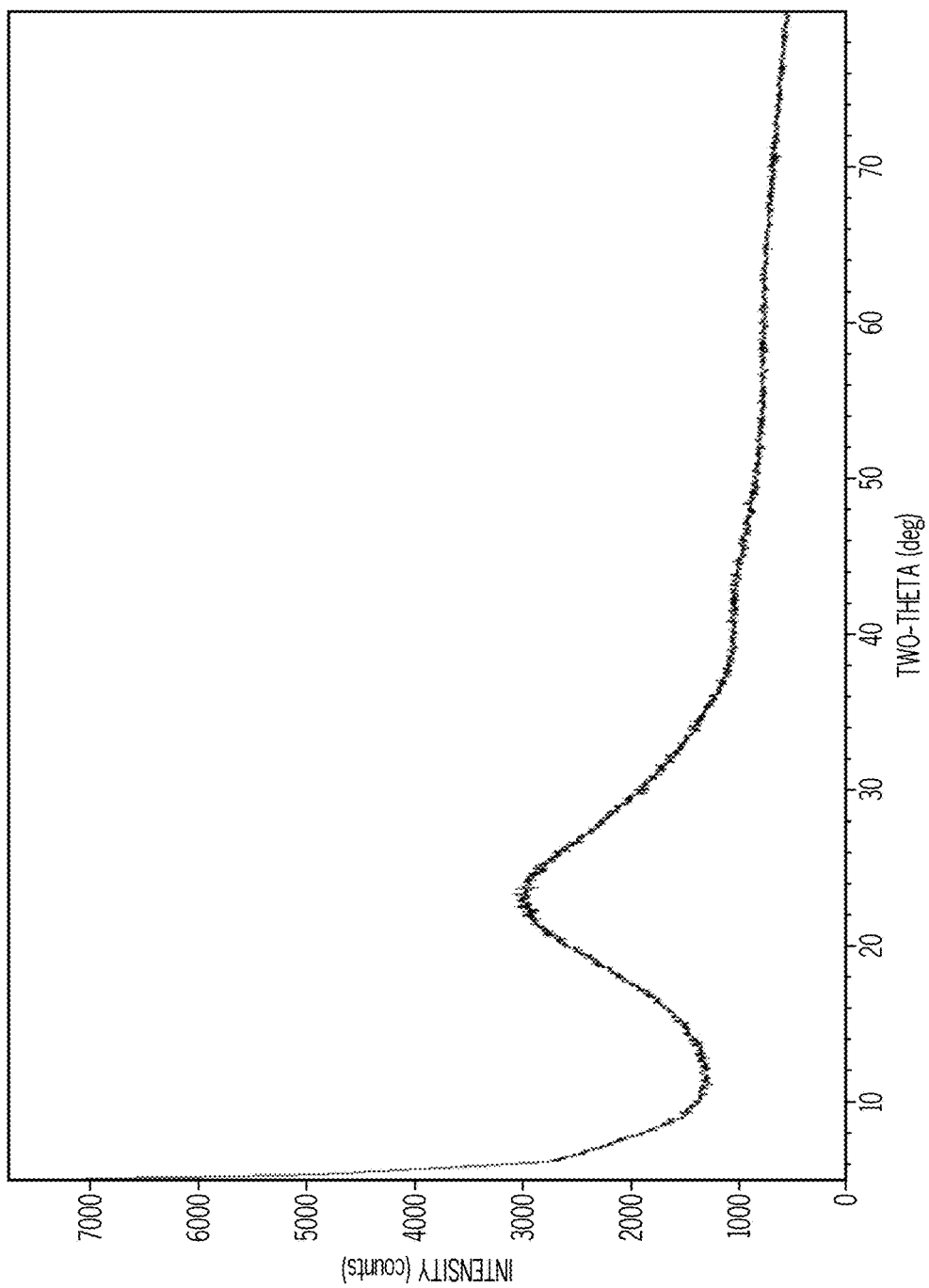
FIG. 28 is an XRD spectrum of the glass article shown in FIG. 27.

Referring now to FIG. 27, heat treating example glass composition 34 at 780° C. for 0.66 hour results in an opaque glass article GC34A. Referring now to FIG. 28, the XRD spectrum for example glass composition 34 after heat treatment of 780° C. for 0.6 hour shows no evidence of crystallization. While not wishing to be bound by theory, in view of the resulting opaque glass article and the lack of evidence of crystallization, it is believed that the heat treatment of 780° C. for 0.6 hour to example glass composition 34 resulted in a multi-phase glass with at least two glass phases and no crystallization.

Figure 29:
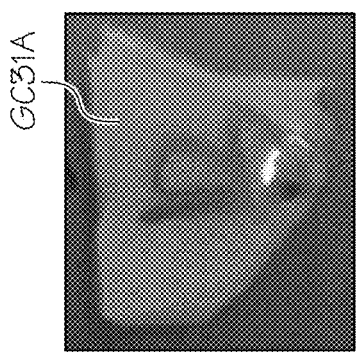
FIG. 29 is a photograph of a glass article made from an exemplary glass composition and subjected to heat treatment according to one or more embodiments described herein.
Figure 30:
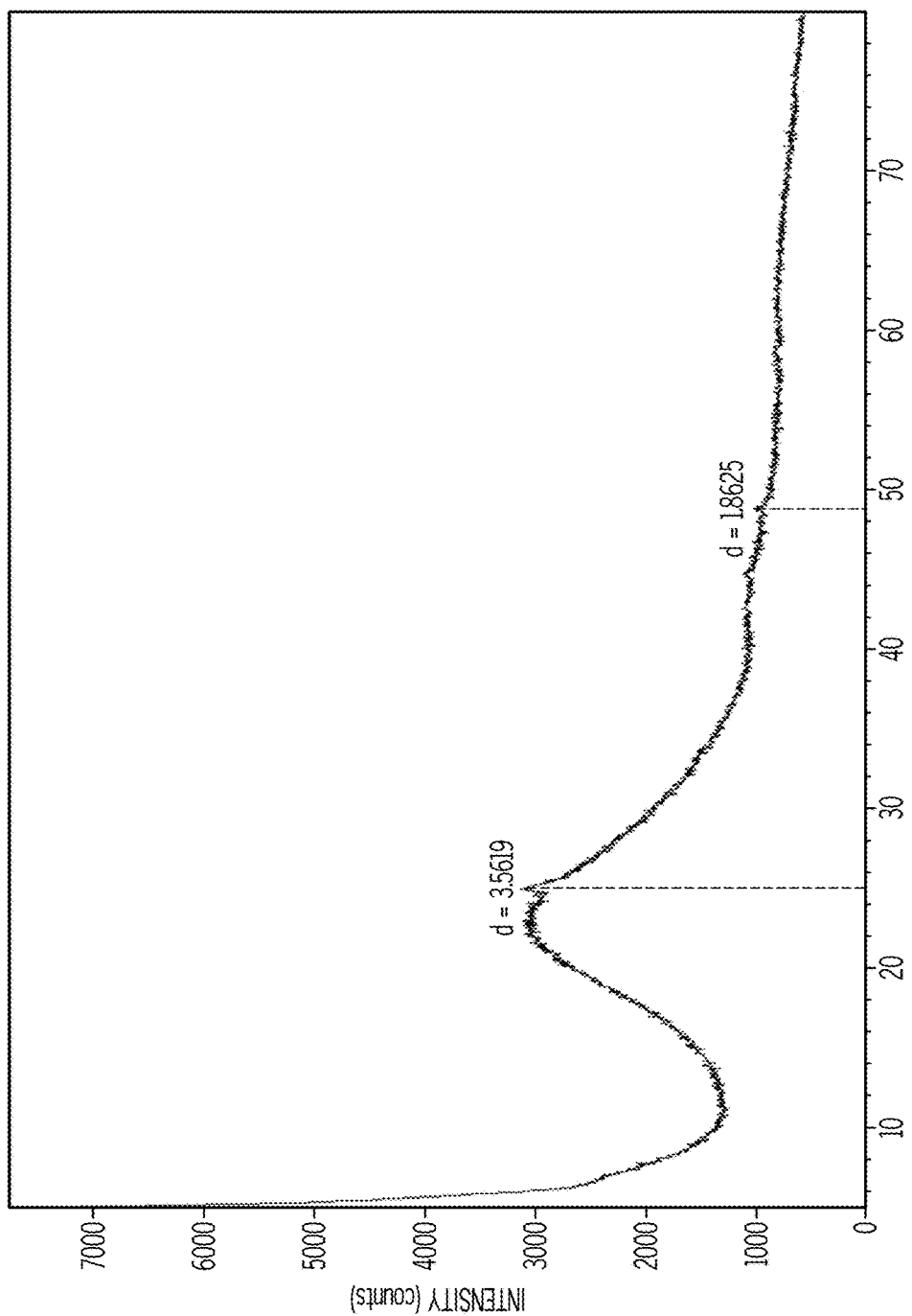
FIG. 30 is an XRD spectrum of the glass article shown in FIG. 29.

Referring now to FIG. 29, heat treating example glass composition 31 at 700° C. for 0.5 hour results in an opaque glass article GC31A. Referring now to FIG. 30, the XRD spectrum for example glass composition 31 after heat treatment of 700° C. for 0.5 hour includes evidence of sodium titanium oxide. While not wishing to be bound by theory, it is believed that the heat treatment of 700° C. for 0.5 hour to example glass composition 31 nucleates and forms crystals with the detected phases in the example glass composition 31.

As exemplified by example glass compositions 29, 30, and 34 it was surprisingly found that a $Li_2O$-free, $Na_2O$-containing glass composition may remain XRD amorphous (i.e., no peaks) even when the glass composition turns opaque after being subjected to heat treatment. While not wishing to be bound by theory, the lack of evidence of crystallization even when the glass composition turns opaque indicates that certain heat treatment of the $Li_2O$-free, $Na_2O$-containing glass composition results in a multi-phase glass with at least two glass phases and no crystallization. However, a crystalline phase may be developed in a $Li_2O$-free, $Na_2O$-containing glass composition with certain heat treatment as exemplified by example glass composition 31.

Examples Group 4: $P_2O_5$ and $TiO_2$ as a Nucleating Agent

Table 7 shows example glass compositions (in terms of mol %) and the respective properties of the glass compositions. Glasses were formed having the example compositions 50-61. In particular, example glass compositions 50-61 include a combination of $P_2O_5$ and $TiO_2$ as the nucleating agent.

TABLE 7

| Example | 50 | 51 | 52 | 53 | 54 | 55 | 56 |
|---|---|---|---|---|---|---|---|
| $SiO_2$ | 60.79 | 59.56 | 59.51 | 60.42 | 61.65 | 59.96 | 59.34 |
| $Al_2O_3$ | 12.07 | 12.25 | 12.14 | 12.17 | 11.90 | 12.26 | 11.97 |
| $B_2O_3$ | 14.22 | 14.43 | 14.18 | 14.25 | 14.05 | 14.39 | 14.57 |
| $P_2O_5$ | 1.52 | 1.55 | 1.53 | 1.03 | 0.50 | 1.55 | 1.01 |
| $TiO_2$ | 1.49 | 2.02 | 2.49 | 1.99 | 1.96 | 2.02 | 1.98 |
| $ZrO_2$ | 0 | 0 | 0 | 0 | 0 | 0 | 0 |
| $WO_3$ | 0 | 0 | 0 | 0 | 0 | 0 | 0 |
| $Y_2O_3$ | 0 | 0 | 0 | 0 | 0 | 0 | 0 |
| $Li_2O$ | 7.78 | 8.01 | 8.03 | 8.02 | 7.86 | 0 | 9.05 |
| $Na_2O$ | 1.90 | 1.92 | 1.90 | 1.89 | 1.87 | 9.79 | 1.87 |
| $K_2O$ | 0.20 | 0.20 | 0.20 | 0.20 | 0.20 | 0 | 0.19 |
| MgO | 0.01 | 0.03 | 0.01 | 0.01 | 0.01 | 0.01 | 0.01 |
| CaO | 0.01 | 0.04 | 0.01 | 0.01 | 0.01 | 0.01 | 0.01 |
| ZnO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |
| $Fe_2O_3$ | 0 | 0 | 0 | 0 | 0 | 0 | 0 |
| $SnO_2$ | 0 | 0 | 0 | 0 | 0 | 0 | 0 |
| $Al_2O_3 + B_2O_3$ | 26.29 | 26.68 | 26.32 | 26.42 | 25.95 | 26.65 | 26.54 |
| $P_2O_5 + TiO_2 + ZrO_2 + WO_3 + Y_2O_3 + ZnO$ | 3.01 | 3.57 | 4.02 | 3.02 | 2.46 | 3.57 | 2.99 |
| $Li_2O + N_2O$ | 9.88 | 10.13 | 10.13 | 10.11 | 9.93 | 9.79 | 11.11 |
| $R_2O$ | 9.88 | 10.13 | 10.13 | 10.11 | 9.93 | 9.79 | 11.11 |
| RO | 0.02 | 0.07 | 0.02 | 0.02 | 0.02 | 0.02 | 0.02 |
| $R_2O + RO$ | 9.90 | 10.20 | 10.15 | 10.13 | 9.95 | 9.81 | 11.13 |
| $Al_2O_3 - R_2O - RO$ | 2.17 | 2.05 | 1.99 | 2.04 | 1.95 | 2.45 | 0.84 |
| Density (g/cm³) | — | — | — | — | — | — | — |
| CTE at 500° C. cooling (ppm) | — | — | — | — | — | — | — |
| CTE at 300° C. cooling(ppm | — | — | — | — | — | — | — |
| CTE at 50° C. cooling(ppm) | — | — | — | — | — | — | — |
| Strain Pt. (° C.) | — | — | — | — | — | — | — |
| Anneal Pt. (° C.) | — | — | — | — | — | — | — |
| Softening Pt. (° C.) | — | — | — | — | — | — | — |
| Young's Modulus (GPa) | — | — | — | — | — | 56.7 | — |
| Shear modulus (GPa) | — | — | — | — | — | 23.2 | — |
| Poisson's ratio | — | — | — | — | — | 0.221 | — |
| Refractive index | — | — | — | — | — | — | — |
| SOC (nm/mm/MPa) | — | — | — | — | — | 4.223 | — |
| VFT A | −2.87 | −2.955 | −3.046 | −2.786 | −2.734 | −3.923 | −2.888 |
| VFT B | 7503.5 | 7680.2 | 7755.9 | 7273.6 | 7052.1 | 10322.6 | 7380 |
| VFT $T_o$ | 41.7 | 22.4 | 24.4 | 47.3 | 79 | −66.5 | 36 |
| 200 P Temperature (° C.) | 1493 | 1484 | 1475 | 1477 | 1480 | 1592 | 1458 |
| 35000 P Temperature (° C.) | 1054 | 1047 | 1046 | 1040 | 1048 | 1153 | 1029 |
| 200000 P Temperature (° C.) | 960 | 953 | 954 | 947 | 957 | 1053 | 937 |
| Liquidus (gradient boat) duration (hours) | 72 | 72 | 72 | 72 | 72 | 72 | 72 |
| Air interface liqudus temperature (° C.) | 1010 | 1055 | 1075 | 1035 | 1165 | 1055 | 1055 |
| Internal liqudus temperature (° C.) | 1010 | 1045 | 1070 | 1030 | 1145 | 1055 | 1045 |
| Platinum interface liquidus temperature (° C.) | 1000 | 1045 | 1030 | 1030 | 1135 | 1055 | 1040 |
| Primary Phase | Rutile | Rutile | Rutile | Rutile | Rutile | Rutile | Rutile |
| Liquidus Viscosity (kP) | 75.71 | 35.93 | 23.53 | 41.27 | 7.61 | 191.11 | 26.7 |
| $K_{Ic}$ (CN) | — | — | — | — | — | 0.700 | — |
| Standard Deviation (CN) | — | — | — | — | — | 0.018 | — |

| Example | 57 | 58 | 59 | 60 | 61 |
|---|---|---|---|---|---|
| $SiO_2$ | 58.04 | 55.76 | 60.21 | 58.19 | 56.22 |
| $Al_2O_3$ | 11.83 | 12.02 | 13.13 | 14.17 | 15.21 |
| $B_2O_3$ | 15.36 | 16.69 | 12.52 | 12.64 | 12.66 |

TABLE 7-continued

| | | | | | |
|---|---|---|---|---|---|
| $P_2O_5$ | 1.00 | 1.01 | 1.02 | 1.02 | 1.02 |
| $TiO_2$ | 1.96 | 1.97 | 1.98 | 1.98 | 1.99 |
| $ZrO_2$ | 0 | 0 | 0 | 0 | 0 |
| $WO_3$ | 0 | 0 | 0 | 0 | 0 |
| $Y_2O_3$ | 0 | 0 | 0 | 0 | 0 |
| $Li_2O$ | 9.74 | 10.43 | 9.04 | 9.89 | 10.80 |
| $Na_2O$ | 1.86 | 1.89 | 1.88 | 1.89 | 1.88 |
| $K_2O$ | 0.20 | 0.20 | 0.19 | 0.20 | 0.20 |
| MgO | 0.01 | 0.01 | 0.02 | 0.01 | 0.02 |
| CaO | 0.01 | 0.01 | 0.02 | 0.01 | 0.01 |
| ZnO | 0 | 0 | 0 | 0 | 0 |
| SrO | 0 | 0 | 0 | 0 | 0 |
| BaO | 0 | 0 | 0 | 0 | 0 |
| $Fe_2O_3$ | 0 | 0 | 0 | 0 | 0 |
| $SnO_2$ | 0 | 0 | 0 | 0 | 0 |
| $Al_2O_3 + B_2O_3$ | 27.19 | 28.71 | 25.65 | 26.81 | 27.87 |
| $P_2O_5 + TiO_2 + ZrO_2 + WO_3 + Y_2O_3 + ZnO$ | 2.96 | 2.98 | 3.00 | 3.00 | 3.01 |
| $Li_2O + N_2O$ | 11.80 | 12.52 | 11.11 | 11.98 | 12.88 |
| $R_2O$ | 11.80 | 12.52 | 11.11 | 11.98 | 12.88 |
| RO | 0.02 | 0.02 | 0.04 | 0.02 | 0.03 |
| $R_2O + RO$ | 11.82 | 12.54 | 11.15 | 12.00 | 12.91 |
| $Al_2O_3 - R_2O - RO$ | 0.01 | −0.52 | 1.98 | 2.17 | 2.30 |
| Density (g/cm³) | — | — | — | — | — |
| CTE at 500° C. cooling (ppm) | — | — | — | — | — |
| CTE at 300° C. cooling(ppm) | — | — | — | — | — |
| CTE at 50° C. cooling(ppm) | — | — | — | — | — |
| Strain Pt. (° C.) | — | — | — | — | — |
| Anneal Pt. (° C.) | — | — | — | — | — |
| Softening Pt. (° C.) | — | — | — | — | — |
| Young's Modulus (GPa) | — | — | — | — | — |
| Shear modulus (GPa) | — | — | — | — | — |
| Poisson's ratio | — | — | — | — | — |
| Refractive index | — | — | — | — | — |
| SOC (nm/mm/MPa) | — | — | — | — | — |
| VFT A | −2.335 | −1.759 | −3.125 | −2.609 | −2.649 |
| VFT B | 6146.1 | 4818.4 | 7837.7 | 6448.7 | 6246.3 |
| VFT $T_o$ | 72.9 | 156.8 | 38.7 | 125.4 | 145.8 |
| 200 P Temperature (° C.) | 1399 | 1344 | 1483 | 1439 | 1408 |
| 35000 P Temperature (° C.) | 966 | 921 | 1061 | 1027 | 1014 |
| 200000 P Temperature (° C.) | 878 | 839 | 969 | 941 | 931 |
| Liquidus (gradient boat) duration (hours) | 72 | 72 | 72 | 72 | 72 |
| Air interface liqudus temperature (° C.) | 1060 | 995 | 1050 | 1030 | 1025 |
| Internal liqudus temperature (° C.) | 1045 | 990 | 1040 | 1025 | 1015 |
| Platinum interface liquidus temperature (° C.) | 1035 | 990 | 1025 | 1020 | 1005 |
| Primary Phase | Rutile | Rutile | Rutile | Rutile | Rutile |
| Liquidus Viscosity (kP) | 9.7 | 10.6 | 50.4 | 36.3 | 34.5 |
| $K_{Ic}$ (CN) | — | — | — | — | — |
| Standard Deviation (CN) | — | — | — | — | — |

Figure 31:
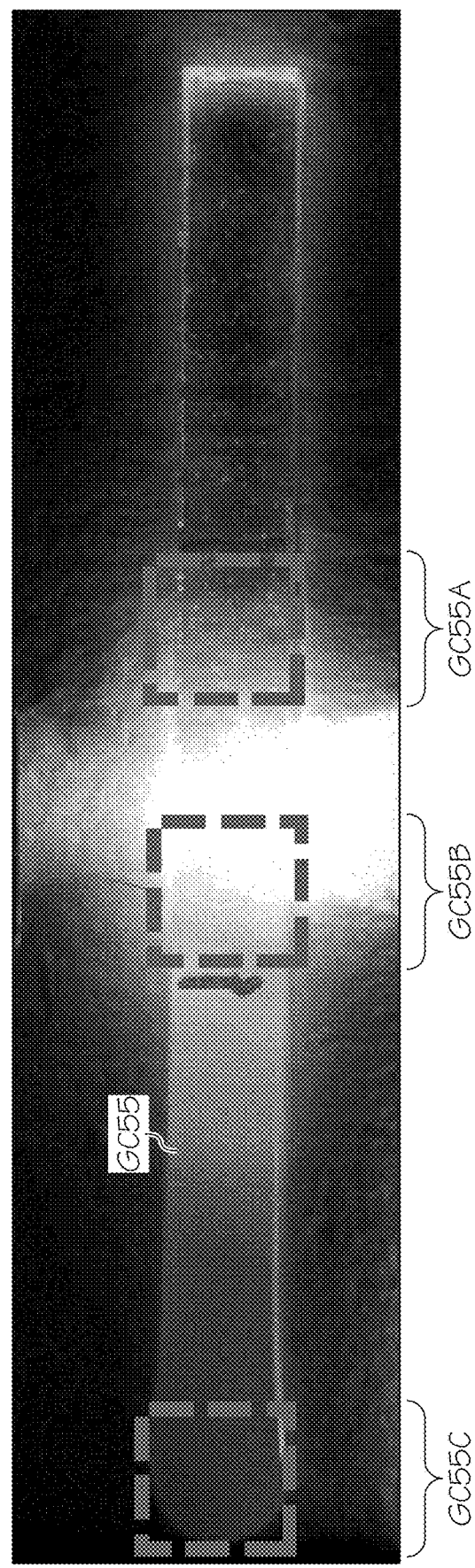
FIG. 31 is a photograph of a bar sample made from exemplary glass composition and subjected to heat treatment according to one or more embodiments described herein.
Figure 32:
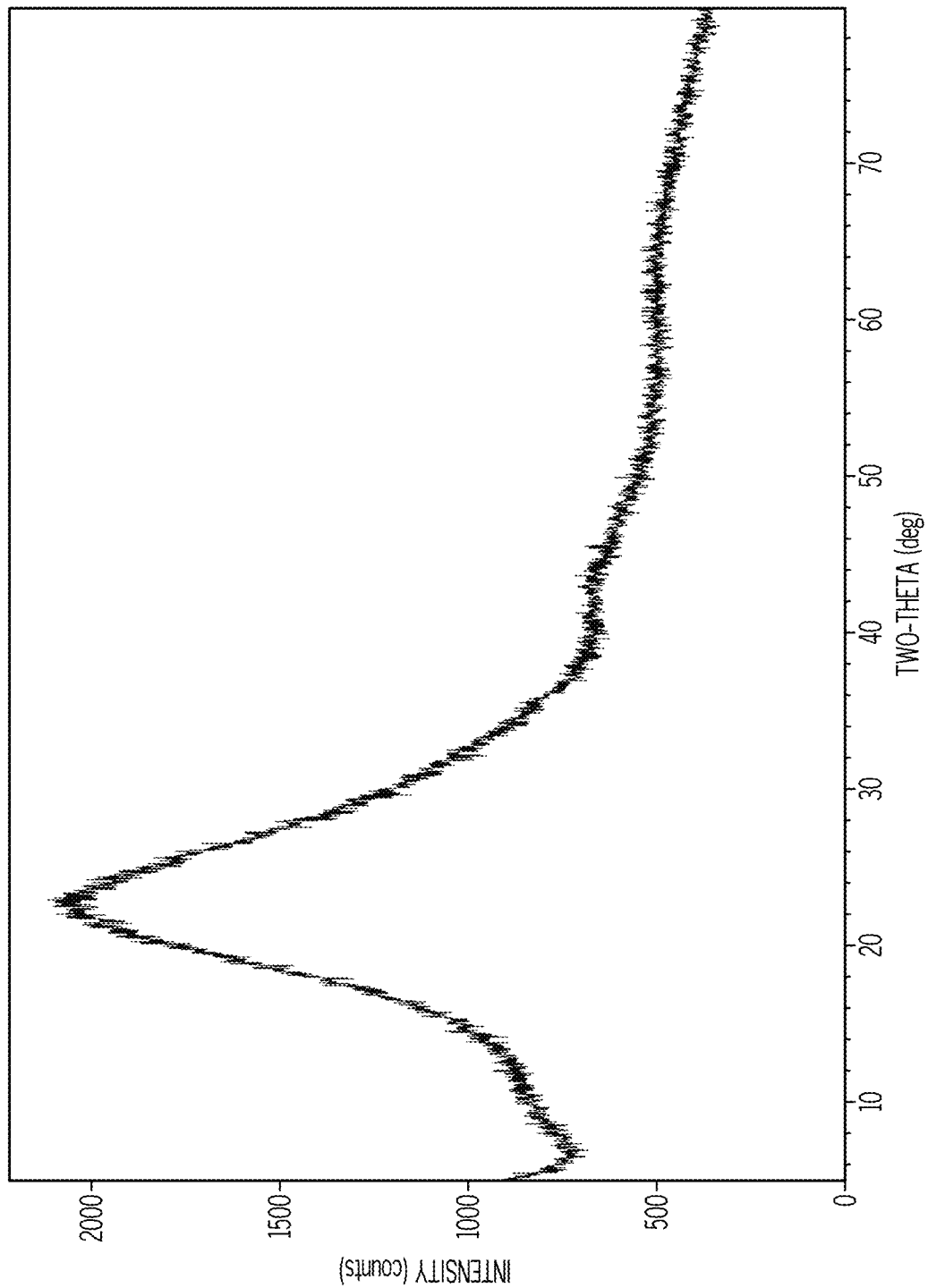
FIG. 32 is an XRD spectrum of a section of the bar sample shown in FIG. 31.

Referring now to FIG. 31, a bar sample of example glass composition 55 GC55 was subjected to a heat treatment under gradient temperature. In particular, the bar sample GC55 was heat treated under gradient temperature from 900° C. (0 cm on right side of figure) to 600° C. (9 cm on left side of figure) for 4 hours. The section from 7.6 cm to 8.6 cm of the bar sample of example glass composition 55 GC55A, corresponding to a heat treatment of about 750° C. to 730° C. for 4 hours, results in this section being transparent haze. Referring now to FIG. 32, the XRD spectrum for the 7.6 cm to 8.6 cm section of the bar sample of example glass composition 55, corresponding to a heat treatment of about 730° C. to 750° C. for 4 hours, shows no evidence of crystallization. While not wishing to be bound by theory, in view of the resulting transparent haze glass article and the lack of evidence of crystallization, it is believed that heat treatment of about 730° C. to 750° C. for 4 hours to example glass composition 55 results in a multi-phase glass with at least two glass phases and no crystallization.

Figure 33:
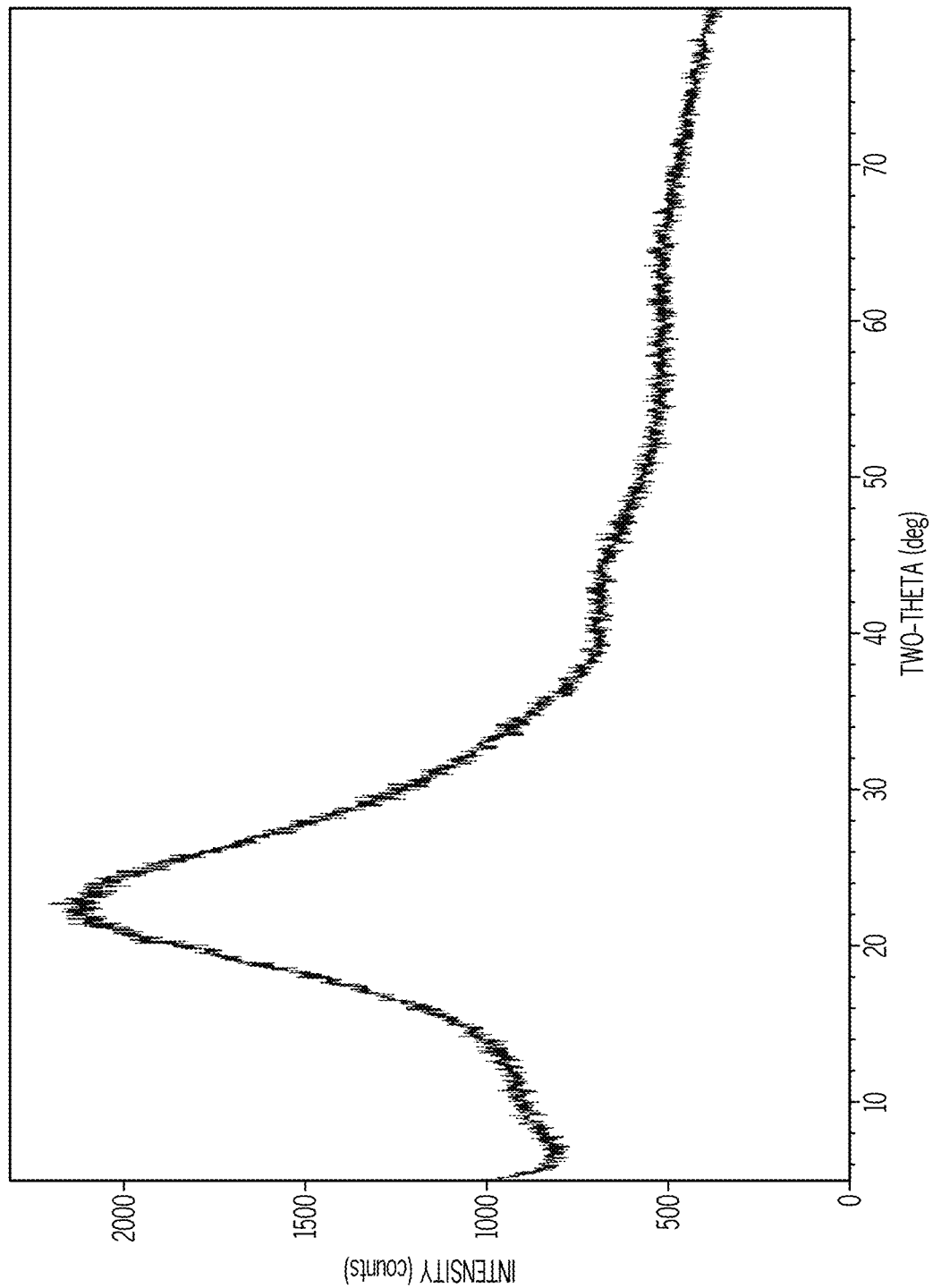
FIG. 33 is an XRD spectrum of another section of the bar sample shown in FIG. 31.

Referring back to FIG. 31, the section from 5 cm to 6 cm of the bar sample of example glass composition 55 GC55B, corresponding to a heat treatment of about 780° C. to 800° C. for 4 hours, results in this section of the bar being translucent. Referring now to FIG. 33, the XRD spectrum for the 5 cm to 6 cm section of the bar sample of example glass composition 55, corresponding to a heat treatment of about 780° C. to 800° C. for 4 hours, shows no evidence of crystallization. While not wishing to be bound by theory, in view of the resulting transparent haze glass article and the lack of evidence of crystallization, it is believed that heat treatment of about 780° C. to 800° C. for 4 hours to example glass composition 55 results in a multi-phase glass with at least two glass phases and no crystallization.

Figure 34:
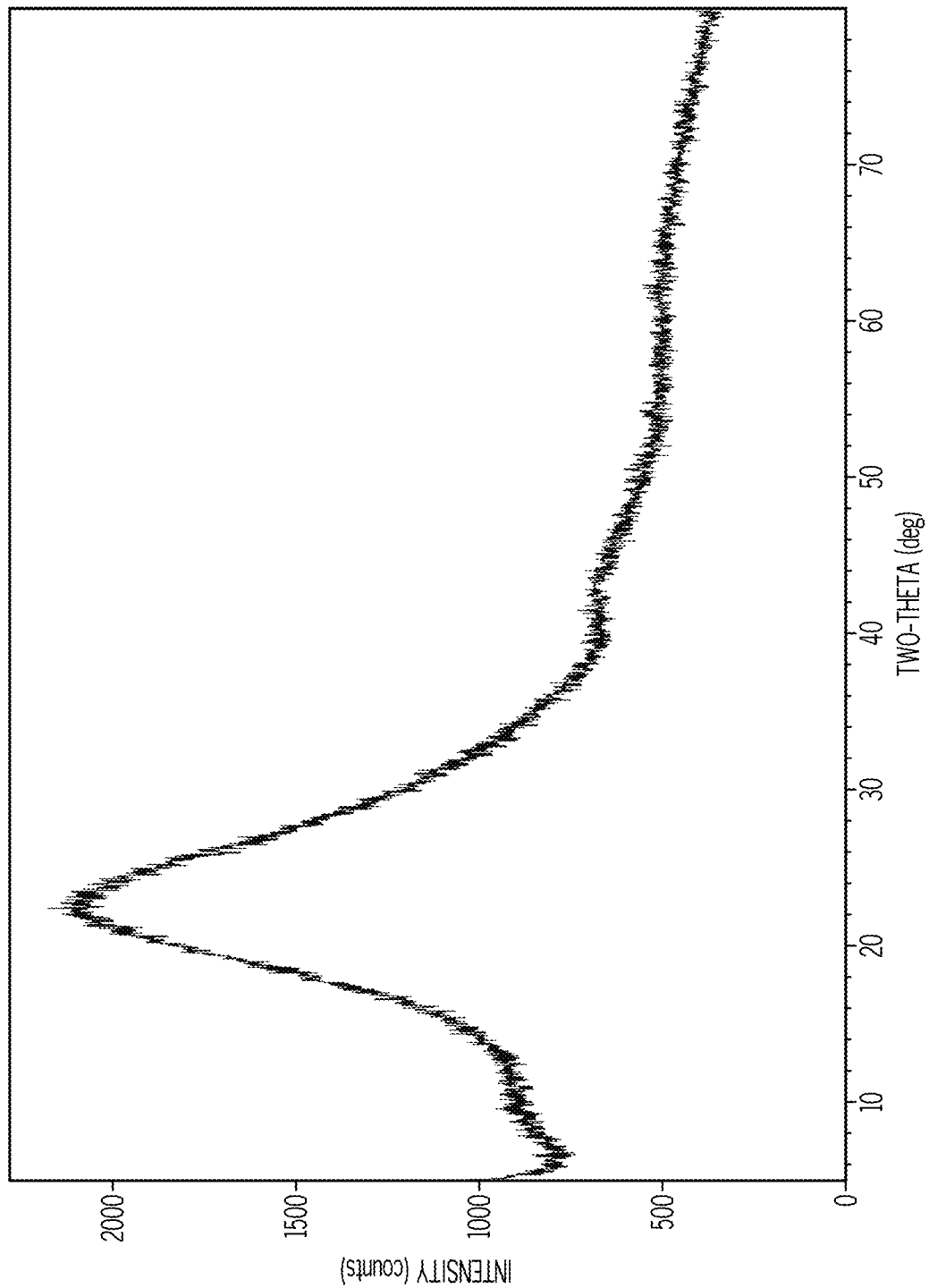
FIG. 34 is an XRD spectrum of another section of the bar sample shown in FIG. 31.

Referring back to FIG. 31, the section from 0 cm to 1 cm of the bar sample of example glass composition 55 GC55C, corresponding to a heat treatment of about 860° C. to 880° C. for 4 hours, results in this section of the bar being opaque. Referring now to FIG. 34, the XRD spectrum for the 0 cm to 1 cm section of the bar sample of example glass composition 55, corresponding to a heat treatment of about 860° C. to 880° C. for 4 hours, shows no evidence of crystallization. While not wishing to be bound by theory, in view of the resulting transparent haze glass article and the lack of evidence of crystallization, it is believed that heat treatment of about 860° C. to 880° C. for 4 hours to example glass composition 55 results in a multi-phase glass with at least two glass phases and no crystallization.

As exemplified by example glass composition 55, it was surprisingly found that a $Li_2O$-free, $Na_2O$-containing glass composition may remain XRD amorphous (i.e., no peaks) even when the glass composition turns opaque after being subjected to heat treatment. While not wishing to be bound by theory, the lack of evidence of crystallization even when the glass composition turns opaque indicates that certain heat treatment of the $Li_2O$-free, $Na_2O$-containing glass composition results in a multi-phase glass with at least two glass phases and no crystallization.

Examples Group 5: Ion Exchange

Table 8 shows the central tension of comparative glass composition C8 after applying ion exchange solution to the glass article made from comparative glass composition at a temperature of 450° C. for 8 hours, 16 hours, and 24 hours. The ion exchange solution applied to comparative glass composition 8 was 100% $NaNO_3$.

Table 9 shows the surface compressive stress, depth of compression, and central tension of example glass composition 2 after applying an ion exchange solution to glass articles made from example glass composition 2 at 450° C. for 2 hours, 4 hours, and 8 hours. The ion exchange solutions applied to example glass composition 2 were 100% $NaNO_3$ and 95% $KNO_3$/5% $NaNO_3$.

Table 10 shows the central tension of example glass compositions 17, 19, and 20 after applying ion exchange solution to glass articles made from example glass compositions 17, 19, and 20 at 370° C. and 400° C. for 4 hours, 8 hours, and 16 hours. The ion exchange solution applied to example glass compositions 17, 19, and 20 was 100% $NaNO_3$.

TABLE 8

| Example | C8 |
|---|---|
| Treatment of glass composition | As melted |
| IOX Conditions | 450° C., 100% $NaNO_3$ |
| 8 hours | |
| CT (MPa) | 111 |
| 16 hours | |
| CT (MPa) | 111 |
| 24 hours | |
| CT (MPa) | 83 |

TABLE 9

| Example | 2 | 2 |
|---|---|---|
| Treatment of glass composition | 750° C. for 3 hrs.; phase separation | 750° C. for 3 hrs.; phase separation |
| IOX Conditions | 450° C., 100% $NaNO_3$ | 450° C., 95% $KNO_3$/5% $NaNO_3$ |
| 2 hours | | |
| CT (MPa) | 56 | 28 |
| 4 hours | | |
| CS (MPa) | — | 531 |
| DOC (μm) | — | 5.3 |
| CT (MPa) | 76 | 37 |
| 8 hours | | |
| CS (MPa) | — | 469 |
| DOC (μm) | — | 7.1 |
| CT (MPa) | 93 | 36 |

TABLE 10

| Example | 17 | 19 | 20 | 17 | 19 | 20 |
|---|---|---|---|---|---|---|
| Treatment of glass composition | 650° C. for 0.5 hr.; phase separation | 650° C. for 0.66 hr.; phase separation | As melted | 650° C. for 0.5 hr.; phase separation | 650° C. for 0.66 hr.; phase separation | As melted |
| IOX Conditions | 370° C., 100% $NaNO_3$ | 370° C., 100% $NaNO_3$ | 370° C., 100% $NaNO_3$ | 400° C., 100% $NaNO_3$ | 400° C., 100% $NaNO_3$ | 400° C., 100% $NaNO_3$ |
| 4 hours | | | | | | |
| CT (MPa) | 63.2 | 59.7 | 55.2 | 71.0 | 82.9 | 67.5 |
| 8 hours | | | | | | |
| CT (MPa) | 78.6 | 82.9 | 74.3 | 95.1 | 98.8 | 89.8 |
| 16 hours | | | | | | |
| CT (MPa) | 101.7 | 113.6 | 104.5 | 114.7 | 116.3 | 109.5 |

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass composition comprising:

greater than or equal to 53 mol % and less than or equal to 70 mol % $SiO_2$;

greater than or equal to 9 mol % and less than or equal to 20 mol % $Al_2O_3$;

greater than or equal to 10 mol % and less than or equal to 17.5 mol % $B_2O_3$;

greater than or equal to 0 mol % $Li_2O$;

greater than or equal to 0 mol % $Na_2O$; and greater than 0.1 mol % of a nucleating agent, the nucleating agent selected from the group consisting of $TiO_2$, $Y_2O_3$, $ZrO_2$, $P_2O_5$, ZnO, and combinations thereof, wherein:

$Li_2O+Na_2O$ is greater than or equal to 8 mol % and less than or equal to 30 mol %;

$Al_2O_3$—$R_2O$—RO is greater than or equal to -3 mol %;

wherein $R_2O$ is the sum of $Li_2O$, $Na_2O$ and $K_2O$;

wherein RO is the sum of MgO, CaO, SrO, BaO and ZnO;

the glass composition is phase separable; and the glass composition has a $K_{Ic}$ fracture toughness as measured by a chevron notch short bar method, wherein the $K_{Ic}$ fracture toughness is greater than or equal to 0.70 $MPa·m^{1/2}$.

2. The glass composition of claim 1, wherein the glass composition is phase separable into at least two glass phases.

3. The glass composition of claim 1, wherein $Al_2O_3$+$B_2O_3$ is greater than or equal to 19 and less than or equal to 31 mol %.

4. The glass composition of claim 3, wherein $Al_2O_3$+$B_2O_3$ is greater than or equal to 20 mol % and less than or equal to 31 mol %.

5. The glass composition of claim 1, wherein $Li_2O+Na_2O$ is greater than or equal to 9 mol % and less than or equal to 17 mol %.

6. The glass composition of claim 1, wherein the glass composition comprises greater than or equal to 0.5 mol % and less than or equal to 5 mol % of the nucleating agent.

7. The glass composition of claim 6, wherein the glass composition comprises greater than or equal to 1 mol % and less than or equal to 5 mol % of the nucleating agent.

8. The glass composition of claim 1, wherein $Al_2O_3$—$R_2O$—RO is greater than or equal to -2 mol %.

9. The glass composition of claim 1, wherein the glass composition comprises greater than or equal to 10 mol % and less than or equal to 20 mol % $Al_2O_3$.

10. The glass composition of claim 1, wherein the glass composition comprises greater than or equal to 11 mol % and less than or equal to 17 mol % $B_2O_3$.

11. The glass composition of claim 1, wherein the glass composition comprises greater than or equal to 54 mol % and less than or equal to 70 mol % $SiO_2$.

* * * * *